US011132109B2

(12) United States Patent
Pelloin et al.

(10) Patent No.: US 11,132,109 B2
(45) Date of Patent: Sep. 28, 2021

(54) TIMELINE VISUALIZATION AND INVESTIGATION SYSTEMS AND METHODS FOR TIME LASTING EVENTS

(71) Applicant: EXFO Solutions SAS, Rennes (FR)

(72) Inventors: Fabrice Pelloin, Rennes (FR); Thierry Boussac, Rennes (FR); Lucas Ortet, Rennes (FR)

(73) Assignee: EXFO Solutions SAS, Saint-Jacques de la Lande (FR)

( * ) Notice: Subject to any disclaimer, the term of this patent is extended or adjusted under 35 U.S.C. 154(b) by 0 days.

(21) Appl. No.: 16/869,817

(22) Filed: May 8, 2020

(65) Prior Publication Data

US 2020/0356229 A1 Nov. 12, 2020

Related U.S. Application Data

(60) Provisional application No. 62/924,949, filed on Oct. 23, 2019, provisional application No. 62/855,245, filed on May 31, 2019, provisional application No. 62/854,712, filed on May 30, 2019, provisional application No. 62/844,881, filed on May 8, 2019.

(51) Int. Cl.
*G06F 3/0484* (2013.01)
*H04L 29/08* (2006.01)

(52) U.S. Cl.
CPC .......... *G06F 3/0484* (2013.01); *H04L 67/22* (2013.01)

(58) Field of Classification Search
CPC .............................. G06F 3/0484; H04L 67/22
See application file for complete search history.

(56) References Cited

U.S. PATENT DOCUMENTS

| 5,515,490 A * | 5/1996 | Buchanan | H04N 21/23412 715/209 |
| 7,999,810 B1 * | 8/2011 | Boice | G06T 13/00 345/473 |
| 8,375,292 B2 * | 2/2013 | Coffman | G06Q 10/10 715/232 |

(Continued)

FOREIGN PATENT DOCUMENTS

| CN | 100490396 C | 5/2009 |
| CN | 101567822 A | 10/2009 |

(Continued)

OTHER PUBLICATIONS

Patrik Nisén, Implementation of a timeline analysis software for digital forensic investigations, Mar. 4, 2013, Aalto University.

(Continued)

*Primary Examiner* — Daeho D Song
(74) *Attorney, Agent, or Firm* — Clements Bernard Baratta; Lawrence A. Baratta, Jr.; Jacob P. Beers

(57) ABSTRACT

Visualization systems and methods include, responsive to obtaining data related to one or more events occurring during operation of a system, displaying information about a time-based component of the one or more events on a timeline; displaying fixed information about a timeless component of the one or more events on the timeline; and responsive to user input to modify a timescale of the timeline, adjusting display of the timeline by adjusting the information of the one or more events and maintaining the fixed information of the one or more events.

15 Claims, 46 Drawing Sheets

(56) References Cited

U.S. PATENT DOCUMENTS

| | | | |
|---|---|---|---|
| 8,494,000 B1* | 7/2013 | Nadkarni | H04L 43/028 370/469 |
| 8,582,454 B2* | 11/2013 | Singhal | H04L 69/22 370/252 |
| 8,601,388 B2* | 12/2013 | Barrios | G06F 3/04855 715/784 |
| 8,644,762 B1* | 2/2014 | Liubinskas | H04W 24/08 455/41.2 |
| 8,799,005 B2* | 8/2014 | Pantaliano | G06Q 30/0282 705/1.1 |
| 8,850,324 B2* | 9/2014 | Clemm | H04L 43/0817 715/736 |
| 8,856,936 B2* | 10/2014 | Datta Ray | H04L 63/20 726/25 |
| 8,930,841 B2* | 1/2015 | Huang | G06F 3/0482 715/779 |
| 8,976,661 B2* | 3/2015 | Lumezanu | H04L 63/1425 370/235 |
| 9,075,895 B2 | 7/2015 | Lindsey et al. | |
| 9,128,995 B1* | 9/2015 | Fletcher | H04L 41/0806 |
| 9,311,108 B2* | 4/2016 | Cummings | H04L 67/16 |
| 9,363,149 B1* | 6/2016 | Chauhan | G06F 21/577 |
| 9,369,366 B2* | 6/2016 | Richards | H04L 43/0894 |
| 9,374,301 B2* | 6/2016 | Kancherla | H04L 47/2483 |
| 9,386,054 B2* | 7/2016 | Carver | H04L 63/1416 |
| 9,392,010 B2* | 7/2016 | Friedman | H04L 63/1416 |
| 9,426,040 B2* | 8/2016 | Vasseur | G06N 5/003 |
| 9,432,430 B1* | 8/2016 | Klenz | H04L 43/04 |
| 9,501,851 B2* | 11/2016 | Cervelli | G06F 3/04847 |
| 9,519,692 B2* | 12/2016 | Chow | G06F 16/2477 |
| 9,654,361 B2* | 5/2017 | Vasseur | H04L 43/0876 |
| 9,659,391 B1* | 5/2017 | Mitra | G06T 11/206 |
| 9,720,408 B2* | 8/2017 | Ramadoss | G05B 19/0428 |
| 9,753,959 B2* | 9/2017 | Birdwell | G06N 3/02 |
| 9,838,272 B2* | 12/2017 | Djukic | H04L 41/5058 |
| 9,848,008 B2 | 12/2017 | Chauhan et al. | |
| 9,876,685 B2* | 1/2018 | Srinivasan | H04L 41/0806 |
| 9,935,858 B1* | 4/2018 | Sanders | H04L 43/0876 |
| 10,003,608 B2* | 6/2018 | Treat | H04L 63/0227 |
| 10,009,364 B2* | 6/2018 | Dasgupta | H04L 63/1416 |
| 10,038,618 B2 | 7/2018 | Bell et al. | |
| 10,061,677 B2* | 8/2018 | Toledano | G06F 11/321 |
| 10,075,360 B2* | 9/2018 | Vasseur | H04L 43/12 |
| 10,079,721 B2* | 9/2018 | Nair | H04L 41/16 |
| 10,095,756 B2* | 10/2018 | Park | G06F 16/9024 |
| 10,135,712 B2* | 11/2018 | Wu | G06F 9/45558 |
| 10,148,489 B2* | 12/2018 | Wu | H04L 41/065 |
| 10,185,708 B2* | 1/2019 | Miller | G06F 16/23 |
| 10,185,933 B2 | 1/2019 | Richardson et al. | |
| 10,193,741 B2* | 1/2019 | Zafer | H04L 41/0631 |
| 10,193,901 B2* | 1/2019 | Muddu | G06N 5/022 |
| 10,200,267 B2* | 2/2019 | Zafer | H04L 47/11 |
| 10,205,632 B2* | 2/2019 | Saavedra | H04L 69/14 |
| 10,250,755 B2 | 4/2019 | Richards et al. | |
| 10,257,750 B2* | 4/2019 | Chakraborty | H04L 41/0654 |
| 10,275,140 B1* | 4/2019 | Miller | G06F 16/447 |
| 10,289,473 B2* | 5/2019 | Mendes | H04L 41/0686 |
| 10,326,796 B1* | 6/2019 | Varadarajan | H04L 63/1425 |
| 10,459,730 B2* | 10/2019 | Nakagawa | G06F 11/3476 |
| 10,528,993 B2 | 1/2020 | Hoang | G06Q 30/04 |
| 10,540,061 B2* | 1/2020 | Ryan | G06F 3/0481 |
| 10,616,072 B1* | 4/2020 | Lo | H04L 41/064 |
| 10,616,378 B2* | 4/2020 | Jenkins | G06F 9/466 |
| 10,642,471 B2* | 5/2020 | Robertson | G06F 3/0482 |
| 10,764,528 B2* | 9/2020 | Ju | H04N 5/23293 |
| 10,778,712 B2* | 9/2020 | Chauhan | G06F 16/25 |
| 10,810,673 B1* | 10/2020 | Prasad | G06Q 40/06 |
| 10,848,510 B2* | 11/2020 | Chauhan | G06F 16/951 |
| 10,891,558 B2* | 1/2021 | Ben Simhon | G06N 20/00 |
| 10,942,641 B2* | 3/2021 | Monte | G06F 3/0488 |
| 2007/0288247 A1* | 12/2007 | Mackay | G06F 16/113 705/1.1 |
| 2008/0294663 A1* | 11/2008 | Heinley | G11B 27/34 |
| 2009/0125331 A1 | 5/2009 | Pamsgaard et al. | |
| 2009/0320047 A1* | 12/2009 | Khan | G06F 9/542 719/318 |
| 2010/0017740 A1 | 1/2010 | Gonzalez Veron et al. | |
| 2011/0113348 A1* | 5/2011 | Twiss | G06Q 10/10 715/753 |
| 2013/0086501 A1* | 4/2013 | Chow | G06F 16/2477 715/772 |
| 2013/0179793 A1* | 7/2013 | Duggan | H04L 41/0604 715/736 |
| 2013/0185315 A1 | 7/2013 | Hao et al. | |
| 2013/0335436 A1* | 12/2013 | Lindsey | G06T 11/206 345/589 |
| 2014/0089816 A1* | 3/2014 | DiPersia | G06F 3/0484 715/753 |
| 2014/0341568 A1 | 11/2014 | Zhang et al. | |
| 2015/0113132 A1 | 4/2015 | Srinivas et al. | |
| 2015/0263885 A1 | 9/2015 | Kasturi et al. | |
| 2016/0034809 A1 | 2/2016 | Wallace et al. | |
| 2016/0092883 A1* | 3/2016 | Weber | G06Q 30/016 705/304 |
| 2016/0110046 A1* | 4/2016 | Yao | G06F 3/0488 715/784 |
| 2016/0239330 A1 | 8/2016 | McBride et al. | |
| 2016/0239932 A1* | 8/2016 | Sidler | H04L 12/1827 |
| 2016/0266752 A1* | 9/2016 | Wu | G06Q 30/016 |
| 2016/0308898 A1 | 10/2016 | Teeple et al. | |
| 2016/0359685 A1 | 12/2016 | Yadav et al. | |
| 2017/0048308 A1 | 2/2017 | Qaisar | |
| 2017/0093910 A1 | 3/2017 | Gukal et al. | |
| 2017/0155961 A1* | 6/2017 | Huo | H04N 21/431 |
| 2017/0237777 A1 | 8/2017 | Joch et al. | |
| 2017/0295078 A1 | 10/2017 | Medas et al. | |
| 2018/0031823 A1 | 2/2018 | Carminati et al. | |
| 2018/0060135 A1 | 3/2018 | Lacey et al. | |
| 2018/0069749 A1 | 3/2018 | Singhal et al. | |
| 2018/0084010 A1 | 3/2018 | Aji et al. | |
| 2018/0095621 A1* | 4/2018 | Ryan | G06T 11/206 |
| 2018/0095938 A1* | 4/2018 | Monte | G06F 3/0488 |
| 2018/0109975 A1 | 4/2018 | Kalliola et al. | |
| 2018/0217917 A1 | 8/2018 | Hayter et al. | |
| 2018/0219751 A1 | 8/2018 | Cavuto et al. | |
| 2018/0219879 A1 | 8/2018 | Pierce | |
| 2018/0248905 A1 | 8/2018 | Côté et al. | |
| 2018/0253195 A1* | 9/2018 | Van Osten | H04L 67/22 |
| 2018/0288126 A1 | 10/2018 | Smart et al. | |
| 2018/0316743 A1 | 11/2018 | Pasupuleti | |
| 2018/0322385 A1 | 11/2018 | Yehezkel Rohekar et al. | |
| 2018/0357276 A1 | 12/2018 | Ding et al. | |
| 2018/0365090 A1* | 12/2018 | Ben Simhon | H04L 43/16 |
| 2019/0041824 A1 | 2/2019 | Chavez et al. | |
| 2019/0041835 A1 | 2/2019 | Cella et al. | |
| 2019/0123981 A1 | 4/2019 | Johanson et al. | |
| 2019/0124577 A1 | 4/2019 | Li et al. | |
| 2019/0132363 A1 | 5/2019 | Faynberg et al. | |
| 2019/0146477 A1 | 5/2019 | Cella et al. | |
| 2019/0173898 A1 | 6/2019 | Bharrat et al. | |
| 2019/0182213 A1 | 6/2019 | Saavedra et al. | |
| 2019/0199599 A1 | 6/2019 | Zavesky et al. | |
| 2019/0200216 A1 | 6/2019 | Itman et al. | |
| 2019/0222594 A1 | 7/2019 | Davis, III et al. | |
| 2020/0233774 A1* | 7/2020 | Toledano | G06F 16/288 |
| 2020/0356229 A1* | 11/2020 | Pelloin | H04L 67/22 |
| 2021/0089917 A1* | 3/2021 | Simhon | G06N 3/08 |

FOREIGN PATENT DOCUMENTS

| | | |
|---|---|---|
| CN | 102801587 A | 11/2012 |
| CN | 103973663 A | 8/2014 |
| CN | 105515180 A | 4/2016 |
| CN | 103944757 B | 11/2017 |
| CN | 107332712 A | 11/2017 |
| CN | 108353027 A | 7/2018 |
| CN | 108898015 A | 11/2018 |
| CN | 109257240 A | 1/2019 |
| CN | 208835838 U | 5/2019 |
| CN | 109845192 A | 6/2019 |
| CN | 109951420 A | 6/2019 |
| CN | 110024340 A | 7/2019 |

(56) References Cited

FOREIGN PATENT DOCUMENTS

| EP | 3433977 A1 | 1/2019 |
|----|------------|--------|
| EP | 3462794 A1 | 4/2019 |
| EP | 3491783 A2 | 6/2019 |
| EP | 3494668 A1 | 6/2019 |
| EP | 3503599 A1 | 6/2019 |
| WO | 2017144397 A1 | 8/2017 |
| WO | 2018044955 A1 | 3/2018 |

OTHER PUBLICATIONS

Zhao et al., KronoMiner: Using Multi-Foci Navigation for the Visual Exploration of Time-Series Data, May 7-12, 2011, CHI 2011, Vancouver, BC, Canada.
Pentikousis et al., MobileFlow: Toward Software-Defined Mobile Networks, Jul. 31, 2013, IEEE Communications Magazine.
Bujlow, A method for classification of network traffic based on C5.0 Machine Learning Algorithm, Dec. 31, 2012, Aalborg East, Denmark.
Shin et al., CloudWatcher: Network Security Monitoring Using OpenFlow in Dynamic Cloud Networks (or: How to Provide Security Monitoring as a Service in Clouds?), Dec. 31, 2012, Texas, United States.
Yamanishi et al., Dynamic Syslog Mining for Network Failure Monitoring, Dec. 31, 2012, Kawasaki, Japan.
Bari et al., Dynamic Controller Provisioning in Software Defined Networks, Dec. 31, 2013, Waterloo, Canada.
Kim, Improving Network Management with Software Defined Networking, Feb. 28, 2013, IEEE Communications Magazine.
Netscout, Granted Patent for Adaptive Session Intelligence Technology, Mar. 19, 2014, Westford, Massachussets. Retrieved from the internet on Aug. 11, 2020: https://www.netscout.com/news/press-release/adaptive-session-intelligence.

\* cited by examiner

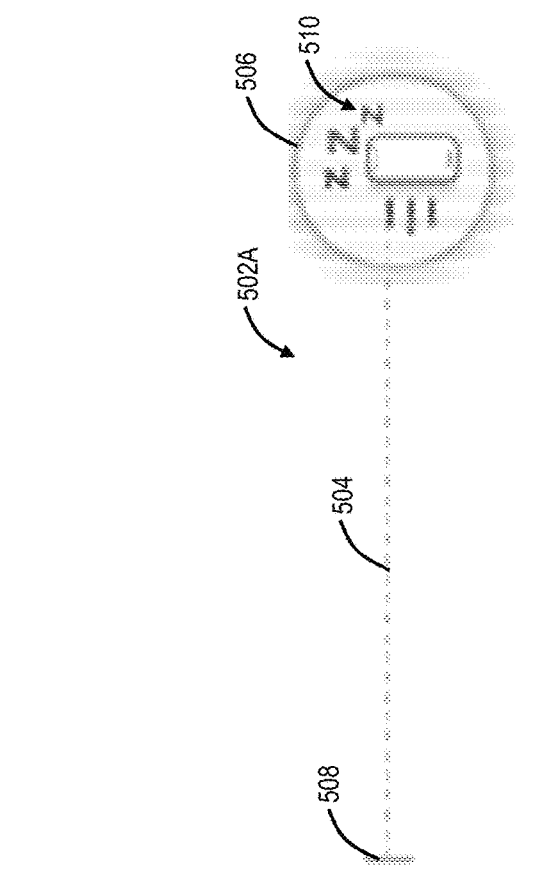
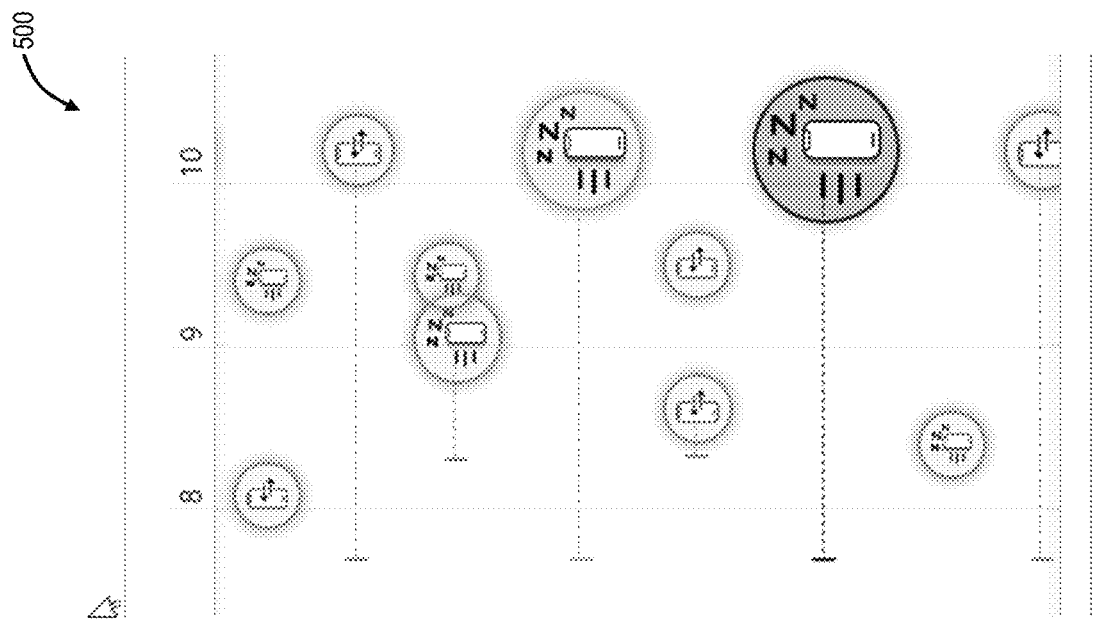
FIG. 5B
FIG. 5C 530  510                              520

> ☑ ••• none

> ☑ 📱 VoIMS

> ☑ 📱 CS Voice

> ☑ 📱 Data Bearer

> ☑ 📱 SMS

> ☑ 📱 Idle Mobility

> ☑ 📱 Registration

> ☑ 📱 Roaming Registration

> ☑ Service TWAMP

> ☑ Service HTTP

> ☑ Service MOS

> ☑ Service Source Availability

FIG. 6

TIMELINE VISUALIZATION AND INVESTIGATION SYSTEMS AND METHODS FOR TIME LASTING EVENTS

CROSS-REFERENCE TO RELATED APPLICATION(S)

The present disclosure claims priority to U.S. Provisional Patent Application No. 62/924,949, filed Oct. 23, 2019, U.S. Provisional Patent Application No. 62/855,245, filed May 31, 2019, U.S. Provisional Patent Application No. 62/854,712, filed May 30, 2019, and U.S. Provisional Patent Application No. 62/844,881, filed May 8, 2019, the contents of each are incorporated by reference in their entirety.

FIELD OF THE DISCLOSURE

The present disclosure generally relates to graphical visualization systems and methods. More particularly, the present disclosure relates to timeline visualization and investigation systems and methods for time lasting events with severity, urgency, and/or impact, such as for network alarms and events in the context of service assurance and remediation using an intelligent alarm tool.

BACKGROUND OF THE DISCLOSURE

Various management and monitoring systems produce a large amount of real-time data that is simply too much for a user to comprehend or efficiently process without significant expertise. As described herein, the management and monitoring systems may include network management systems, financial monitoring systems, or any system that performs some management or monitoring of an underlying system or network having time lasting events that have associated severity, urgency, and/or impact on end users. The real-time data may include telemetry data, alarms, warnings, Performance Monitoring (PM) data, events, transactions, Operations Support System (OSS) data, data from passive and/or active probes, etc. The general objective of management and monitoring systems is for users (e.g., operators, technicians, etc.) to detect service interruption or issues, investigate such service interruption or issues, and provide remediation, i.e., service assurance. Of course, the objective is to simplify the investigation, identify and prioritize events, and utilize resources effectively.

Computer visualization relates to processing and presenting information in a Graphical User Interface (GUI) in an easily understood manner, i.e., for a human operator. These techniques are important as the amount of data any system or network generates far exceeds the amount a user can process. A goal of visualization is to present information in an easy and digestible manner. In networking, for example, there are various network management techniques for the display of alarms and network events. However, these conventional techniques typically require expertise from the operators, do not provide high-level insights, and are not helpful in the context of service assurance, e.g., remediating issues based on their underlying impact on users. As described herein, service assurance, in telecommunications, is the application of policies and processes by a service provider to ensure that services offered over networks meet a service quality level for an optimal subscriber experience.

With large systems, e.g., large networks, in conventional timeline visualization systems and methods, there are simply too many events to display and too much information about these events that come in sporadically. This presents a challenge to display this information to allow the technician to select the right priority for each one. There is a need for improvements in visualizing and investigating time lasting events based on severity, urgency, and/or impact.

BRIEF SUMMARY OF THE DISCLOSURE

In an embodiment, a method and computer-readable medium includes instructions that, when executed, cause a processor to perform steps, including, responsive to obtaining data related to one or more events occurring during operation of a system, displaying time-dependent information about a time-based component of the one or more events on a timeline; displaying fixed information about a timeless component of the one or more events on the timeline; and, responsive to user input to modify a timescale of the timeline, adjusting display of the timeline by adjusting the time-dependent information of the one or more events and maintaining the fixed information of the one or more events. The events can be, for example, anomalies obtained through anomaly detection of system data. The time-dependent information for each of the one or more events can be a start time, one of an end time and a current time, and a duration. The fixed information for each of the one or more events can include any of a category, a severity, an impact, and a group. The time-dependent information can be displayed for each of the one or more events as a duration line that spans a duration, and that always displays at least an end time of each event.

The fixed information can be displayed for each of the one or more events as a placeholder located at one of an end time for a closed event and a current time for an open event. The placeholder can be a circle or a bubble with a center located at the one of the end time and the current time. The fixed information can be visually conveyed via any of an icon or image located on, within, or over the placeholder for each event, a relative size of the placeholder for each event, color or shading of the placeholder for each event, and a physical shape of the placeholder for each event. A physical shape can be used to make a distinction between the type of data source and is especially interesting when the system uses several data sources, like passive probe alarms with a circle shape and active testing with square shapes.

The instructions that, when executed, can further cause the processor to perform the steps of displaying additional information about a specific event responsive to a command to support further investigation of the specific event, wherein the additional information includes at least one of a detail of each subcase of the specific event, a graph of a raw signal for the specific event, a graphical diagnosis representation, and a geographical location representation of the specific event. A horizontal axis of the timeline can represent time, and a vertical axis can have no value, and wherein multiple events that do not overlap in time can be stacked at different locations. The system can be a telecommunications network, and the fixed information can include at least a category of each event and any of a severity based on a combination of duration and number of impacted elements (such as subscribers).

In another embodiment, an apparatus includes a processor and memory comprising instructions that, when executed, cause the processor to, responsive to obtaining data related to one or more events occurring during operation of a system, display time-dependent information about a time-based component of the one or more events on a timeline; display fixed information about a timeless component of the one or more events on the timeline; and, responsive to user input to modify a timescale of the timeline, adjust display of the timeline by adjusting the time-dependent information of the one or more events and maintaining the fixed information of the one or more events. The time-dependent information for each of the one or more events can be a start time, one of an end time and a current time, and a duration. The fixed information for each of the one or more events can include any of a category, a severity, an impact, and a group. The time-dependent information can be displayed for each of the one or more events as a duration line that spans a duration, and that always displays at least an end time of each event.

The fixed information can be displayed for each of the one or more events as a placeholder located at one of an end time for a closed event and a current time for an open event. The instructions that, when executed, can further cause the processor to perform the steps of displaying additional information about a specific event responsive to a command to support further investigation of the specific event, wherein the additional information includes at least one of a detail of each subcase of the specific event, a graph of a raw signal for the specific event, a graphical diagnosis representation, and a geographical location representation of the specific event. A horizontal axis of the timeline can represent time, and a vertical axis can have no value, and wherein multiple events that do not overlap in time can be stacked at different locations. The system can be a telecommunications network, and the fixed information for each of the one or more events includes any of a category, a severity, an impact, a data source type, a group status (single/correlated), a pending status (ongoing/ended), a notification status (no notification/has notification)

BRIEF DESCRIPTION OF THE DRAWINGS

The present disclosure is illustrated and described herein with reference to the various drawings, in which like reference numbers are used to denote like system components/ method steps, as appropriate, and in which:

FIGS. 5A-5G are various screenshots of a timeline provided by the intelligent alarm system of FIG. 1;

FIG. 6 is a screenshot of example images that are icons representing example categories for the events, for an example telecom network implementation;

DETAILED DESCRIPTION OF THE DISCLOSURE

Figure 1:
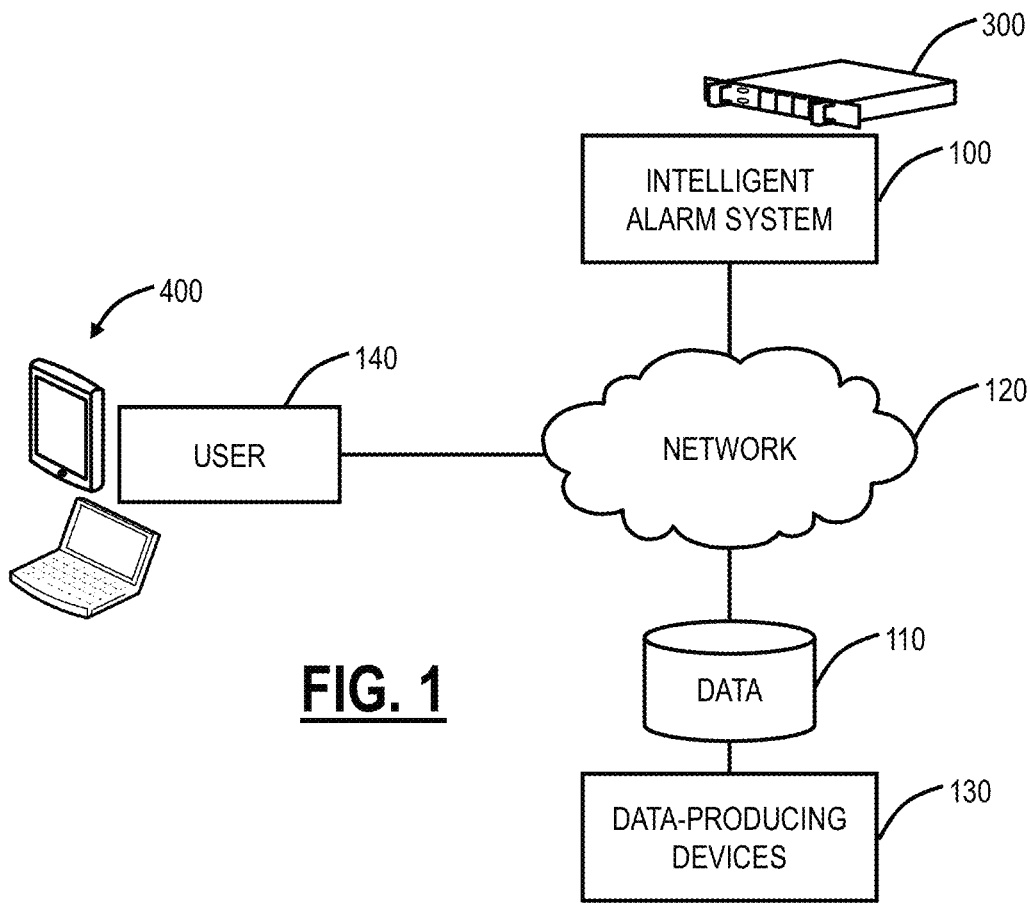
FIG. 1 is a block diagram of an intelligent alarm system for implementing the timeline visualization and investigation systems and methods.

The present disclosure relates to a timeline visualization and investigation systems and methods for time lasting events with severity, urgency, and/or impact, such as for network alarms and events in the context of service assurance and remediation using an intelligent alarm tool. The timeline visualization and investigation systems and methods address simplification of display of the quantity and relevance of near-real-time event data such that a technician can prioritize investigation and remedy actions. The timeline visualization and investigation systems and methods include displaying the information in a set format that allows considering, at one visual glance, time-related data and non-time-related data about the events to rapidly choose which ones to investigate based on a pre-prioritized highlighting scheme.

The systems and methods include graphically displaying events with duration, category, severity, and/or impact in a timeline. The timeline can include real-time information or be produced in a deferred processing mode. Example use cases include, without limitation, alarms and/or outages in a network, attacks such as Denial of Service (DoS) attacks in a network, financial accounts such as uncollectable or doubtful accounts, and the like. The visualization systems and methods display information about cases that are time lasting events. The displayed information enables a user to obtain visual clues related to how long a case lasts or has lasted, which cases are the most severe (which can be a combination of impact and duration), which cases have the most impact what are categories of each case, how do cases compare to one another (e.g., start and end times, duration, severity, category, impact, etc.), and the like.

The term "severity" may also mean "emergency" or "urgency" in the sense this aspect is used to direct the user's attention to cases requiring immediate attention. They may not be "fatal/severe" issues in the telecom meaning of the term, but they should be addressed quickly because the quality of experience of the users on the network will dramatically drop (for example, exponentially) if it is not fixed. For example, in the case of telecon network anomalies as events, the severity is a combination of the impact or duration. For example, a case impacting 1000 subscribers with a duration of 2 seconds may be less severe than a case impacting 200 subscribers with a duration of 2 hours. That is, a case that impacts a lot of users but lasts for a very short time may be less severe than a case that impacts fewer people but lasts a very long time. The urgency to take action by the network technician or emergency of the event is dictated by the severity of the case. The term severity is also used to describe the anomaly detection masks or thresholds. For example, an orange mask is for minor severity, and a red mask is for major severity in the line chart detail window. This is independent from the emergency of the case.

In an example aspect, the visualization systems and methods support zoom, and, regardless of the time scale used for the timeline, fixed information about the events remains always visible. The duration information may become lost is a zoomed-out view, but the placeholder with the fixed information stills appear with its visual characteristics to indicate category, severity, impact, group, etc. In conventional systems and methods, when the timescale is changed to cover a longer period of time, the fixed information about the events can be lost if the duration of an event no longer makes it apparent in the zoomed-out time scale. In the conventional systems and methods, the additional fixed information is displayed into the duration bar or in a tooltip while hovering items. Those two methods are restricted: a first display is zoom dependent because duration bar size changes, such as the place to put labels or icons inside, and the use of tooltip needs to focus on a single item that does not permit comparison between items. The present disclosure removes all these conventional restrictions.

Advantageously, the visualization systems and methods efficient and effective remediation as well as remove expertise from the end users. By efficient and effective remediation, a user can direct remediation efforts (i.e., troubleshooting, etc.) at the events with the highest impact and severity. With respect to expertise, the systems and methods include data analysis, which correlates a large amount of data for display in the timeline, removing the need for the user to perform low-level data analysis. In an embodiment, the timeline visualization and investigation systems and methods can be utilized in a Network Operations Center (NOC) for service assurance and remediation.

System

Figure 3:
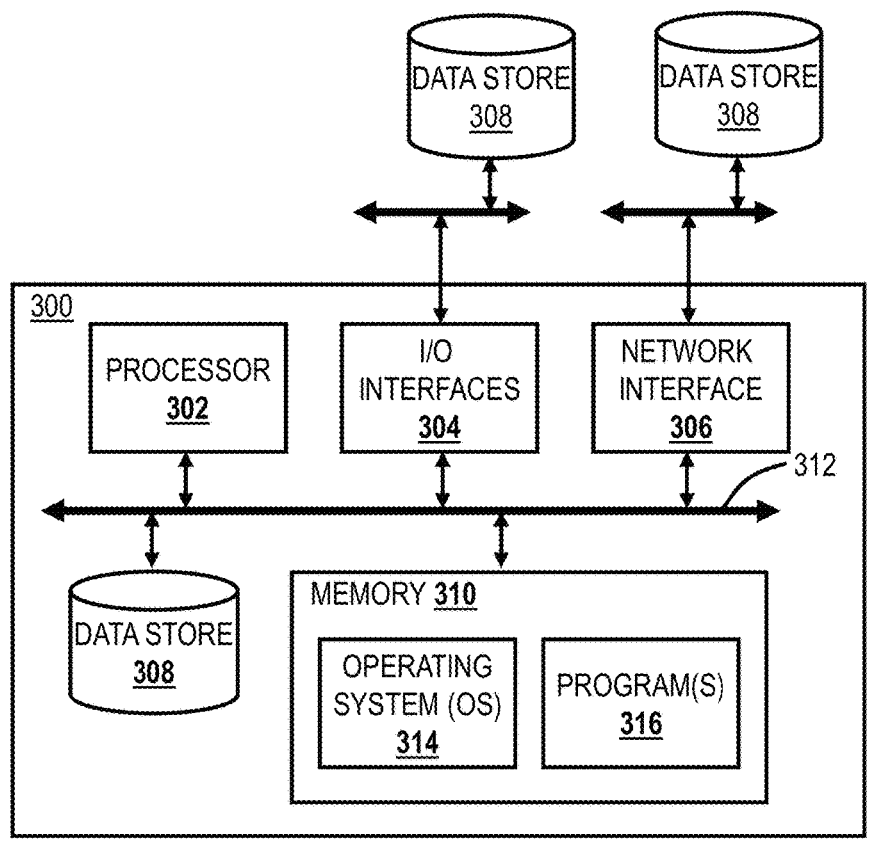
FIG. 3 is a block diagram of a server that may be used in to implement the intelligent alarm system of FIG. 1.

FIG. 1 is a block diagram of an intelligent alarm system 100 for implementing the timeline visualization and investigation systems and methods. The intelligent alarm system 100 can be implemented on a server 300 (an embodiment of the server 300 is illustrated in FIG. 3), multiple servers 300, in the cloud, etc. The intelligent alarm system 100 can be configured to obtain data 110, such as via a network 120, related to the operation of data-producing devices 130. The data 110 may be obtained from, without limitation, a Network Management System (NMS), an Element Management System (EMS), an Operations Support System (OSS), a Software-Defined Networking (SDN) controller, an SDN application, a database, one or more servers, etc. The network 120 may include the Internet, a Wide Area Network (WAN), a Local Area Network (LAN), a Virtual LAN (VLAN), and the like as well as combinations. The data 110 can be in a database or the like and obtained from various data-producing devices 130, which ultimately produce the data used by the intelligent alarm system 100.

In a networking example, the data-producing devices 130 may include network elements or nodes such as switches, routers, terminals, repeaters, aggregation devices, etc. That is, the network elements or nodes may include any devices in a network responsible for some aspect of data processing, switching, and/or transmission. In a financial monitoring example, the data-producing devices 130 may include servers responsible for financial processing. Again, the data from the data-producing devices 130 may include telemetry data, alarms, warnings, PM data, events, etc. This data can be real-time or near real-time (e.g., minutes old). In the networking example, PM data is usually provided real-time as well as in 15 minute and 24-hour increments. Further, alarms and warnings are provided immediately upon detection. Similarly, in the financial example, alarms and warnings can be provided immediately upon detection.

Figure 4:
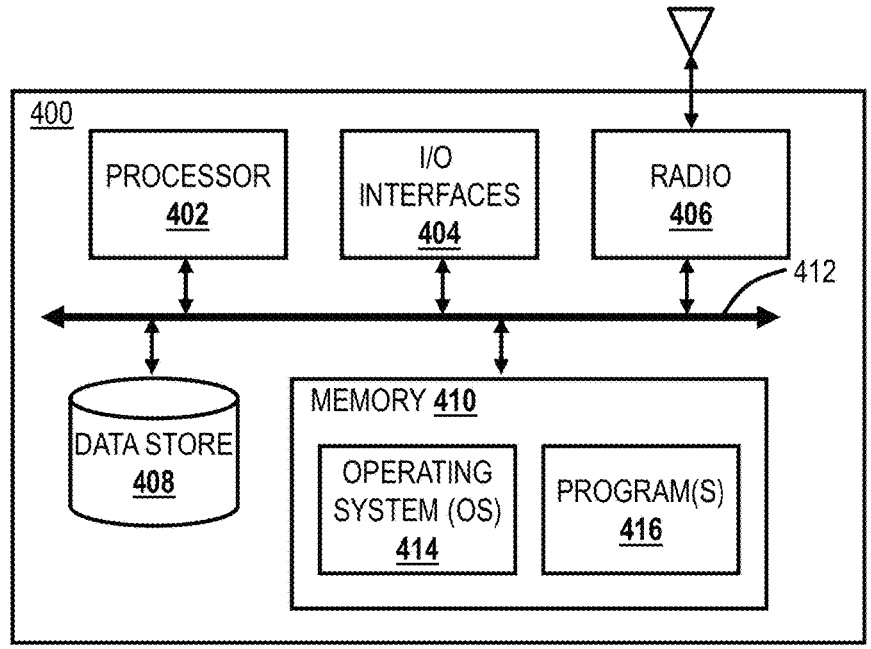
FIG. 4 is a block diagram of a user device that may connect to the intelligent alarm system of FIG. 1.

A user 140, via a user device 400 (an embodiment of the user device 400 is illustrated in FIG. 4), connects to the intelligent alarm system 100 for the display of a Graphical User Interface (GUI) that includes a timeline visualization of time lasting events from the data 110. In an embodiment, the user device 400 may be in a Network Operations Center (NOC) or the like. The intelligent alarm system 100 can provide a Web application to the user device 400 for interaction. For example, the Web application can include a main page for case information, which can lead to detailed pages upon selections by the user 140.

As described herein, the intelligent alarm system 100 is illustrated with example usage in networking or financial monitoring, but those of ordinary skill in the art will recognize the present disclosure contemplates usage in any application where time lasting events occur having associated severity and impact. The intelligent alarm system 100 is configured to obtain the data 110, process the data 110, and provide a timeline visualization for investigation of events. Specifically, the intelligent alarm system 100 provides a graphical display of a timeline with events (determined based on the data 110) with associated duration, category, severity, and/or impact.

A timeline is a two-dimensional visualization that includes a horizontal axis representing time and a vertical axis. As described herein, the vertical axis does not convey information, but rather is used to display multiple events simultaneously. As described herein, an event of the timeline is referred to as a case. That is, a case is an event determined in the data 110 that has a duration, category, severity, and/or impact. The terms "case" and "event" may be used interchangeably with respect to the timeline. Each case can have a different category, and each case can also include multiple subcases. As described herein, a case is a way to provide details of what a particular event on the timeline relates to, i.e., a category. Examples of cases include:

In a telecom network, each case can be a correlation of issues in the network. The subcases can all be related to the associated case, and the impact can be a number of distinct impacted subscribers.

Also, in a network for a Denial of Service (DoS) attack, the impact, in this case, can be the number of incoming Internet Protocol (IP) addresses.

For financial monitoring and an uncollectable/doubtful account, the impact can be the amount of money owed.

Also, as described herein, a dimension is an information type linked to an event. Each event can have several characteristics, and the dimension is used for the display, mapping those dimensions (source, duration, category, impacted subscribers, emergency, status) on a display scheme with capabilities (shape, dotted line length, bubble size, color, icons, flashing animations, etc.). This disclosure relates to these mapping capabilities and the time scale capabilities. The terms "category" is one possible dimension, namely a service category linked to a case, and it is mapped based on an icon scheme (e.g., voice, IMS, data, etc.). For a telecom network, dimensions could be "cell," "service," etc. For the DoS attack example, dimensions possible values could be "server type," "server function," etc. For the uncollectable/doubtful account example: dimensions could be "customer rank," "customer profession," etc.

The present intelligent alarm system 100 displays information about the cases, allowing a user 140 to obtain information related to how long the cases last, which are the most severe cases (long duration and high impact), which cases have the most impact, what is the main category (dimension) of a case, how do the cases compare to one another (start and end times, duration, severity, category, impact), etc.

The intelligent alarm system 100 can analyze and process the data 110 via a processing engine that includes rules that produce the cases from the data 110. Again, the data 110 can include telemetry data, alarms, warnings, PM data, events, OSS data, data from passive and/or active probes, data from external feeds, etc. That is, the data 110 can be counters or some other health indicator. The rules enable the generation of events (cases) that indicate abnormal activity in the data 110. Abnormal activity means there is something amiss in the data 110. In the networking example, this includes cases where some end users (subscribers) are being impacted. In the financial example, this can include cases where some accounts are uncollectable, past due, etc. The timeline display is specially adapted to anomalies as events, but this mapping is not mandatory. Events of other nature like 'calendar' events (that are not results of anomaly detection algorithms) could be displayed with this timeline.

The intelligent alarm system 100 can analyze and process the data 110 to correlate cases if there is a determination that their related signals are sufficiently correlated in time that there is a high probability that anomalies are linked. This correlation can be solely based on the co-occurrence of the events in time. Events or cases can, therefore, be groups of correlated subcases. The contents of the selection and correlation rules and their criteria can utilize various processing techniques, including machine learning, statistics tests, dimensions locations coherence (like cell locations), telecom diagnosis consistency, etc. The intelligent alarm system 100 produces cases from the data 110 for presentation via the visualization systems and methods. The user 140 can be a technician who has, for example, been tasked with monitoring and surveillance of the data 110 for eventual reporting and/or action taking.

Process

Figure 2:
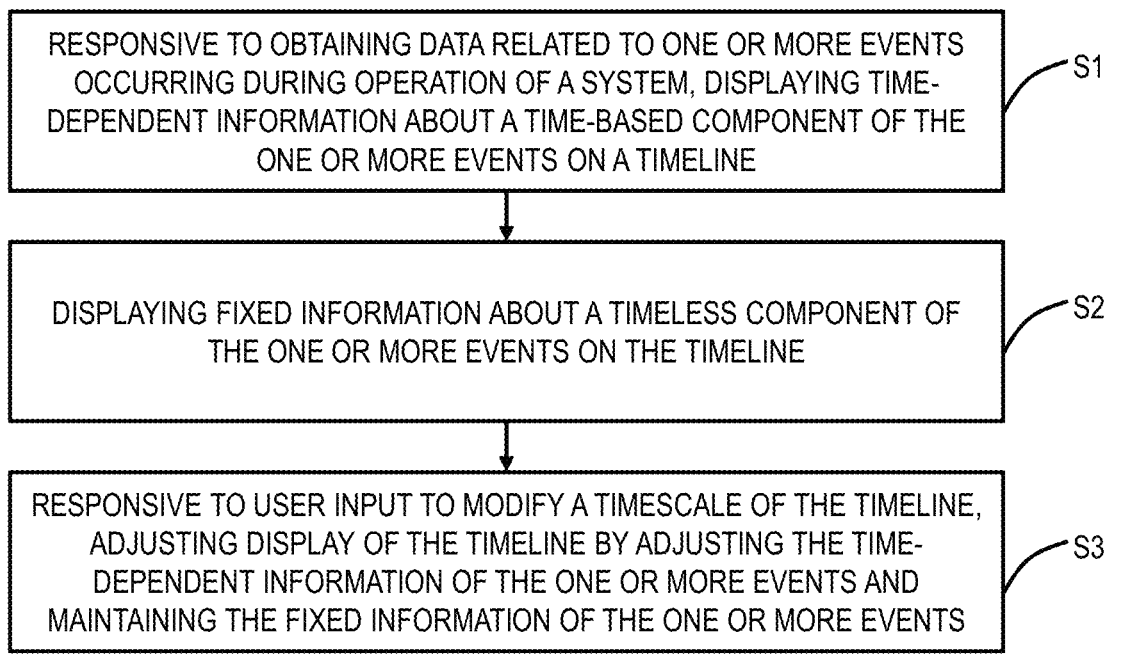
FIG. 2 is a flowchart of a process for timeline visualization and investigation.

FIG. 2 is a flowchart of a process 200 for timeline visualization and investigation. The process 200 includes, responsive to obtaining data related to one or more events occurring during operation of a system, displaying time-dependent information about a time-based component of the one or more events on a timeline (step S1); displaying fixed information about a timeless component of the one or more events on the timeline (step S2); and, responsive to user input to modify a timescale of the timeline, adjusting display of the timeline by adjusting the time-dependent information of the one or more events and maintaining the fixed information of the one or more events (step S3).

The time-dependent information for each of the one or more events can include a start time, one of an end time and a current time, and a duration. The fixed information can include for each of the one or more events any of a category, a severity, an impact, and a group. The time-dependent information can be displayed for each of the one or more events as a duration line that spans a duration, and that always displays at least an end time of each event.

The fixed information can be displayed for each of the one or more events as a placeholder located at one of an end time for a closed event and a current time for an open event. The placeholder can be a circle or a bubble with a center located at the one of the end time and the current time. The fixed information can be visually conveyed via any of an icon or image located on, within, or over the placeholder for each event, a relative size of the placeholder for each event, color or shading of the placeholder for each event, and a physical shape of the placeholder for each event. A physical shape can be used to make a distinction between the type of data source and is especially interesting when the system uses several data sources, like passive probe alarms with a circle shape and active testing with square shapes.

The process 200 can further include displaying additional information about a specific event responsive to a command to support further investigation of the specific event, wherein the additional information includes at least one of a detail of each subcase of the specific event, a graph of a raw signal and threshold signals for the specific event, a graphical diagnosis representation, and a geographical location representation of the specific event.

A horizontal axis of the timeline can represent time, and a vertical axis can have no value, and wherein multiple events that do not overlap in time are stacked at different locations. The system can be a telecommunications network, and the fixed information can include at least a category of each event and any of a severity, and an impact, based on a duration and a number of impacted subscribers for each event.

In another embodiment, an apparatus includes a processor and memory comprising instructions that, when executed, cause the processor to, responsive to obtaining data related to one or more events occurring during operation of a system, display time-dependent information about a time-based component of the one or more events on a timeline; display fixed information about a timeless component of the one or more events on the timeline; and, responsive to user input to modify a timescale of the timeline, adjust display of the timeline by adjusting the time-dependent information of the one or more events and maintaining the fixed information of the one or more events.

In a further embodiment, a non-transitory computer-readable medium comprising instructions that, when executed, cause a processor to perform the steps of, responsive to obtaining data related to one or more events occurring during operation of a system, displaying time-dependent information about a time-based component of the one or more events on a timeline; displaying fixed information about a timeless component of the one or more events on the timeline; and, responsive to user input to modify a timescale of the timeline, adjusting display of the timeline by adjusting the time-dependent information of the one or more events and maintaining the fixed information of the one or more events.

Example Server Architecture

FIG. 3 is a block diagram of a server 300, which may be used in to implement the intelligent alarm system 100. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chipset), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. The user input may be provided via, for example, a keyboard, touchpad, and/or a mouse. System output may be provided via a display device and a printer (not shown). I/O interfaces 304 may include, for example, a serial port, a parallel port, a Small Computer System Interface (SCSI), a Serial ATA (SATA), a fiber channel, InfiniBand, iSCSI, a PCI Express interface (PCI-x), an Infrared (IR) interface, a Radio Frequency (RF) interface, a Universal Serial Bus (USB) interface, or the like.

The network interface 306 may be used to enable the server 300 to communicate over the network 120, etc. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300, such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein, such as with respect to the intelligent alarm system 100.

Example User Device Architecture

FIG. 4 is a block diagram of a user device 400, which may connect to the intelligent alarm system 100. The user device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the user device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the user device 400, a semiconductor-based microprocessor (in the form of a microchip or chipset), or generally any device for executing software instructions. When the user device 400 is in operation, the processor 402 is configured to execute software stored within the memory 410, to communicate data to and from the memory 410, and to generally control operations of the user device 400 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like. The I/O interfaces 404 can include a graphical user interface (GUI) that enables a user to interact with the user device 400.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G, etc.); magnetic induction; satellite data communication protocols; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end-user functionality with the user device 400. For example, example programs 416 may include a web browser to connect with the server 300 for displaying a GUI related to the intelligent alarm system 100, a dedicated application for displaying a GUI related to the intelligent alarm system 100, and the like.

Timeline Visualization

Figure 5A:
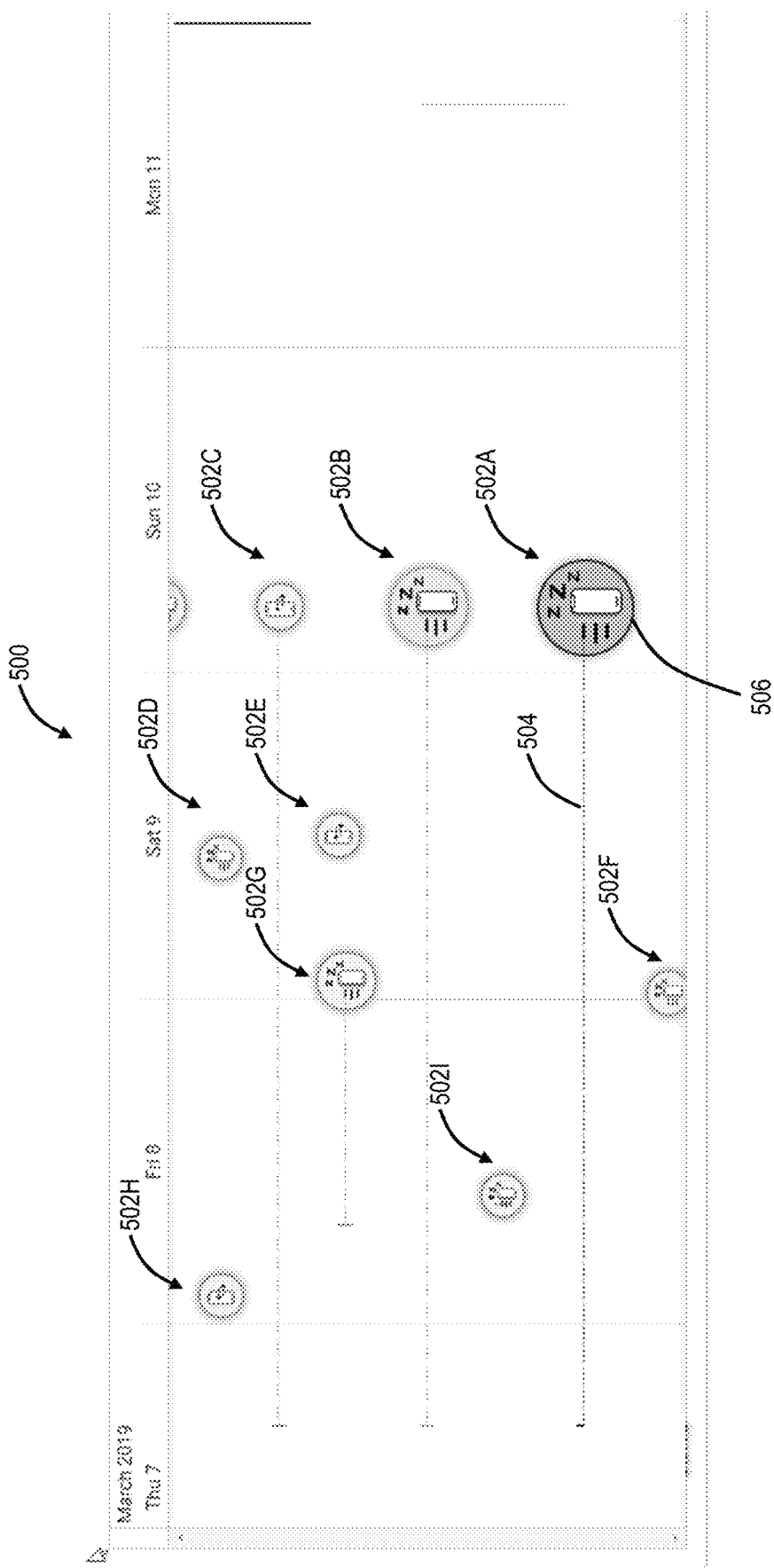

FIGS. 5A-5G are various screenshots of a timeline 500 provided by the intelligent alarm system 100. The intelligent alarm system 100 is configured to provide the timeline 500 to display various time lasting events with severity and impact. In the example of FIG. 5A, the timeline 500 includes nine events 502 (labeled as events 502A-502I), and the current time is in the afternoon of Saturday the $9^{th}$. FIG. 5B illustrates the event 502A extracted out of the timeline 500 in FIG. 5A. The events 502 have a duration (a continuous duration between a start time and an end time) that are visualized by a line 504. For example, the event 502A started early on Thursday the $7^{th}$ and continues to the current time (afternoon of Saturday the $9^{th}$), the event 502G started later on Thursday the $7^{th}$ and ended mid-day on Friday the $8^{th}$, and the event 402E started and ended early on Saturday the $9^{th}$. That is, the displayed line 504 marks the start time and the end time of the corresponding event 502.

The timeline 500 includes past and ongoing events 502. A refresh can be done periodically (automatically and/or manually) to update the timeline 500 with the most up-to-date data about the events. The timeline 500 display will adjust accordingly. The horizontal axis (x-axis) of the timeline 500 represents time. The vertical axis (y-axis) of the timeline 500 does not have a value, but rather some events 502 that do not overlap in time are stacked where possible to maximize the information displayed. For example, the events 502H, 502D, the events 502G, 502E, etc. are displayed at the same level on the vertical axis since these events 502 do not overlap in time. Thus, it is possible to display some of these events 502 on the same level on the vertical axis, i.e., past events. That is, the timeline 500 can stack multiple events 502 horizontally to display more information where stacked events 502 do not overlap in time.

Some of the events 502, such as the events 502D, 502E, 502F, 502H, do not display a line as their start time and end time is obscured by a placeholder 506 representing the event 502. The placeholder 506 is utilized in the timeline 500 to convey other characteristics of each event 502, including category, severity, impact, etc. The timeline 500 can be compressed or stretched in time (horizontal axis), with the duration display adapting to the newly commanded time scale. As such, the events 502D, 502E, 502F, 502H may then display a corresponding line 504 if the horizontal axis is zoomed in, whereas other events 502 may lose their corresponding lines 504 if the horizontal axis is zoomed out. For example, the lines 504 may be omitted where, at a current zoom level, the corresponding duration is not significant compared to others.

The other characteristics, which are not time-dependent (i.e., a timeless component), are displayed as information in a static fashion (fixed information) as part of the placeholder 506, regardless of the time scale. For example, the placeholder 506 may be a circle. For example, the circle was chosen as the preferred shape for the placeholder 506 because the user 140 would readily understand that the location of the center of the circle on the timeline 500 is itself a piece of information and a dimension of the display, namely the center of the circle is the end time of the event. If a square is used, the center of the square represents the end time. Therefore, there is a preference for a bubble or circle. However, the placeholder 506 can be other shapes, e.g., a square, rectangle, etc., as well as other forms. Shapes are used to make the distinction between different types of data sources (called families). The link between a shape and a family is done by configuration. In the case of a single data source, the circle may be the best choice. Note that when a case is not finished yet (opened case), the next refresh of the data in the timeline may change the characteristics of the case, and change them according to color/icon/size. For example, an open case can have a circle size growing if more and more subscribers are impacted during the current time. So, the notion of 'not time-dependent' placeholder characteristics refers to the zoom actions of a user on the timeline between 2 data refresh but does not take into account the data refresh potential characteristics due to real-time system feed (especially with ongoing cases).

Zooming in and out does not affect the display of non-time-related data about the events, i.e., the placeholder 506, it only affects the display of some of the time-related data of the event, e.g., the line 504. The duration and start time are lost if the timescale is completely zoomed out, but the end time remains as the center of the placeholder 506, and the non-time-related data (category, impact, severity, importance, groups, etc.) remain visible in/via the placeholder 506 itself.

Also, the placeholder 506 can add another dimension with different shapes used to convey different data sources types. That is, the shape of the placeholder 506 could vary depending on yet another non-time-related characteristic of the event. This could be especially useful when several types of data sources co-exist, such as passive probe alarms and active testing alarms.

Further, the placeholder 506 should be located at the end time (of a closed event) or the current time (of an open event) as zooming in and out or changing the time window could remove the display of the placeholders 506 of some events. As the placeholder 506 is fixed information, it should always be displayed for a time of interest in the timeline 500, based on a current zoom (Especially for ongoing events, the placeholder is located at the current time). That is, in prior art systems, placing the placeholder at the start of an event or on the line 504 may cause this fixed information not to be displayed at a particular zoom or time of interest. The objective of the timeline 500 is to visually display events with both the time-dependent information and the fixed information in the time window as selected by the user 140.

For example, assume an event started yesterday and continues today. If the time window is just today, the placeholder 506 for this event would be omitted if it is displayed at the start time.

In general, conventionally, it is difficult to prioritize information on a timeline visually. For example, listings are typically lines and look the same, with the main difference being the length as a view is zoomed in and out. That is, a conventional timeline focuses visually on the longest-lasting events, not necessarily the most severe, important, and/or impactful. The placeholder 506 remedies this problem as it is fixed independent of zoom and further enables the display of visual characteristics in addition to the duration (e.g., via the line 504). As described herein, the placeholder 506 enables the visual display of multiple dimensions, instead of simply duration via the line 504. The placeholder 506 can include any or all of an icon or image located on, within, or over the placeholder for each event; different relative size for each event; different color for each event; different shading or flashing status for each event; and a different physical shape for each event. Finally, a single/double shape's border scheme can be used to indicate that a case contains one or several subcases correlated. In this manner, the timeline 500 can not only display duration via the line 504, but any or all of a category, a severity, an impact, and a group, for each event. As well, the placeholder 506 is fixed information, so it is displayed independent of the duration of any event, as to visually display severe, important, and/or impactful events regardless of duration.

In an embodiment, the timeline 500 can include seven aspects for displaying the events 502, namely a time scheme representing the start time, the end time, and the duration, a category (dimension) scheme representing the category of the event 502, a severity scheme representing the severity of the event 502, a flashing (animated) scheme representing the status (ongoing, finished) of an event, a shading (animated) scheme representing new user actions (flags, notifications) on an event, a single/double shape's border scheme to identify if correlated subcases are contained in the case or not, and a scheme representing a relative impact between different events 502.

The following describes an example embodiment of the height display schemes. As will be readily understood, other display characteristics (color, size, lines, icons, text, etc.) could be used to represent the four display schemes and display the components of the events 502.

Each event 502 has a corresponding placeholder 506. For example, the placeholder 502 can be a bubble, dot, or circle. The examples of FIGS. 5A-5G utilizes a circle. In an embodiment, a center of the placeholder 506 is located at an end time or a current time for each event 502. That is, for events 502 that have ended (e.g., the events 502D, 502E, 502F, 502G, 502I, 502H), the placeholder 506 is located at the end time of the event 502. For events 502 that are ongoing (e.g., the events 502A, 502B, 502C), the placeholder 506 is located at the current time.

The time scheme can be displayed via the line 502 and can include displaying a start marker 508, for example, a small vertical line, at the event start time, placing the placeholder 506 at the case end time, and displaying a dotted line 504 between the start marker 508 and the placeholder 506 to indicate the duration of the event 502.

The category scheme can be displayed via image 510 superimposed on the placeholder. For example, the image 510 can be an icon, text, etc. In the example timeline 500, a pictogram image 510 (e.g., an icon image) is displayed in or with the placeholder 506 to represent a main category (i.e., one type of dimension) of the event 502. If multiple categories are impacted by the same event 502, the most impacted category can be shown via the image 510. Alternatively, there may be a display of multiple images 510. The GUI can include a filter panel 520 between categories and images 510 (illustrated in FIGS. 5F, 5G, and 6).

The impact scheme can be displayed based on a characteristic of the placeholder 506. For example, the characteristic can be the size of the placeholder 506, i.e., the size of the placeholder 506 is proportional to the specific impacted items (such as subscribers) contained inside the event 502. For example, the placeholder 506 sizes can be a linear scale, with a minimal and maximal size specified in the configuration.

The severity scheme shows the relative emergency of the event 502 and can be displayed using a color. For example, red can be used for the biggest impact, then orange, then gray. The highest severity can be the one with the biggest impact lasting in time. It is a combined impact and duration visualization, which helps to prioritize review of events by the user 140. The placeholder 506 can be colored depending on the severity. Additionally, the dotted duration line 504 and the start marker 508 can also be colored. The placeholder 506 can be filled in with the colors, or the outline of the placeholder 506 can be the only colored component.

The shape scheme indicates the type of data source (e.g., circle for passive probe, square for active testing, triangle, etc.)

The flashing animated scheme (color flash) shows that a case is ongoing. This helps to make a distinction between the ongoing and finished status of cases. This is an additional optional scheme The shading animated scheme (shadow flashing behind the placeholder) shows that a user of the application notified something on the case (user action such as message, or flag). This user action is notified to other users' through the shading scheme. This is an additional optional scheme.

The single/double scheme for shape's border indicates that the case contains one (single border) or several correlated (double border) inside. It helps to find out correlated cases at first sight.

Of course, it should be noted that the timeline 500 could use fewer than all height display schemes. Indeed, the time scheme could be used with at least one of the category scheme, the severity scheme, and the impact scheme. For example, one could determine that in a specific environment, the impact of the event is not necessary to monitor the data. The severity scheme would simply be omitted from the display, for example, by presenting all timeline information in black and white. In another embodiment, one could determine that the category of the event is not relevant and would omit the category scheme, for example, by presenting empty placeholders. In yet another embodiment, one could omit the relative scheme and use color coding as the category display scheme instead of using image icons. In still another embodiment, the severity scheme could be omitted while the relative scheme is kept. Concerning animated schemes (flashing and shading), they could be simply omitted or affected to any other type of status that would need to be notified.

Data Sources

The data source origin can vary for the correlated cases. Indeed, the correlation can be between events coming from different data sources as long as they have the same temporal granularity (they don't need to represent the same type of data). The correlation can, therefore, be from within the same data source or between multiple data sources. The system originally took its data from passive probes installed in the network. However, data from active testing, from fiber monitoring, from topology tools or outside sources (competitor probes or weather/news feeds), can also be compiled and displayed.

For example, a fiber monitoring source can detect a broken fiber and create an event. This broken fiber affects multiple systems and creates multiple events detected by passive probes. These events, although from different sources, can be correlated with that of the fiber monitoring because the similarity between their time-stamped curves will be clear mathematically.

Then, a single correlated placeholder can be used to group all of the events (cause and effects) into a single event on the timeline. Because the shape of the placeholder is normally related to the data source origin, a choice needs to be made. The choice could be to use the shape of the data source, which has priority. Priority could be pre-determined. For example, a passive probe could have priority over a weather feed. Alternatively, the shape could be that of the "root cause" of the event, in this case, the fiber monitoring probe. This requires root cause analysis algorithms. Alternatively, the shape of the data source of the event with more impact and/or severity could be used. In another alternative, a new "combined" shape can be used, such as a rounded square to represent a correlated event coming from a circle and a square data sources.

Timeline Visualization in a Networking Example

The following examples illustrate a specific example embodiment of the timeline 500 with a telecommunications network, specifically a cellular network environment. For example, the cellular network can include various subscribers (end users) with the data-producing devices 130 being related to GSM EDGE Radio Access Network (GERAN), UMTS Terrestrial Radio Access Network (UTRAN) Radio Access Technology (RAT), evolved UTRAN (eUTRAN), etc. The intelligent alarm tool system 100 can be located in the NOC and utilized by the user 140 to identify the events 502 causing the most impact to subscribers. As described herein, the events 502 represent something occurring with respect to the data-producing devices 130 that impacts the subscribers. The events 502 last over time with various severities and are detected by correlating telecom network issues and determining the impacted subscribers. The timeline 500 is a graphical way to display the information and provide a user-friendly approach to investigate network issues with an advanced interactive Graphical User Interface (GUI), referred to as the "network experience timeline." The impact of telecom network issues can typically be represented by the number of impacted subscribers.

Those skilled in the art will recognize the specific example embodiment for the timeline 500 in a cellular network environment is presented for illustration purposes. The timelines 500 contemplates usage in other use cases where there are the events 502 that are time lasting and have severity/impact.

In the example of FIG. 5A, the events are telecom network issues related to the equipment, network, and underlying services. The placeholders 506 are circles with the images 510 included therein to represent the category. FIG. 6 is a screenshot of example images 510 that are icons representing example categories for the events 502. For example, the categories may include Voice over Internet Protocol Multimedia Subsystem (VoIMS), Circuit Switched (CS) Voice, Data Bearer, Short Messaging Service (SMS), Idle Mobility, Registration, Roaming Registration, Service Two-Way Active Measurement Protocol (TWAMP), Service HyperText Transfer Protocol (HTTP), Service Mean Opinion Score (MOS), Service Source Availability, etc. Note, in FIG. 6, the filter panel 520 GUI can include an arrow 530 to expand each category to show associated subcategories (not shown in FIG. 6). Each of these categories represents a problem in the cellular network that needs to be addressed as the problem impacts subscribers. In FIGS. 5A and 5B, the event 502A is of the category "idle mobility," and the impact is the highest within the timeline because it is the biggest circle. The duration is long compared to others, and the severity is red (highest) because the impact and duration are high.

Figure 5D:
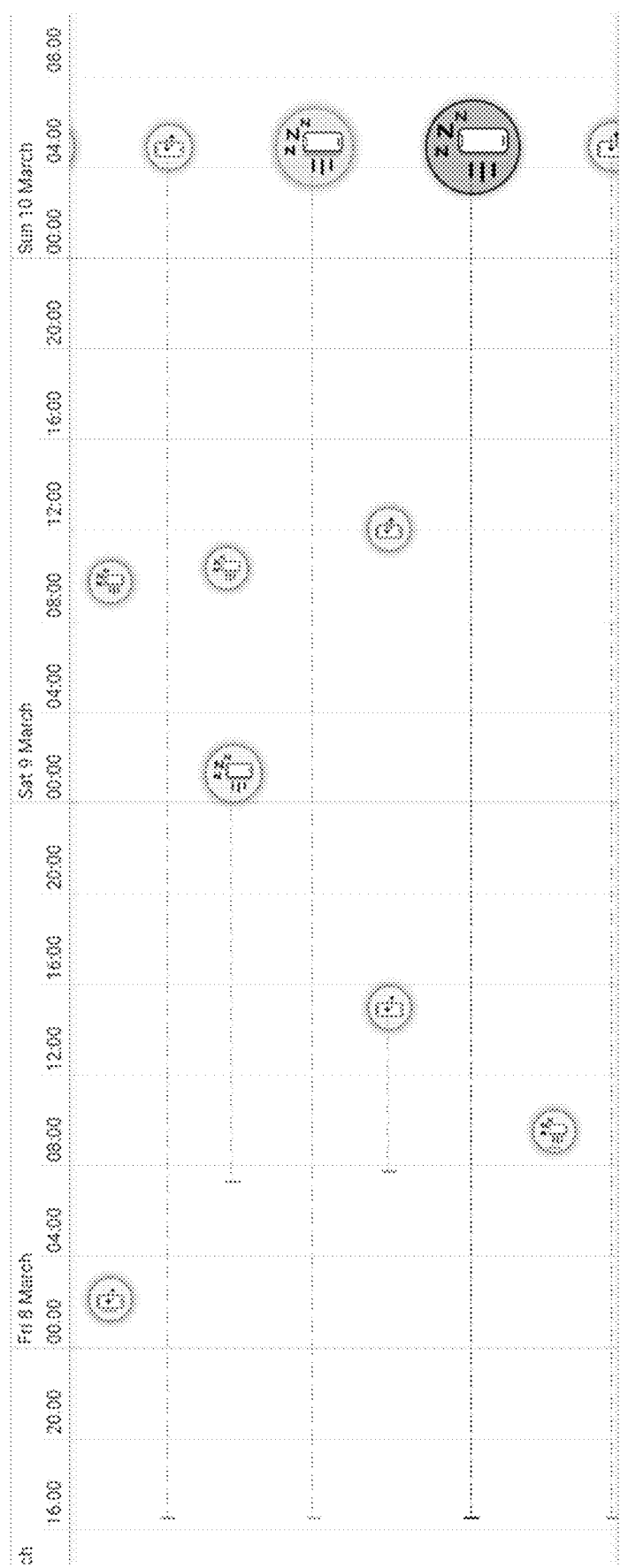

As shown in FIGS. 5C and 5D, it is possible to zoom in and out of the timeline 500 display to change the time scale. In FIG. 5C, a zoomed-out view is shown where a full day, March 8, for example, is compressed to a width of a few centimeters. The respective sizes of the icons, the image on the icon, and the color of the icons are kept, allowing quick visualization of the prioritized events 502. The dotted line showing duration is compressed according to the current time zoom. In FIG. 5D, a zoomed-out view is shown where a full day, again looking at March 8, has a width about six times that of the zoomed-in view of FIG. 5C. A more precise display of the start and stop times of the duration dotted line is made possible. Note that event 502I, whose duration was not visible at a zoom level of FIG. 5D. has become visible at a zoom level of FIG. 5F. Again, all display characteristics for the cases are kept. As will be readily understood, the timescale can be adjusted as needed by the operator and FIG. 5A shows a further example intermediary view.

As will be readily understood, any input mechanism can be provided to allow interaction with the display to cause the zoom in or out. For example, in a traditional mouse/keyboard/screen environment, a magnifying bar or magnifying glass button set can be provided, the zoom function can also be made to react to specific keystrokes. In a touchscreen environment, specific finger gestures can trigger the zoom in and out features.

Figure 5E:
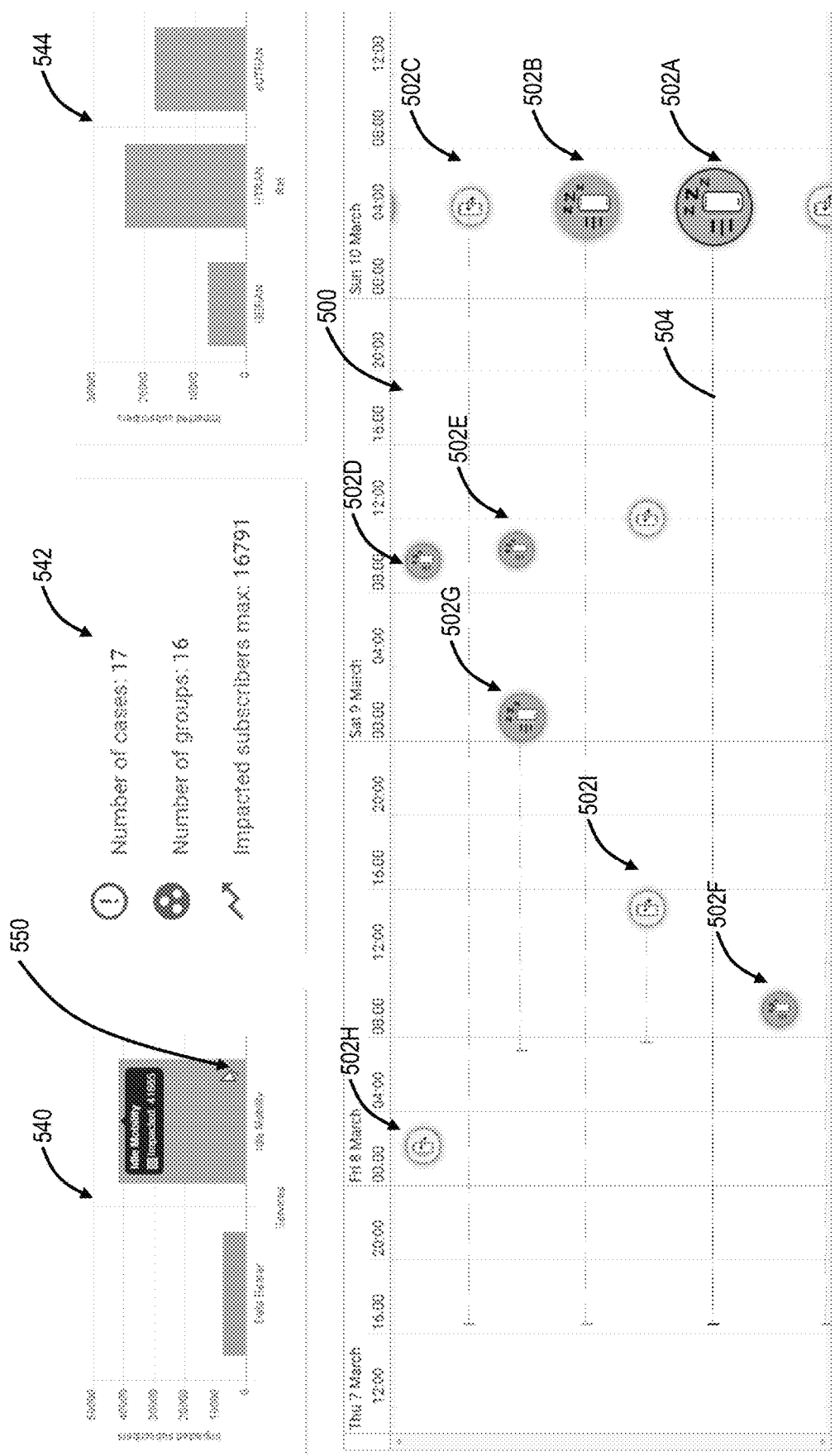

FIG. 5E illustrates a screenshot where the timeline 500 is displayed with additional summary tiles 540, 542, 544. The purpose of the timeline 500 is to visualize events 502 and their duration, severity, and impact. The summary tiles 540, 542, 544 provide a summary view, such as networkwide in the telecom example. The summary tile 540 shows the services with their impacted subscribers. It shows the same information as the timeline 500 in an aggregated version. When a summary bar is selected by hovering a cursor 550 over it, all events 502A, 502B, 502D, 502E, 502F, 502G containing the hovered item are visually highlighted in the timeline below. In the example shown, the cursor 550 hovers over the idle mobility service, and all the idle mobility events 502A, 502B, 502D, 502E, 502F, 502G are highlighted with a green filling.

The summary tile 542 illustrates some statistics, including the number of events 502 in the timeline 500, the number of groups, and the maximum number of impacted subscribers. In this example case, there are 17 cases. Not all 17 cases necessarily appear on the timeline 500 at once, depending on the timescale of the timeline 500 display. In this example, there are 16 groups. Groups can contain one or several sub-cases which have been determined to be correlated and are displayed as single grouped events 502 to simplify the display and support the technician's analysis. In this example, one can, therefore, understand that 17 sub-cases are contained within 16 displayed groups (indeed, one of the groups includes two sub-cases. The maximum number of impacted subscribers is the number of subscribers impacted in the case that has the maximum number of impacted subscribers. It is not a total of the impacted subscribers for all 17 cases of the example but rather the number of subscribers for the case with the highest impact. The distinction can be relevant in situations where the same subscriber is impacted by multiple displayed cases. In this example, 16,791 subscribers are impacted in the most impacting case.

The summary tile 544 illustrates different RAT (Radio Access Technology) with their impacted subscribers (RAT is an additional dimension of cases that have no direct correspondence of display in the timeline, but is contained in the data. Possible values for RAT are GERAN, eUTRAN, and UTRAN). Again, when a summary bar is selected by hovering the cursor over it, all events 502 containing the hovered dimension are visually highlighted in the timeline 500 below. The summary tiles 540, 542. 544 can also be adjusted following a filtering action to summarize the information currently being displayed in the timeline 500.

Figure 5F:
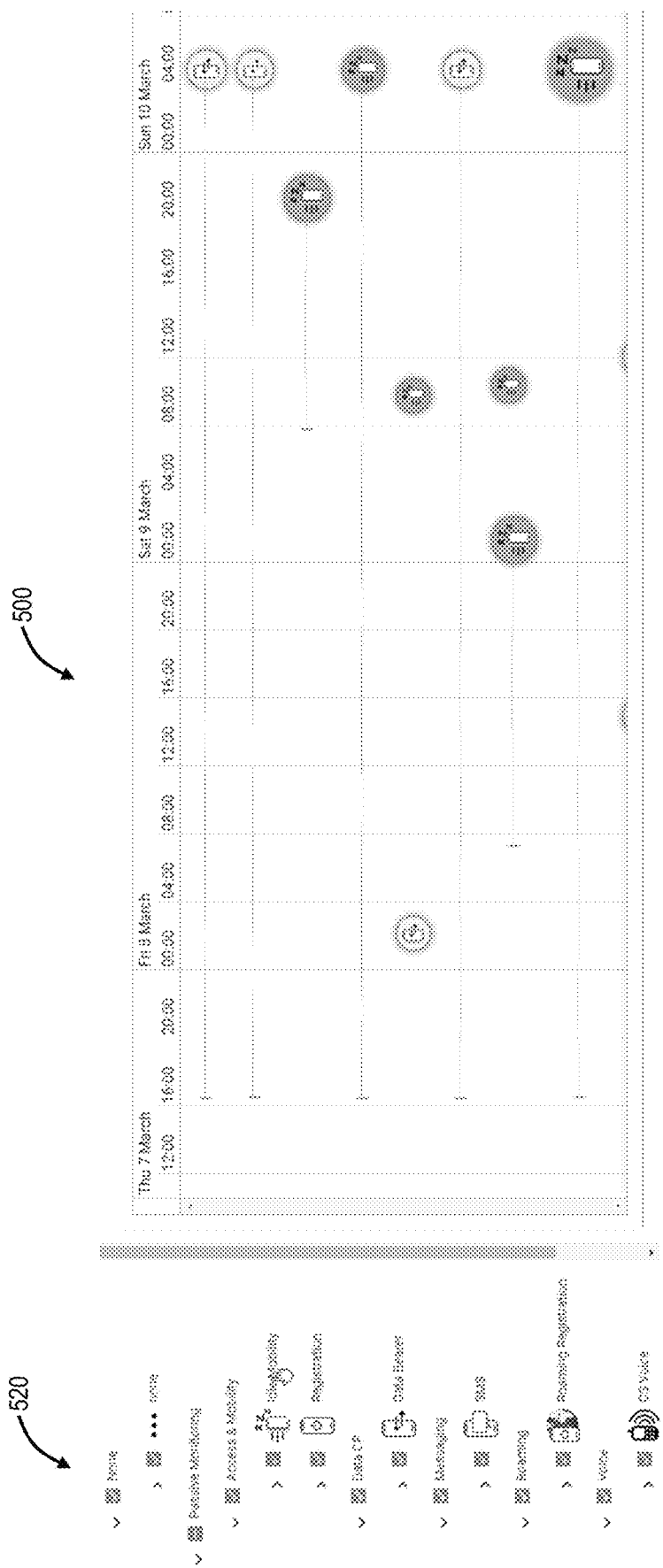
Figure 5G:
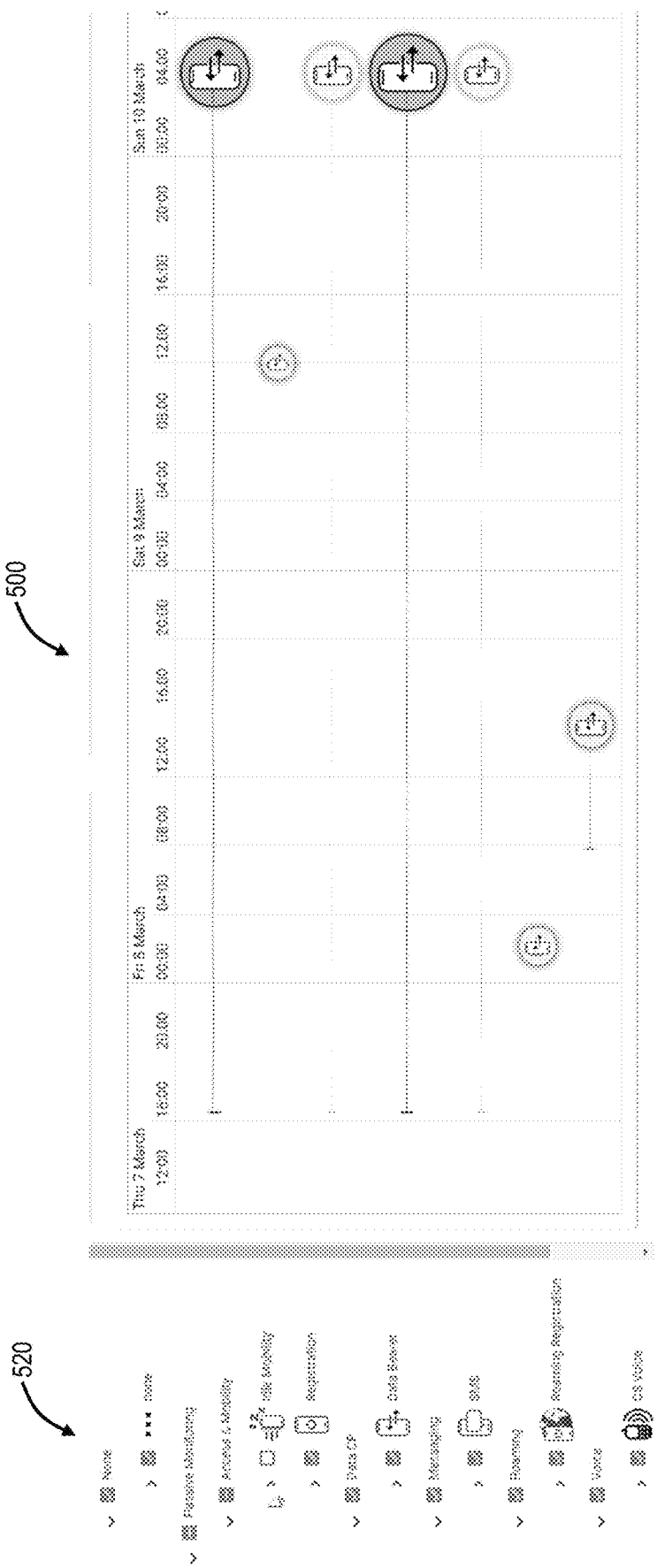

It is possible to filter the displayed events 502 to remove/add the events related to specific categories. This is done via the filter panel 520, as shown in FIGS. 5F and 5G. In FIG. 5F, all categories have checkmarks. Therefore all cases are displayed in the timeline 500. In FIG. 5G, the checkmark for category "Idle mobility" was removed. The display is updated to remove all groups with idle mobility (and no other category) in the timeline 500. In doing so, the importance of the remaining cases is recalculated, and the respective sizes of the icons and the color of the icons are adjusted to allow quick visualization of the newly prioritized cases. In this example, a few "data bearer" cases have now been prioritized to the most prioritized cases. In this example, icons with the idle mobility icon image have disappeared as these were filtered out. In another example, if the "idle mobility" dimension is contained within a group with other types of categories that are not filtered out, the group remains with its highest dimension icon, which could still be "idle mobility."

Figure 7A:
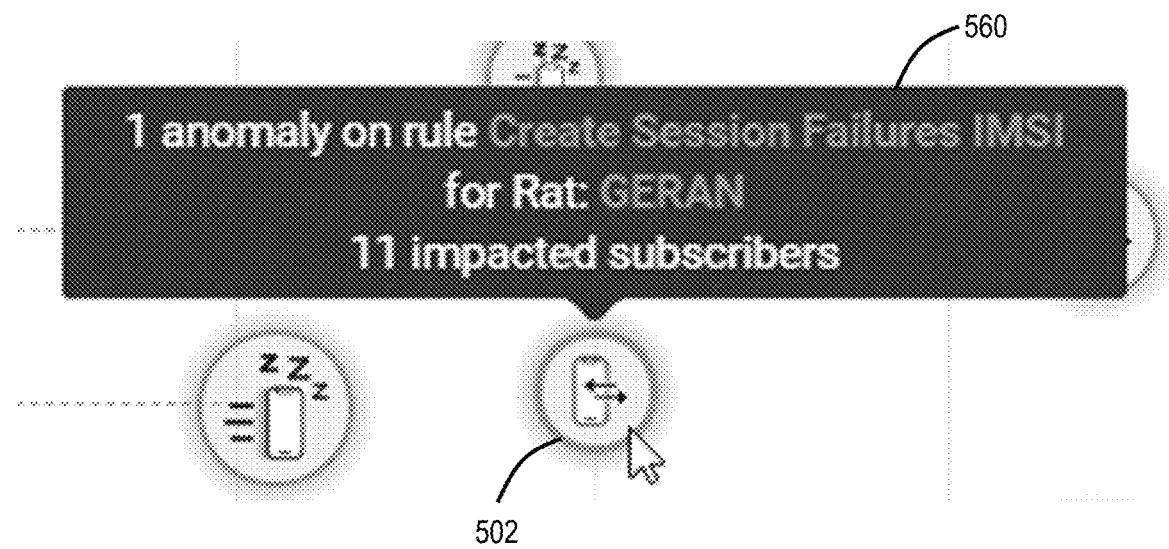
FIGS. 7A and 7B are portions of a screenshot illustrating additional details of an event in the timeline of FIG. 1.
Figure 7B:
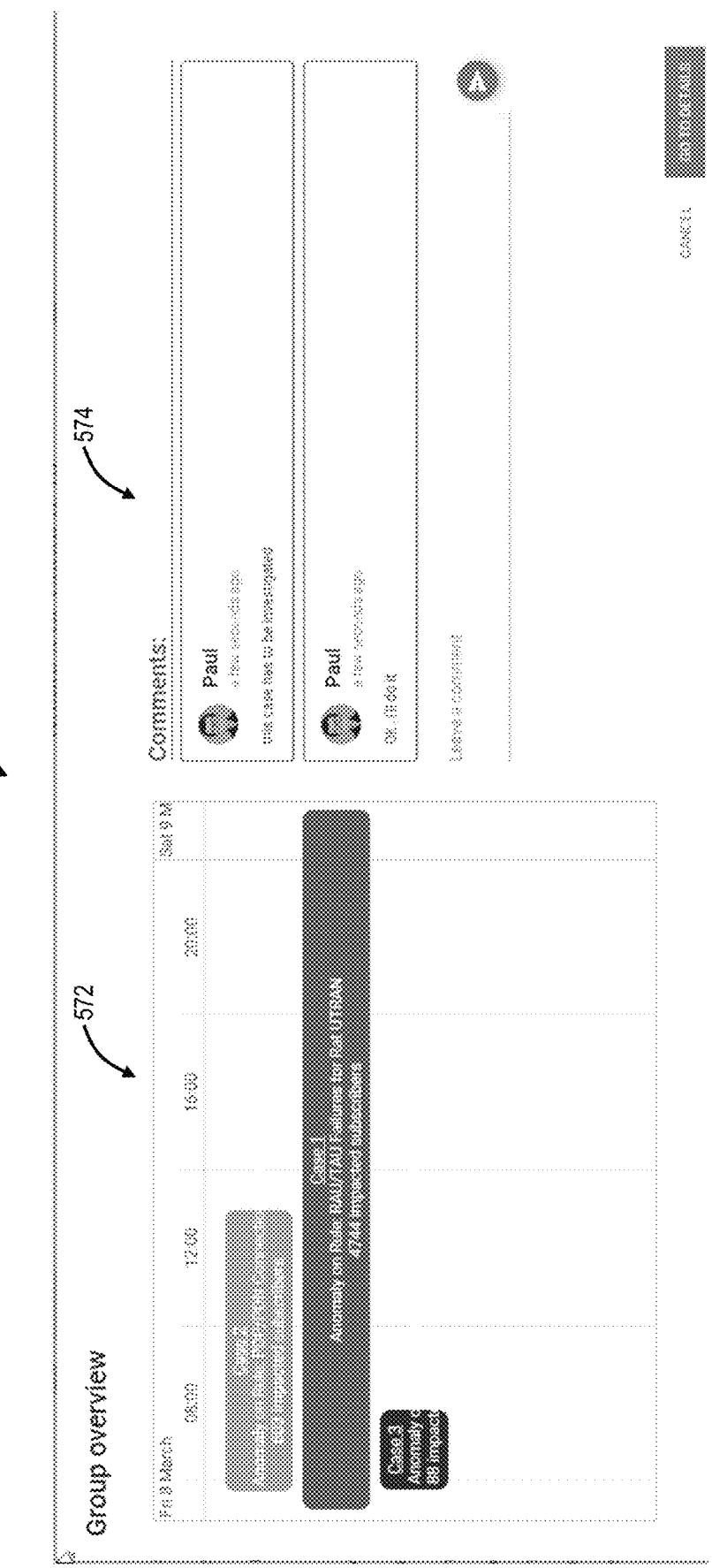

FIGS. 7A and 7B are portions of a screenshot illustrating additional details of an event 502 in the timeline 500. In FIG. 7A, the user 140 selects/hovers on the event 502 in the timeline 500, and a detailed tooltip label 560 are displayed to provide additional details to understand the event 502. For each subcase in the case, the detailed label 560 shows more information as to what triggered the intelligent alarm tool system 100 to raise this event 502.

In the present telecom network issue example in FIG. 7A, the name of the rule that raised the anomaly is shown ("Create session Failures IMSI (International Mobile Subscriber Identity (IMSI)"), and the name of the impacted network dimension is also shown (RAT (dimension type): GERAN (dimension value)). The detailed label 560 also shows the number of impacted subscribers. Note, some dimensions types (like RAT) are not mapped on timeline schemes but can be used as aggregation key for case computation at the source. For example, a 'call drops' category can be aggregated by RAT, meaning there can be '2G call drops,' '3G call drops,' and '4G call drops.' Each dimension has a specific cardinality depending on its nature.

Clicking on a specific event 502 will open a group detail popup 570, and an example is illustrated in FIG. 7B. The group detail popup 570 displays another timeline 572, which corresponds to the detail of the subcases within the group. Correlated cases can have different durations, start and stop times, as illustrated in the timeline 572. The second timeline 572 can help reflect cause and effect situations. Each anomaly or subcase is labeled on the timeline 572 with the number of impacted subscribers, the rule involved, and the network dimension impacted. This is the same information as was displayed as a group on in FIG. 7A, but split into the data for each of its subcases. A team chat window 574 is provided, allowing case annotation and supporting multi-user technical teams.

Investigation System

In addition to the timeline 500, the present disclosure can include an investigation GUI to graphically provide further information about the events 502 to support the technician's investigation work. The investigation GUI can allow the user 140 to get visual clues as to the signals (of metrics monitored to raise cases) before, during and after the event; the signal and anomaly thresholds for a single anomaly within an event 502; the geographical location of the event 502; a diagnosis detail for the most impacting events 502; and the like.

Again, the timeline 500 groups cases with correlated signals to facilitate review of the events 502 and help focus the efforts of the user 140 on the events 502 with the highest severity and impact. However, the details about the subcases are still relevant and can help identify solutions to address the raised issues. Therefore, the additional and individual details are available to be displayed to the user 140 in the investigation GUI.

Figure 8:
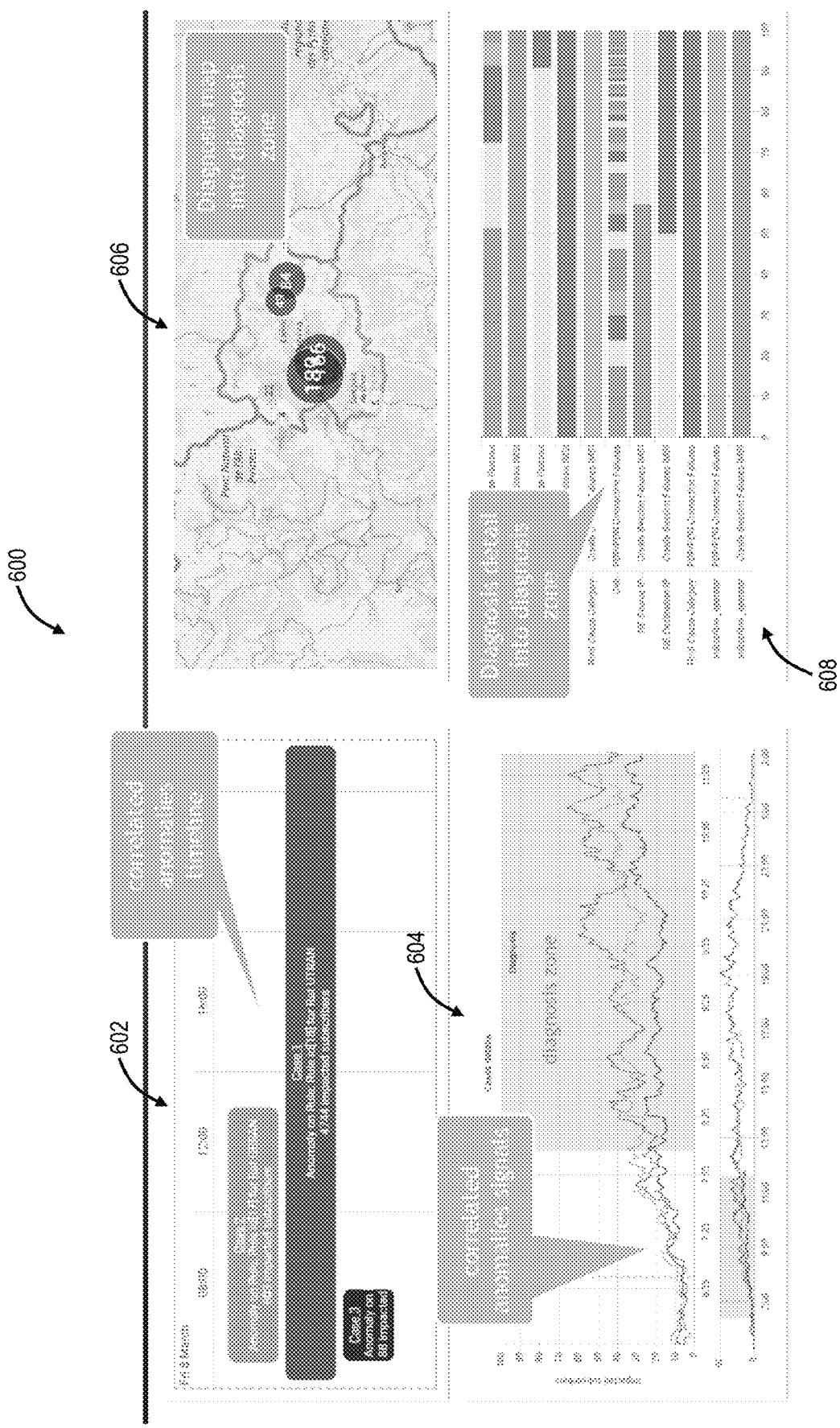
FIG. 8 is a screenshot of an investigation GUI, focused on a specific use case.
Figure 9A:
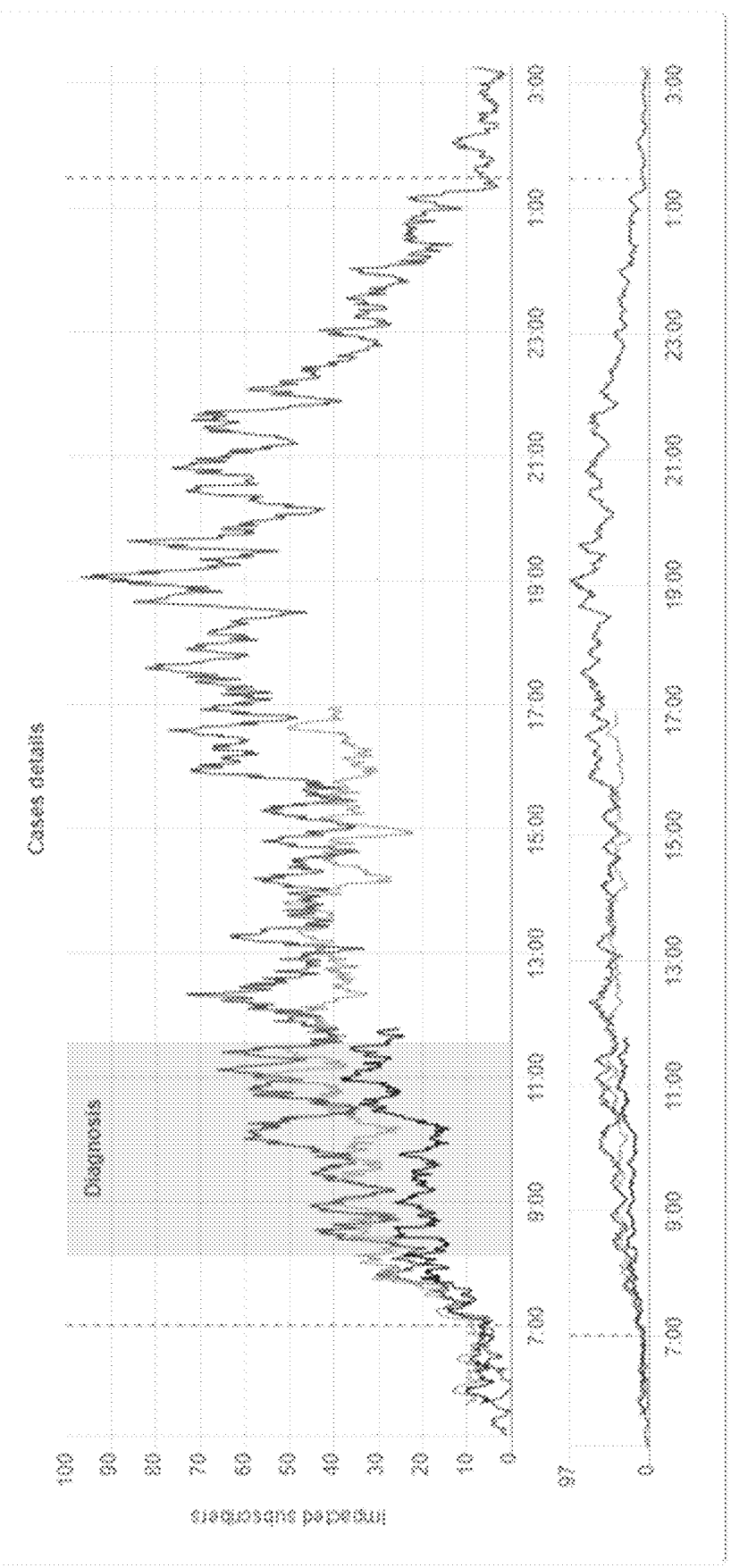
FIGS. 9A, 9B, 9C, 10A, and 10B illustrate larger views of each of the four quadrants of the investigation GUI of FIG. 8.
Figure 9B:
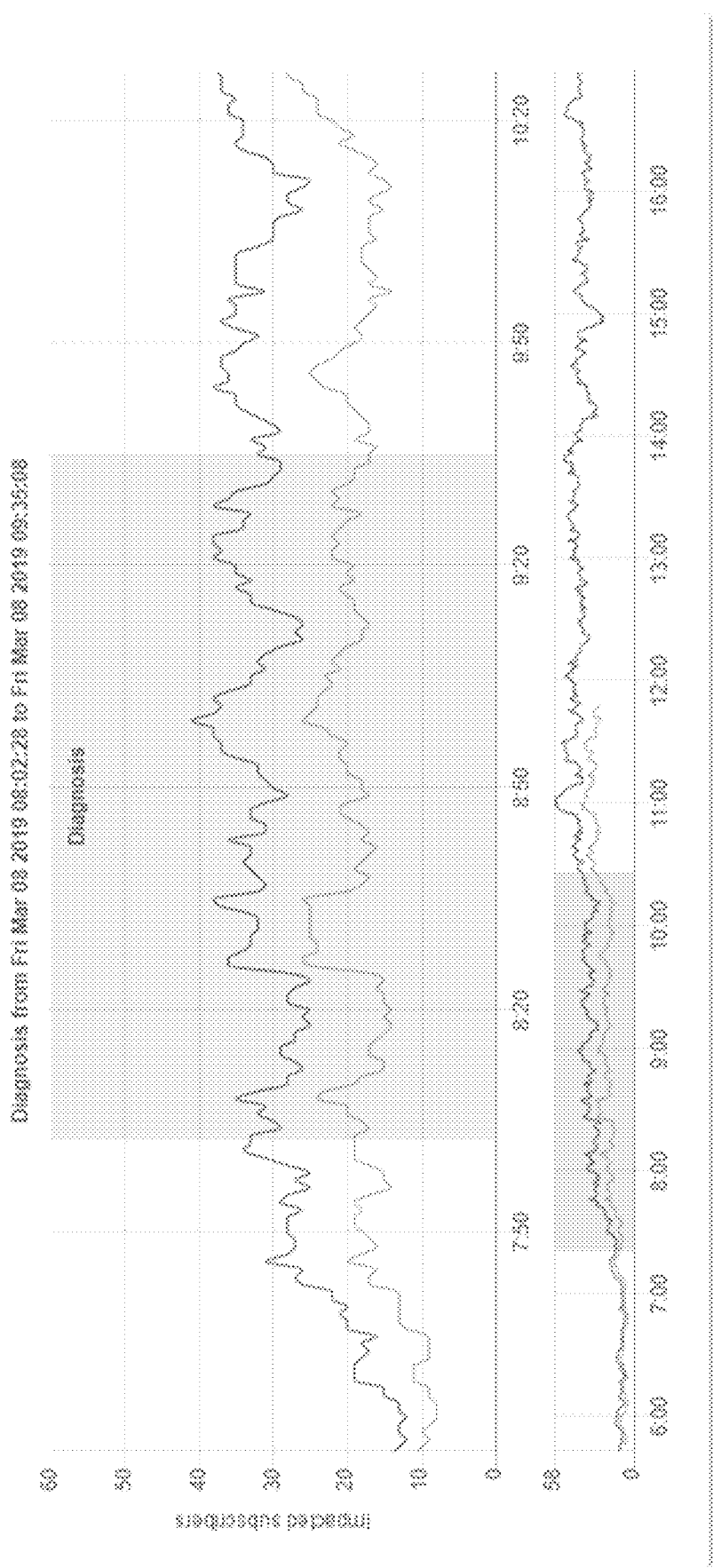
Figure 9C:
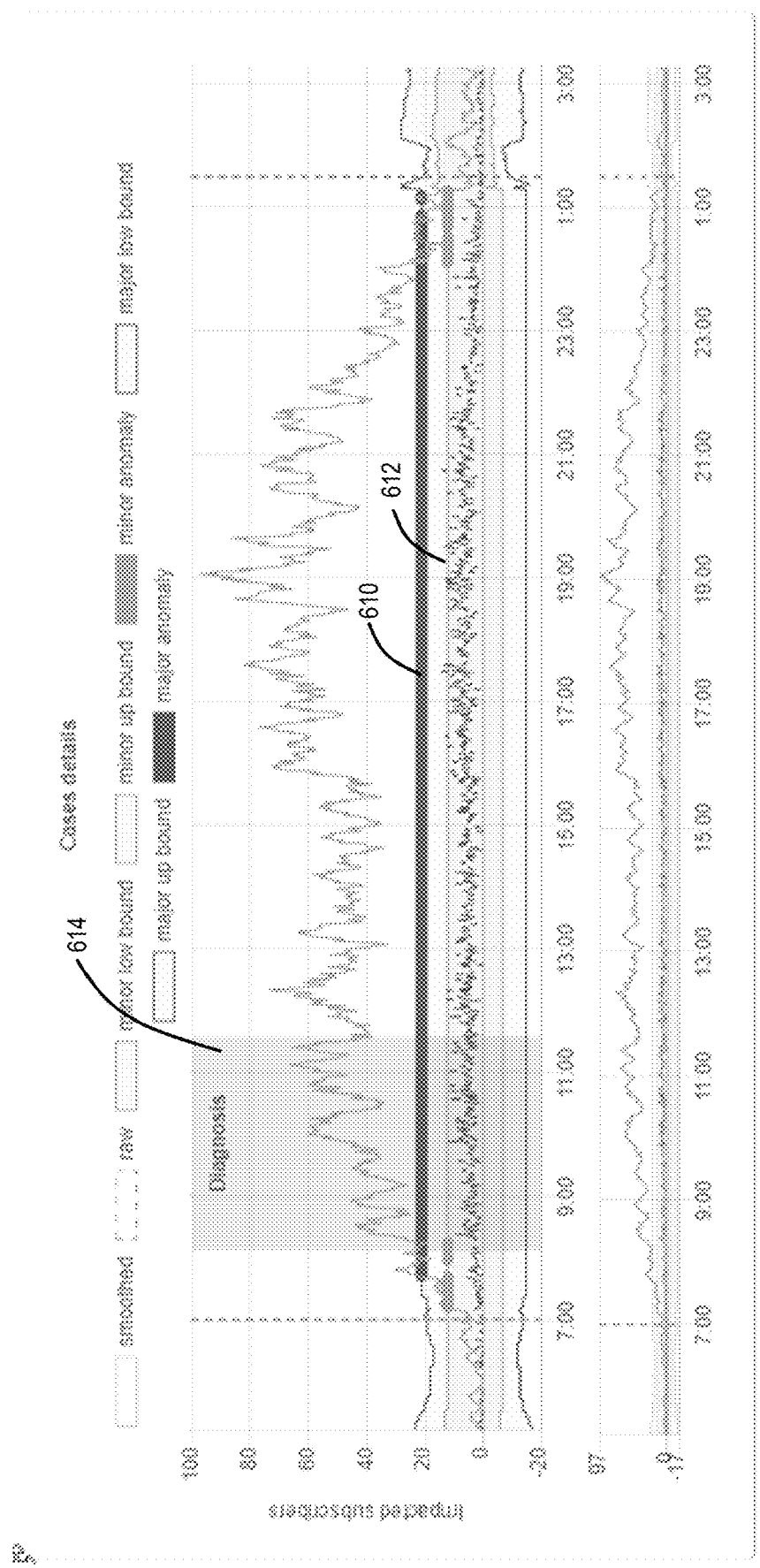

FIG. 8 is a screenshot of an investigation GUI 600. The investigation GUI 600 can be reached through the group detail popup 570 of the timeline 500, such as the one shown in FIG. 7B. The investigation GUI 600 includes four quadrants 602, 604, 606, 608. FIGS. 9A, 9B, 9C, 10A, and 10B illustrate larger views of each of the four quadrants 602, 604, 606, 608 of the investigation GUI 600. The quadrant 602 is the anomalies timeline 572, as described in FIG. 7B.

The quadrant 604 is a line chart corresponding to these anomalies (in the anomalies timeline 572). This is the impacted subscribers' signal before, during, and after the duration of the event (see FIGS. 9A-9B). These graphs show the correlation in time between the anomalies of the case. A time zoom is available for the line chart, allowing to focus on specific sections of the line chart, as is apparent in FIG. 9A for a longer time period shown, zoomed-out display, and FIG. 9B for a shorter time period shown, zoomed in the display.

When clicking on an anomaly timeline, the display is transformed into an anomaly focus (see FIG. 9C), and the graphs now focus on this single anomaly. On this view are displayed the raw anomaly signal and the smoothed signal (used for anomaly detection). Thresholds are also shown. In this example, the zones 610, 612 correspond to the minor and major thresholds. The points correspond to the raised anomaly (minor and major) when the smoothed value goes outside of the threshold zones. The user 140 can focus on a specific zone 614 of the graph for diagnosis purposes. This diagnosis zone 614 is highlighted in grey in the example of FIG. 9C. Each time this zone is changed, the diagnosis section is updated (see below).

Figure 10A:
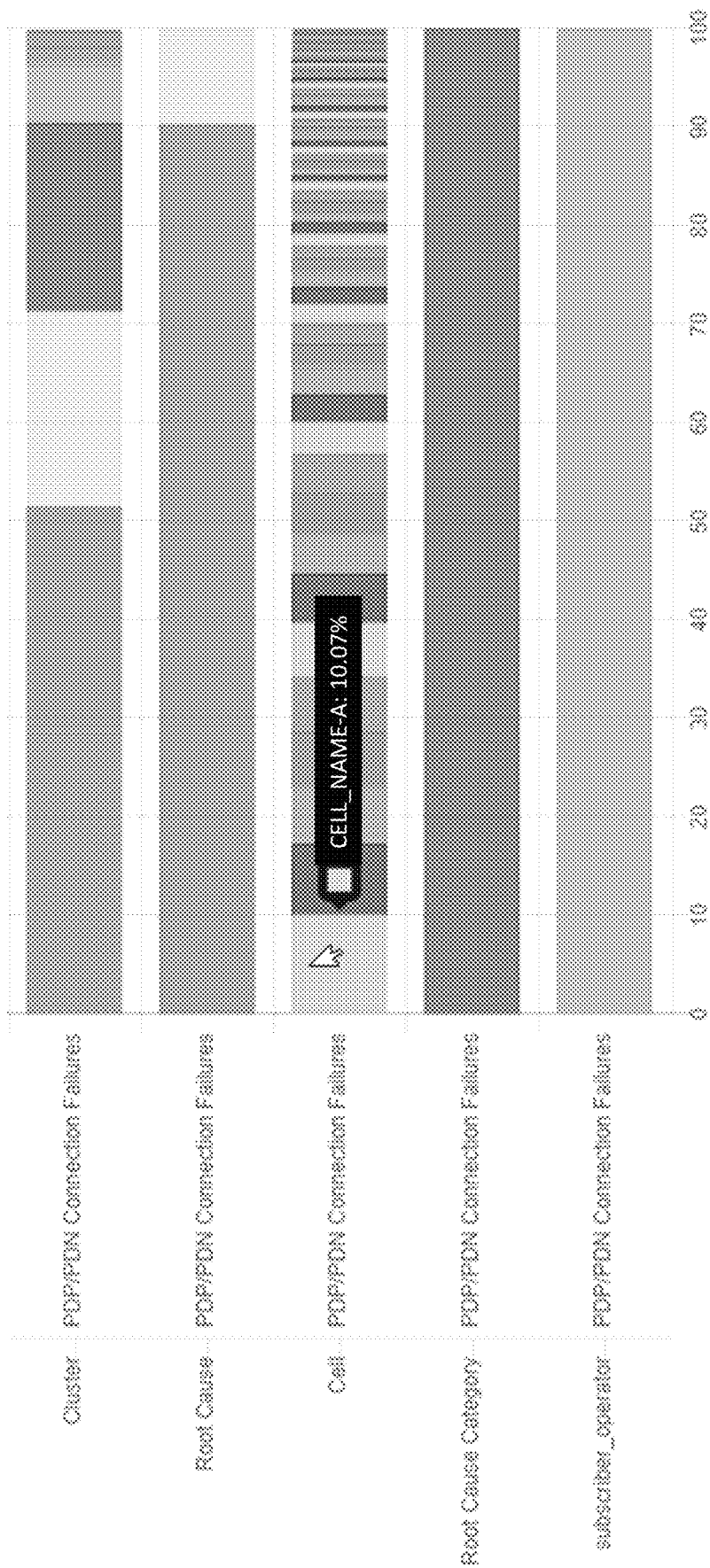
Figure 10B:
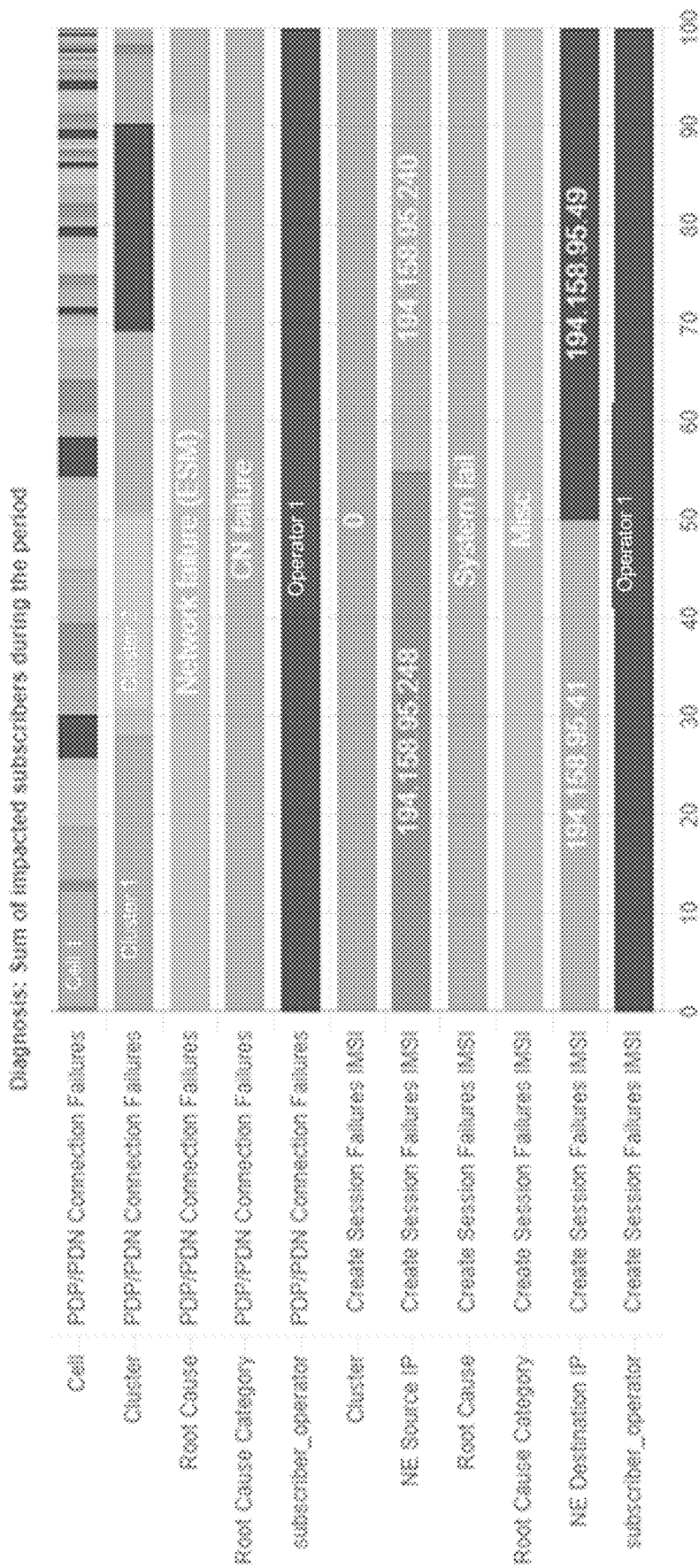

A diagnosis section is available in the bottom-right quadrant 608. Example screenshots for the diagnosis section are provided in FIG. 10A (no apparent labels) and FIG. 10B (apparent labels—different example). Depending on the line chart selection made in the bottom-left quadrant, the diagnosis section can be a single or multi anomalies diagnosis. This stacked bar chart shows the most impacted elements per network dimension and applied rule. This diagnosis is the distribution of values among several dimensions during the time window chosen. Those dimensions can be exclusively used for diagnosis purposes and may not be visible on timeline schemes, because they are not mapped, e.g., cells, IP addresses, 3GPP root cause, etc. Showing those distributions during and after cases appear can help to understand what element into a specific dimension could be the root cause. In the example of FIG. 10A, CELL NAME-A represents 10% of the cells the most impacted by a Packet Data Protocol (PDP)/Public Data Network (PDN) Connection Failures rule. However, the impacted users were from a plurality of cells. In the example of FIG. 10B, 50% of the Create Session Failures IMSI had a Network Element (NE) Destination IP address of 194.158.95.41, and 50% had 194.158.95.49. The impacted subscribers were all from the same operator.

The top-right quadrant 606 is used to display a geographical location for the events 502. The map displays the location where network elements (data-producing devices 130) with the most impact are located. This can only be displayed if the network topology allows retrieval of geographical coordinates for the network elements.

Timeline Visualization and Investigation in a Networking Embodiment

Figure 11:
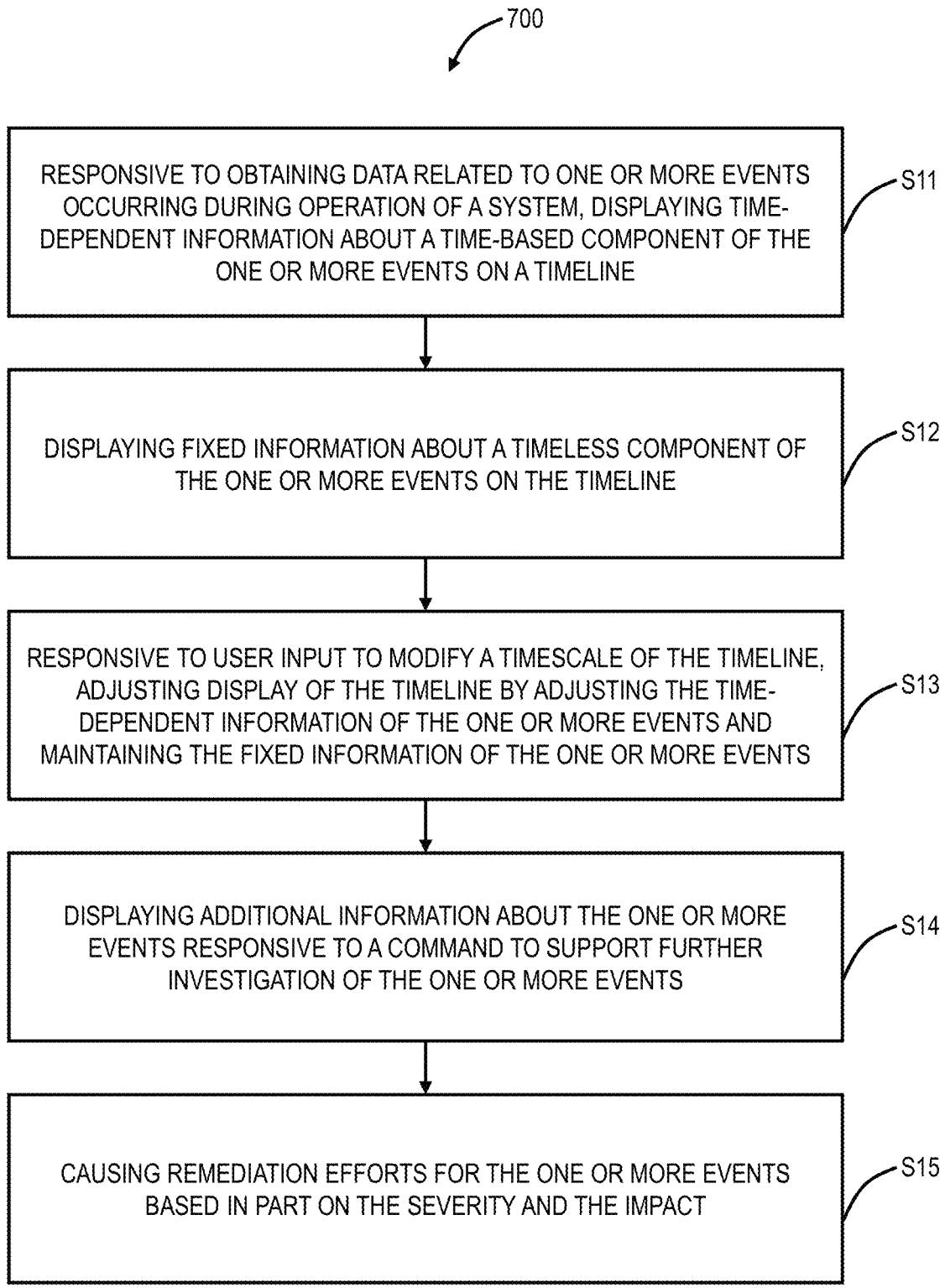
FIG. 11 is a flowchart of a process for investigating and addressing events utilizing a timeline visualization.

FIG. 11 is a flowchart of a process 700 for investigating and addressing events utilizing a timeline visualization. Specifically, the process 700 utilizes the timeline 500 for a user 140 to identify events 502 for remediation. The timeline 500 allows the user 140 to quickly and efficiently prioritize efforts to address the events 502 with the most severity, etc. Further, the timeline 500 reduces the amount of system-level expertise the user 140 requires.

The process 700 includes, responsive to obtaining data related to one or more events occurring during operation of a system, displaying time-dependent information about a time-based component of the one or more events on a timeline (step S11); displaying fixed information about a timeless component of the one or more events on the timeline (step S12); responsive to user input to modify a timescale of the timeline, adjusting display of the timeline by adjusting the time-dependent information of the one or more events and maintaining the fixed information of the one or more events (step S13); displaying additional information about the one or more events responsive to a command to support further investigation of the one or more events (step S14); and causing remediation efforts for the one or more events based in part on the severity and the impact (step S15).

Features

The timeline visualization and investigation systems and methods can be utilized for real-time autonomous anomaly detection, correlation, and diagnosis, such as in a networking context. This enables a move from a network-centric to customer-prioritized troubleshooting. The analysis is based on real-time traffic where data is collected by network probes, PM data, etc. to obtain a true and complete view.

The systems and methods can automate outage detection and troubleshooting processes. The systems and methods can generate high-quality insights using machine-learning automated service assurance capabilities, without the need for human intervention or manual configuration. This reduces not only the time to resolve but also minimizes customer expert analysis and intervention.

Rich insights can be formulated based on the real-time data such as correlating metrics and real-time data into contextual information. This helps service providers maximize value from their existing data sources, providing the essential component to manage ever-evolving dynamic networks successfully.

The real-time data can be compared against learned baseline patterns to detect anomalies. In an embodiment, the systems and methods can autonomously learn what the 'normal' operating state or condition of the network is and then continuously update based on what it learns from the constantly changing network, service, and customer behavior. Future events and anomalies are determined normal, or an alarm is triggered when something deemed abnormal is detected.

The systems and methods can generate sets of events prioritized by customer-impact. Alarms and outages can be filtered based on customer-impacting criteria to determine how an outage will affect both business-critical services and VIP customers.

Anomaly Detection

The present disclosure can use unsupervised machine learning to determine the impact of issues on a network. It continuously monitors active and passive data streams from probes as well as PM platforms and visualizes information in the form of 'cases' in a real-time experience timeline of events. These events then trigger a series of automatic diagnosis steps that enable the user to determine the root cause of the problem.

In an embodiment, the present disclosure can include the following automatic loops for processing:

Automatically Detect Anomalies related to Customer Impact—this provides the ability to detect real-time anomalies based on the number of impacted customers falling into new 'bad event clouds.' This also triggers the opening of a new case.

Correlate Cases Automatically—if cases that are opened appear to be related, the present disclosure can group them into a case group. These case groups can contain many base level cases and are used to reduce the existing dataset down into a manageable amount of tangible business-impacting cases each day.

Diagnosis of Case Features Automatically—once cases are opened, the common features of these cases can be analyzed. This involves looking at the data inside the current anomalies to see if there are common dimensions such as network elements, devices, Access Point Names (APNs_, IP addresses, cells(locations), and customer groups (types).

Continuous Updates on Experience Timeline—cases and their diagnosis information are updated continuously on the user interface. As cases are updated, there is no need to refresh the UI—where the solution updates automatically.

Processing System

Figure 12:
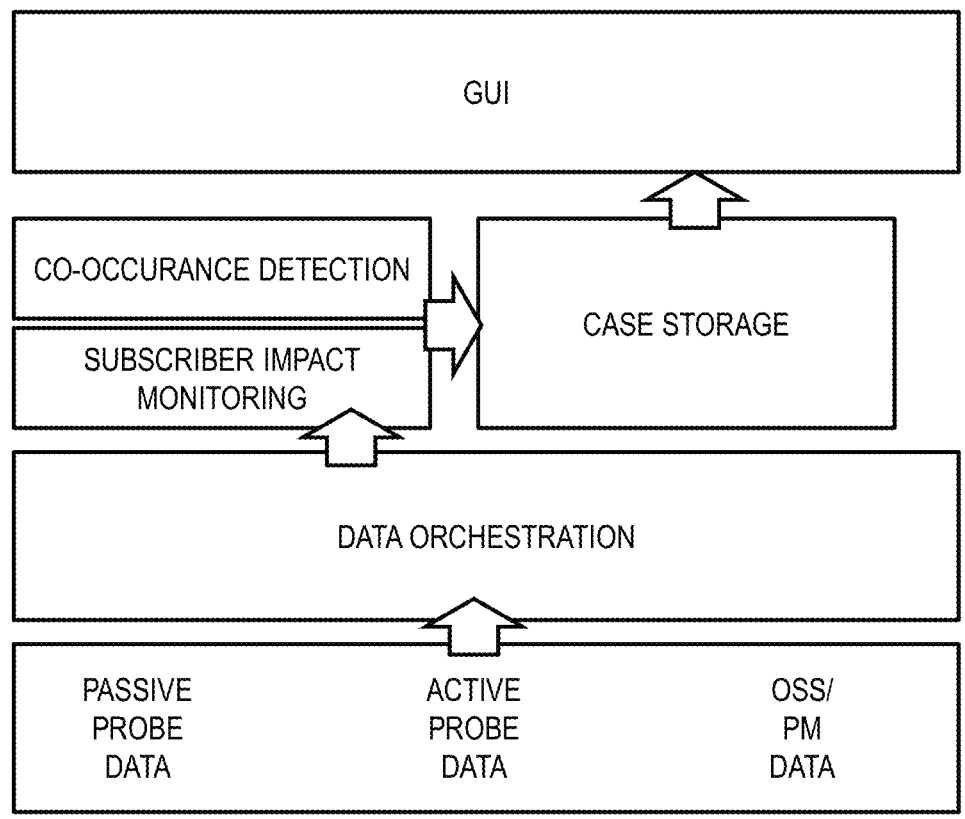
FIG. 12 is a block diagram of a processing system.

FIG. 12 is a block diagram of a processing system. In an embodiment, the systems and method can include a processing system that executes some or all of the functions described herein, including machine learning workloads. All input data is passed up through an orchestration layer, whether this is from passive probes, active probes, or PM platforms. Data is then analyzed in streams—where the anomalies are triggered and stored inside a database. All the components of the processing device can be deployed as Docker Containers—this allows the system to be installed, upgraded, and monitored in a modular fashion.

The present disclosure can fit within a service provider's existing management and monitoring systems. For example, the processing system can support Simple Network Management Protocol (SNMP) traps as well as email alerts, etc. The processing system can also include a Representational state transfer (REST) Application Programming Interface (API) for a case database so that detailed anomaly and diagnosis data can be exported, such as, in a Customer relationship management (CRM) environment.

The data sources can be of various types, and the processing system can abstract the input feeds or sources.

Visualization

Figure 13:
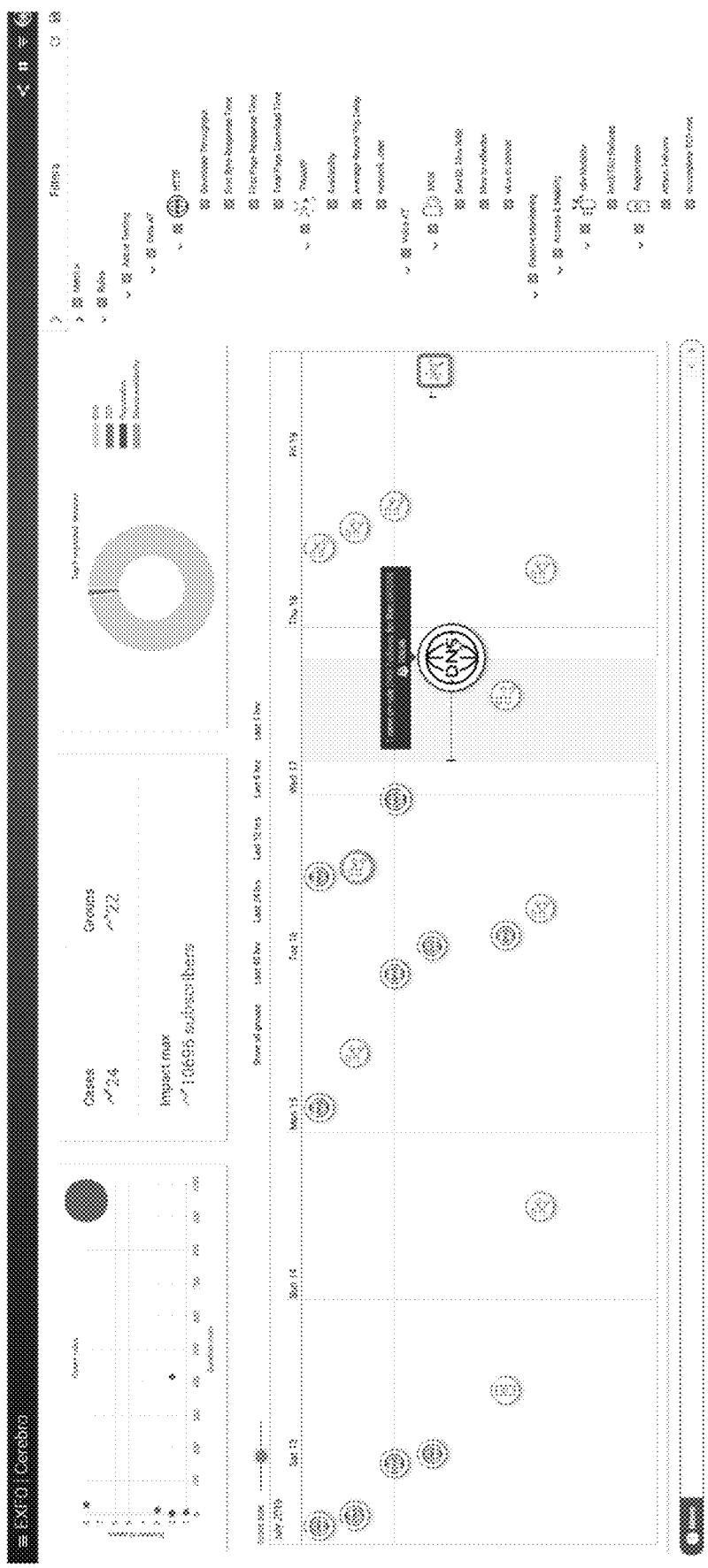
FIG. 13 is another screenshot of the timeline visualization.

FIG. 13 is another screenshot of the timeline visualization. The present disclosure has a unique Service Assurance ready user interface that shows the real-time status of any open events, have been open, or are predicted to be opened in the future in a unified display called the 'timeline.' This approach to visualizing the impact of events on the network is designed to assist the user in determining and so identifying events that ether impact more customers/devices or persist for a longer period of time.

Automatic Diagnosis

Figure 14:
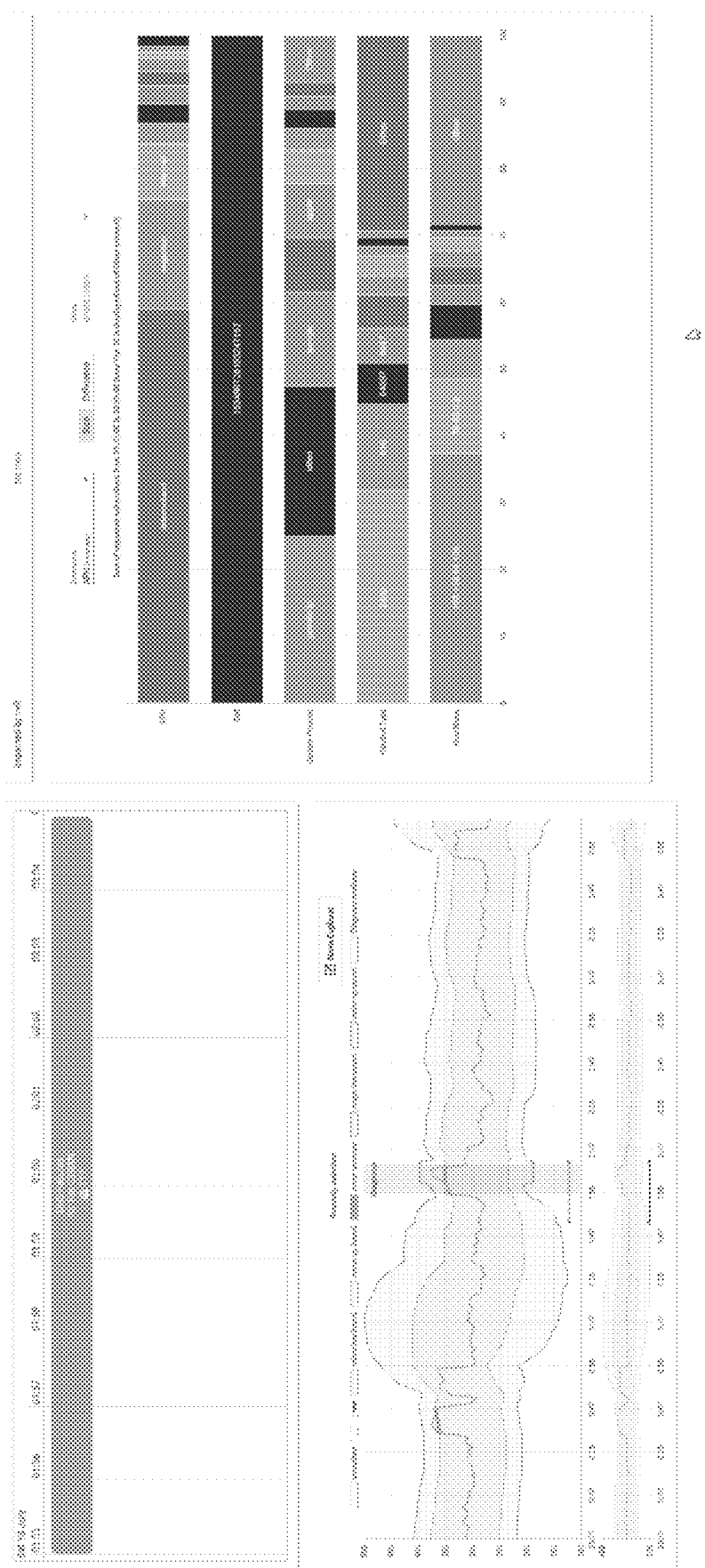
FIG. 14 is a screenshot of an example operation of the timeline visualization.
Figure 15:
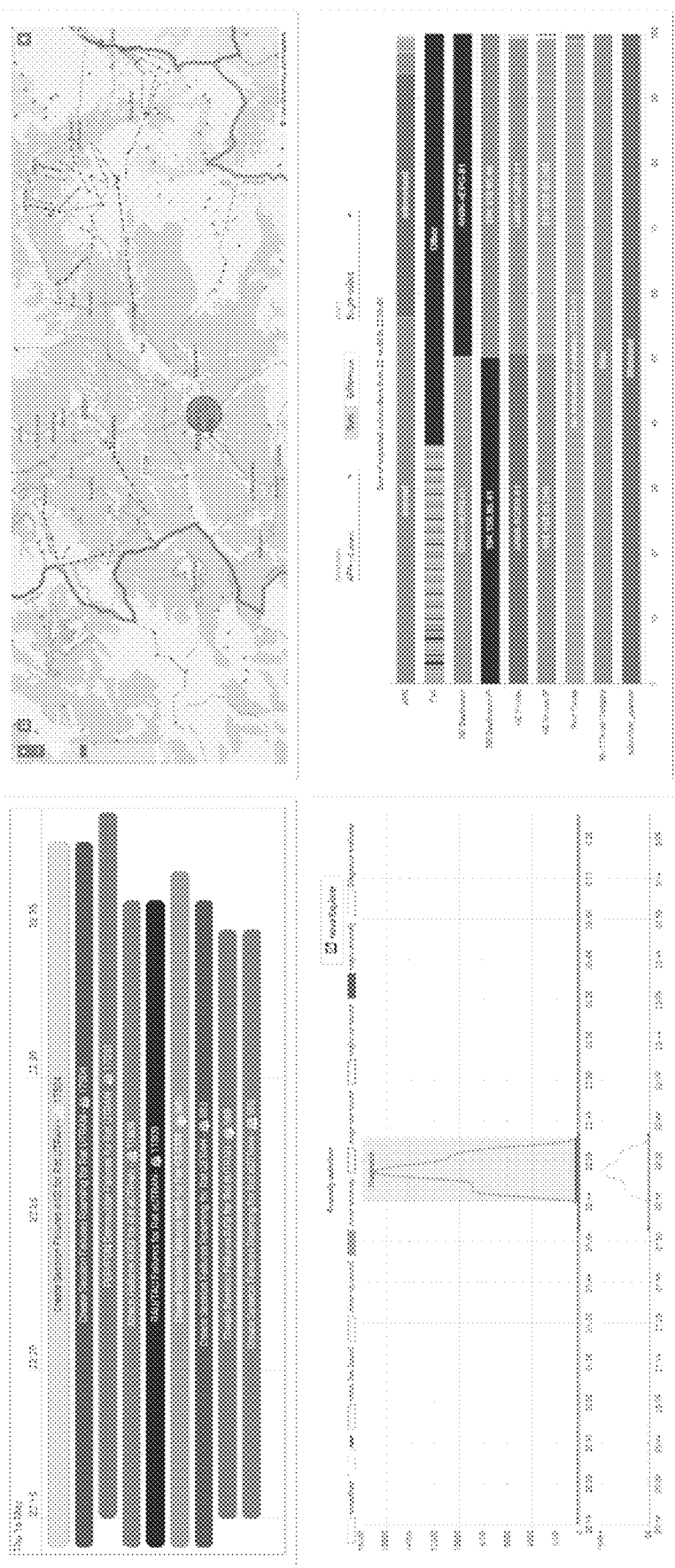
FIG. 15 is a screenshot of the example operation of FIG. 14 illustrating location-based impact updated in real-time.

Once a case is opened, it is continuously updated and so managed without the user having to intervene. If a case is opened on the timeline, the user has the option to enter comments and classify a case for further analysis or to tag it with other user-defined categories. The case diagnosis display is then presented to the user, showing the anomaly type and duration along with anomaly curve (bottom left, FIG. 14)) which shows when the signal (the level of impacted subscribers) breached an automatically learned threshold triggering the analysis. The diagnosis right-hand display (FIG. 14) then shows the common features inside the anomaly, e.g., network elements, handsets, services, cells (locations) and customer types, etc. The present disclosure automatically plots customer impacting events on a map (FIG. 15), and where an issue or event impacts more and more customers, a user can then see where this cloud of bad experience is developing. The display then refreshes automatically throughout the anomaly.

The present disclosure can also allow a user, inside a case, to launch a session to a protocol analysis tool.

Metrics

Figure 16A:
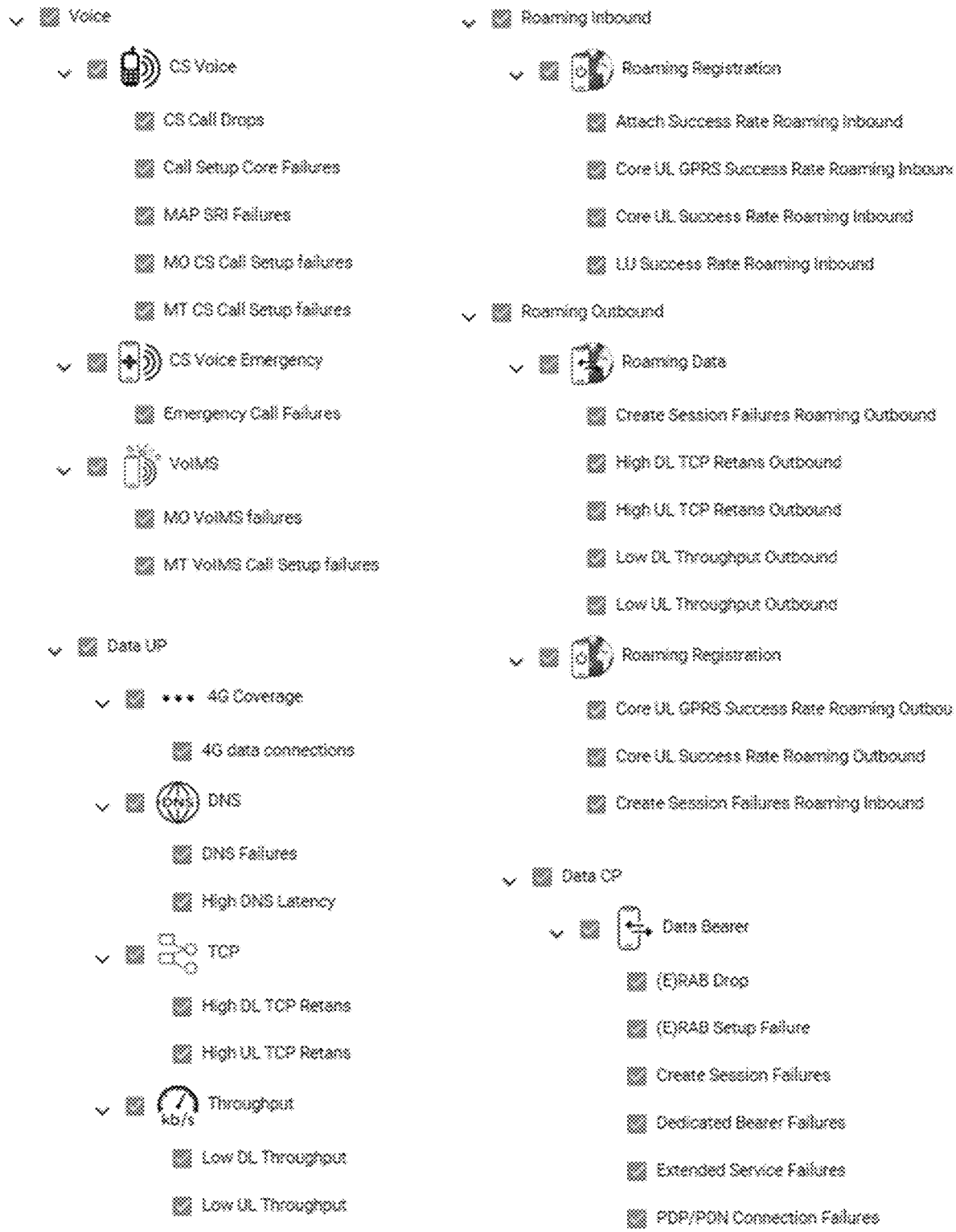
FIGS. 16A and 16B are a diagram of example metrics.
Figure 16B:
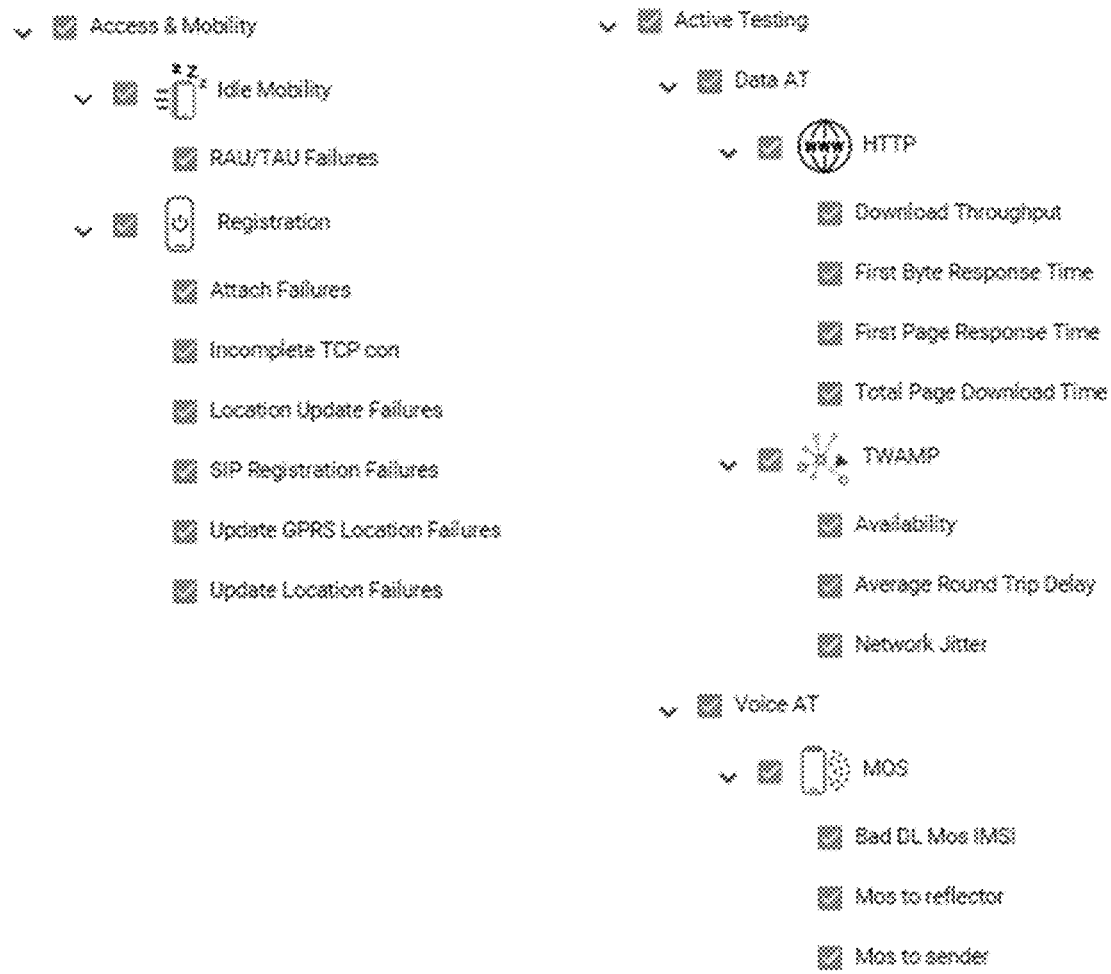

The present disclosure provides a suite of metrics covering the customer impact of negative events on the network. Where these can be extended via simple configuration. A sample of the metrics available is illustrated in FIGS. 16A and 16B.

Example UI

FIGS. 17-41 are screenshots of an example implementation of a UI in accordance with the systems and methods. Of note, these FIGS. are one example of an implementation for illustration purposes.

Figure 17:
FIGS. 17-41 are screenshots of an example implementation of a UI in accordance with the systems and methods.

FIG. 17 is a screenshot of a header. The header gives access to other pages and several options. The header panel is always visible, but its left content can change depending on the current page. FIG. 17 is a header panel on the main page.

A: access to the menu: groups timeline is a shortcut to the main page, settings are a shortcut for the user settings page, about gives information about the program, contact gives information on how to call support, and Help gives access to the help page menu.

B: logo, which can be a shortcut to the main page on all other pages.

C: share button: copy the current URL, ready to paste, and send it to another user.

D: Online/offline mode button: by default, online mode refreshes the timeline at the refresh periodicity defined in the user settings. If mode is set to disabled, the timeline will stop asking the server for updated information. This is useful when the user wants to investigate a case to make the timeline stop moving.

E: Access to filter panel. when located on the details page, this button is replaced by a message button and gives access to the chat messages related to the focused case group F: User profile image. When clicking on it, it gives access to a menu with two or three choices: My profile: gives access to the user profile page, Admin page: if a role is at least 'administrator' (see user rights and roles), and a logout.

Figure 18:
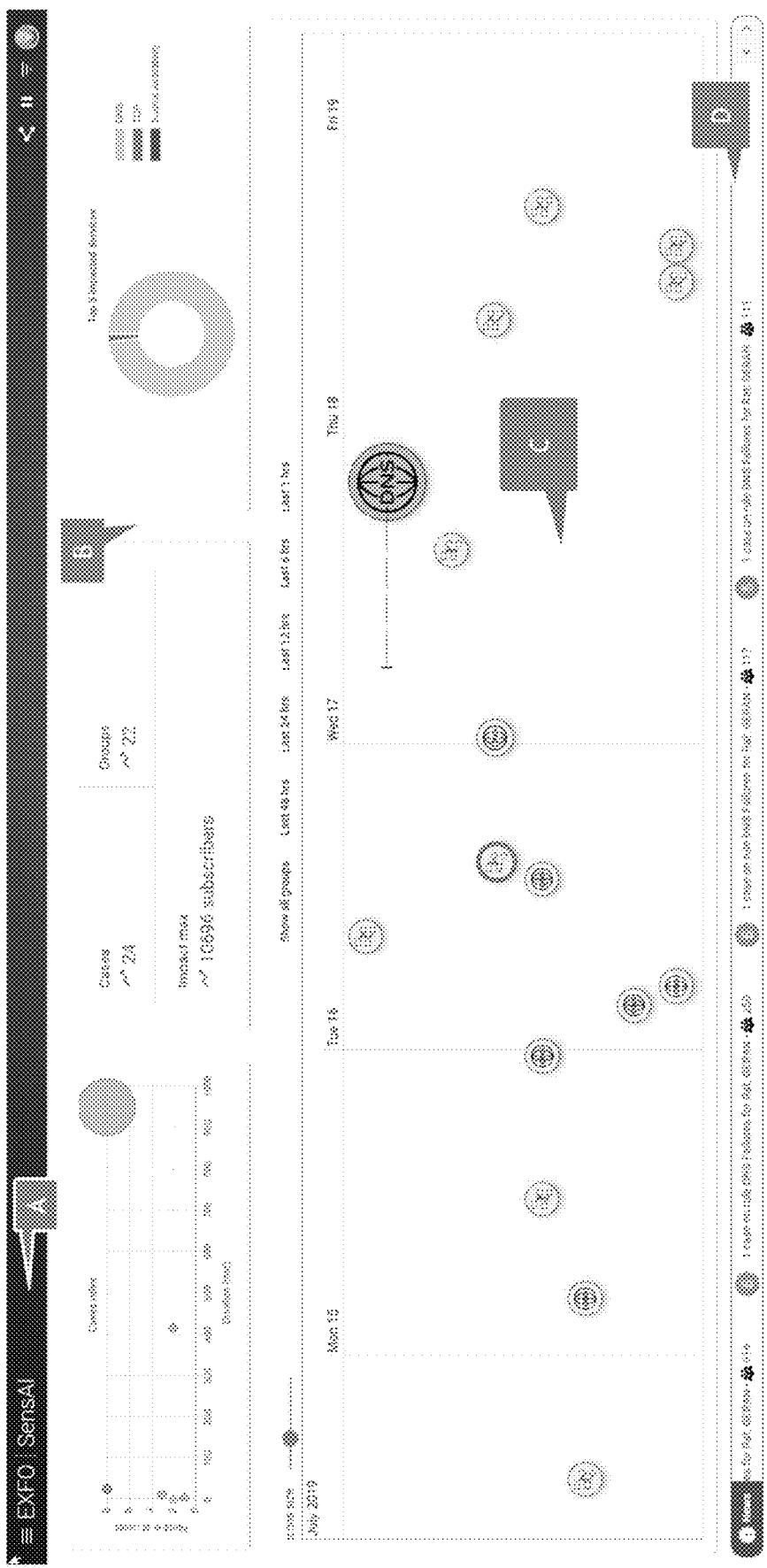

FIG. 18 is a screenshot of the main page that includes:

A: is the header panel.

C: The cases are displayed into the central timeline: an innovative and interactive display to compare, categorize, and prioritize the real-time problems detected by the system.

B: Between header and timeline, three configurable overview charts are available to display statistics on the timeline activity.

D: On the bottom of the main page, the news ticker displays several real-time relevant information, such as new cases, top cases, or other users' activity on cases.

Figure 19:
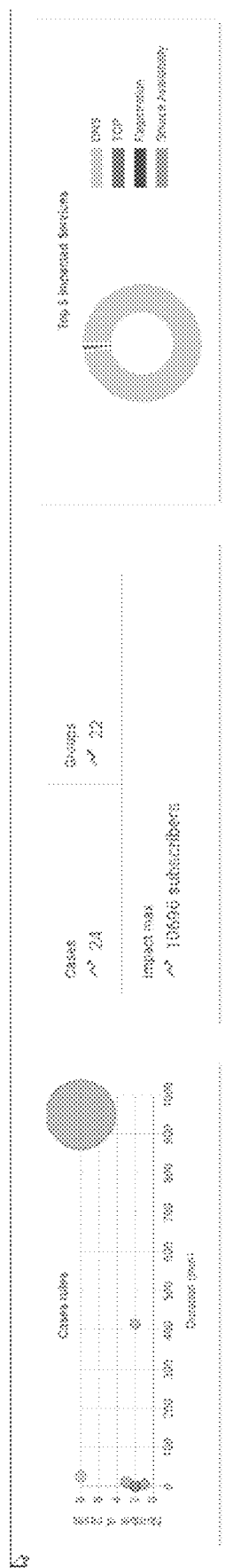
Figure 20:
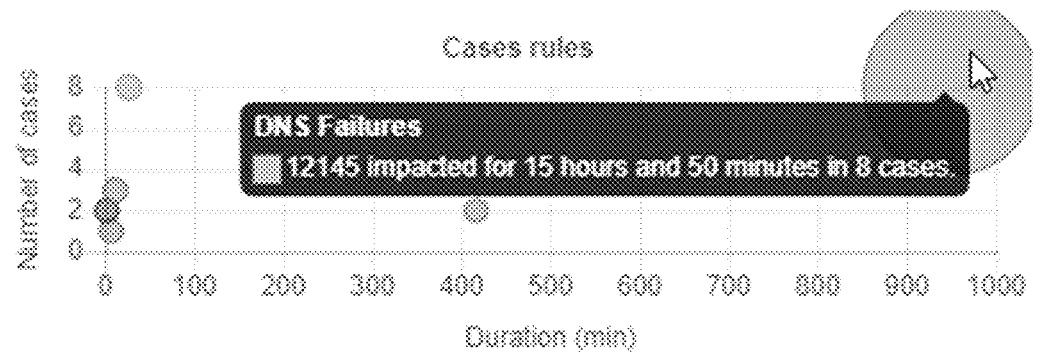
Figure 20:
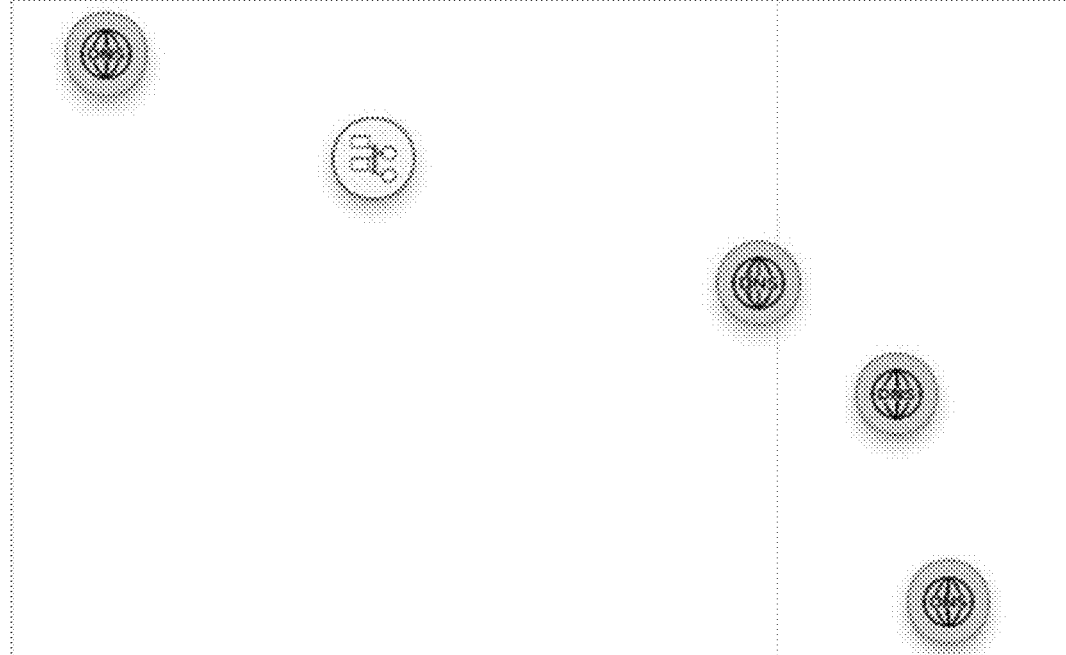

FIG. 19 is a screenshot of overview charts. This panel includes configurable charts that display statistics about the current timeline cases. This aggregates data on specific dimensions such as rules, Services, categories, RAT . . . to have a quick sight of cases impact on those dimensions. About rules: rules are configured on the system side to follow the evolution of specific KPIs or counters on specific dimensions. Those rules are at the origin of the creation of the case when the associated counters bypass the dynamic rules thresholds. Those charts can be configured from the user settings page in the visual settings menu. Users can interact with most of those charts by hovering into the content. This action will open a tooltip for more statistic detail and will, although colorize the related timeline cases with the same color as the item focused, to give a quick view of the concerned cases into the timeline, as illustrated in FIG. 20.

Figures 21, 22:
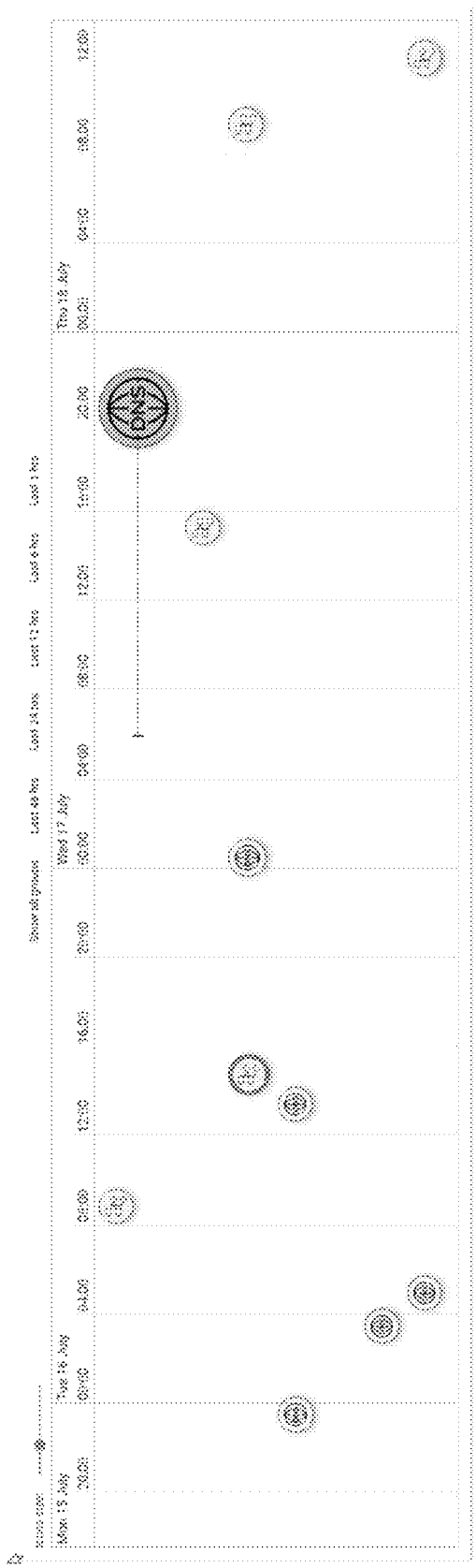

FIG. 21 is a screenshot of the timeline of the case. The central timeline displays past and ongoing case groups that occur on the network. This timeline shows sequenced information to compare, categorize, and prioritize the real-time problems detected by the system. The content is refreshed in real-time so that ongoing cases are updated, and new cases can appear.

FIG. 22 is a screenshot of case groups. Case Groups is important—a group case would appear in the timeline if the system detected that a rule had reached its anomaly gap.

A: corresponds to the start time of the case (when it has been first detected).

B: this dotted line corresponds to the duration of the case. Its length is dependent on the timeline scale and is zoom dependent.

C: corresponds is a placeholder with several characteristics; its size is not zoom dependent. This is the list of the characteristics of the case placeholder: the shape depends on the kind of case family. Circles are used for passive probe cases, squares for system cases. The size is relative to other group cases in the timeline and indicates impact such as the number of 'impacted subscribers.' The icon depends on the most impacting rules that raised anomaly inside this group of correlated cases. The icons legend is available directly into the filter panel tree. The color gives a relative indication of the emergency of the problem among available cases: it is a combination of impact and duration. Cases with high impact and long duration tend to have a high emergency. Red is the most urgent, then yellow. The borderline(s) indicates if the group contains several correlated cases or not (see cases). The flashing animation indicates the status of the case. If flashing, it is still ongoing. If not flashing, it is finished. Size and color can be relative to what is displayed so that the colors and size of shapes adapt to filter panel user actions. The system always tries to give the most urgent priorities within displayed cases.

Figure 23:
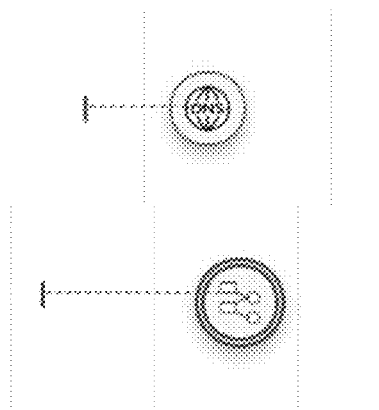

FIG. 23 is a screenshot of cases and correlation. A case is a single anomaly raised, but a single group case (a group of one case, top object) can be called a case because it has not been correlated with any other case. To make the distinction with a correlated group case (at least two correlated cases, bottom object), the border of the shape is used.

Figure 24:

FIG. 24 is a screenshot of group case user interaction. Two actions are available for users on the cases. The case interactions happen at the case's placeholder location. Hover over a case leads to make a tooltip appear. The tooltip contains summary information about the case group content. In this example, the group contains two cases on two different rules, both on RAT UTRAN, that impact 59 subscribers. Also, another user has just posted a new chat message on this case. Clicking on a case leads to the group overview popup. Moreover, the timeline often reacts to other user's actions out of the main page: hover from overview charts, filter panel, or news ticker: it can make some cases change their color to highlight related cases. It is a fast way to recognize which cases are involved by the hovered information.

Figure 25:
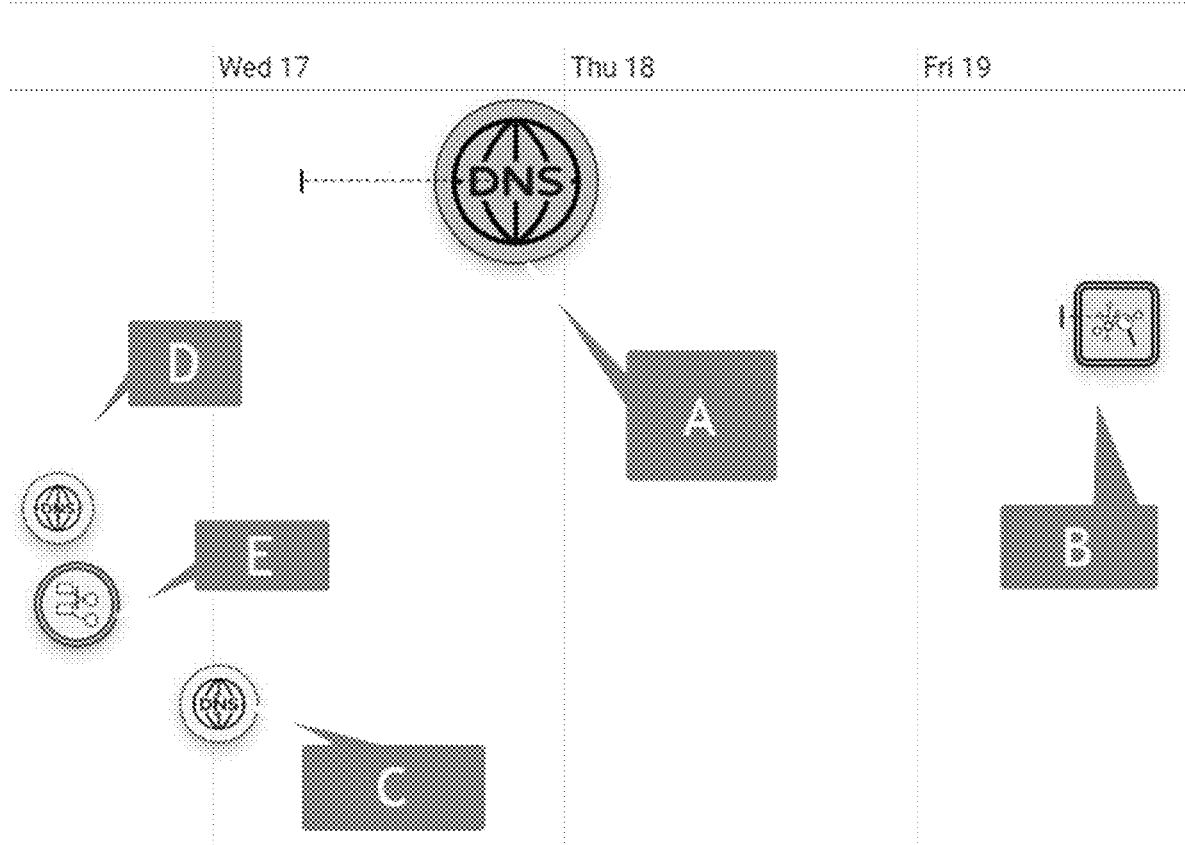

FIG. 25 is a screenshot of cases groups display. In this example, color information: A and B are the most urgent cases to investigate. Shape information: 2 distinct families of problems occurred: passive probing (A, C, D, E) and system (B). Flashing information: no case flashing means that all those cases are no more ongoing. Icons information: Among passive cases, we mostly face DNS problems (A, C, D) and one TCP problem (E). The system case (B) is linked to source availability. Dotted duration line information: (A) lasts more time than (B). At this time scale, durations of (E, C, D) are not significant compared to the two other cases. None of those cases occur in the same period. Border style information: (B) and (E) have double border shape, whereas other cases. It means that they are correlated group cases and contain other linked cases inside. Tooltip information can help to get more information about this. The icons they have corresponds to the most impacting case's rule they have among their respective group.

Figures 26, 27:
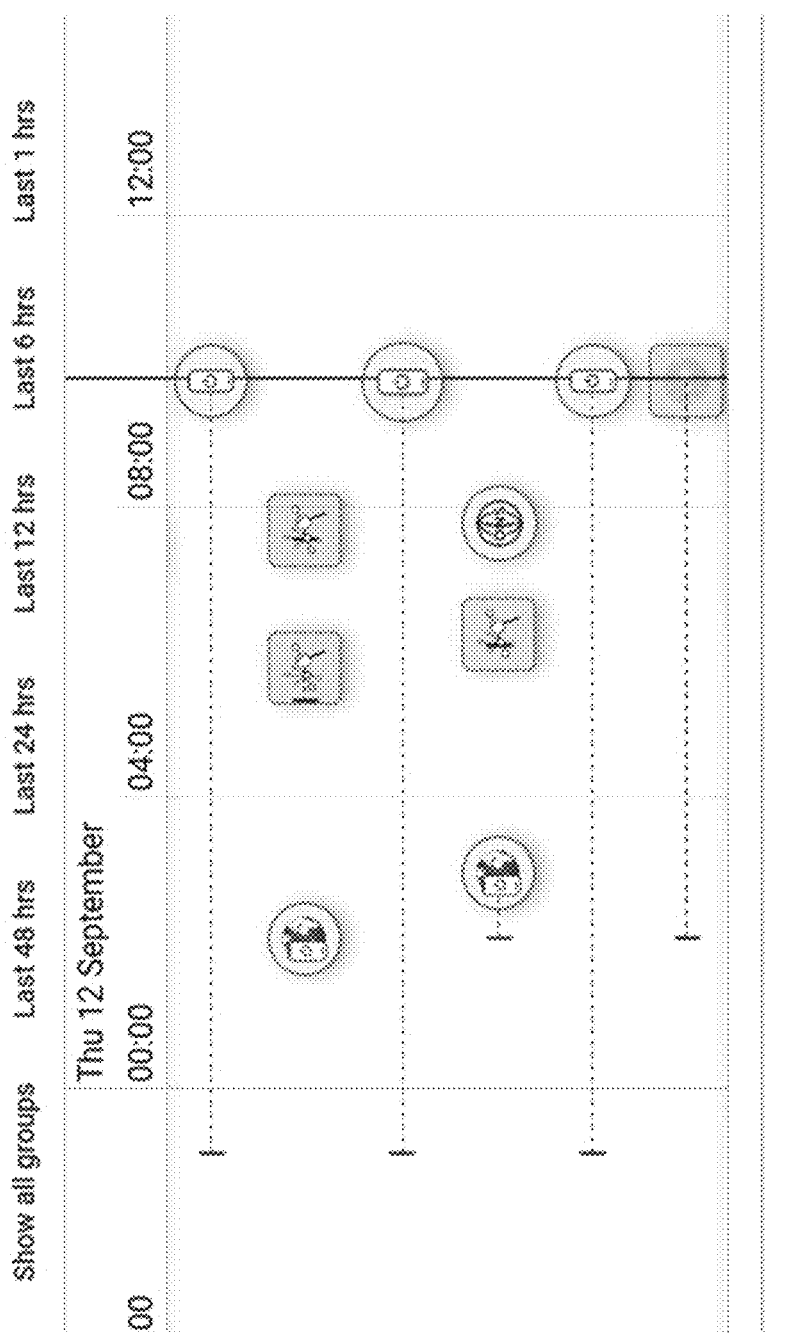

FIG. 26 is a screenshot of time bars. Two kinds of time bars can be seen on the right of the timeline. A blue one is the current browser's time, and a red one is the current system time. Those bars positions are updated in real-time mode, and new cases happening will appear on those lines (with flashing ongoing animation). Their placeholder will remain on those lines as long as the case is not closed. At the same time, their dotted duration line will grow during the ongoing period (marking the start of the raise until the current time). Once closed, a case will stop the flashing animation, and the placeholder will slowly break away from the current time bar. The dotted duration line will not grow anymore. Note, depending on the [time preset] and user zoom and pan actions, those time bars may not be visible. The time preset called 'last 1 hr.' should make them always displayed in real-time mode.

Time presets are the six predefined time scales available on top of the timeline. A user can click on any of them to adapt the time scale to according value. For example, in FIG. 27, 'last 6 hrs' preset will display a timeline from 6 hours ago to the current time. Note, 'show all groups' preset will adapt the time scale to all available cases into the database.'

A user can extend or reduce the timeline time scale using a zoom function: scroll up to zoom in, scroll down to zoom out. The timeline scale is updated, and cases contained in the timeline have their dotted duration line length updated. Note, depending on the chosen zoom level, the dotted duration line length of some cases may not be visible. It means that at this zoom level, the duration is no significant. To make the duration of those cases appear, zoom in the timeline. A user can move the timeline reference without changing the timescale thanks to pan function: keep left-click pressed inside the timeline (out of a case) and move the mouse to the direction of choice. Release left-click when finished. Note, unlike the time X-axis, the Y-axis of the timeline has no other goal than easing the display. In general, the up and down pan is not necessary because the displays try to take all the available vertical space. In some cases (like reducing the window height), if it does not manage to, the horizontal pan will be necessary. In this special case only, the timeline will display scrolls on the right.

Figure 28:
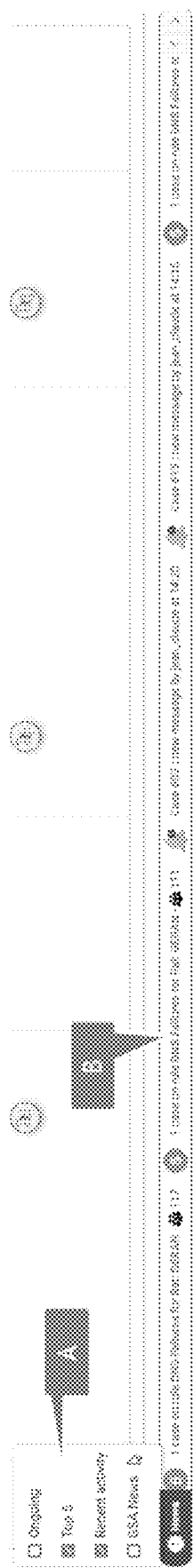

FIG. 28 is a screenshot of a news ticker. The news ticker is used to display real-time information about several subjects but can although be used as a shortcut to go to the details page. A: User choice for news ticker channels. Check to subscribe to relative news. The available channels are Ongoing: Display news about new ongoing cases. Subscribe to be aware of new cases. Top 5: Display news about Top 5 cases impacting subscribers. Subscribe to be aware of the most severe cases. Recent activity: Display information about other users' recent actions like flag changes or new chat messages added on cases. Subscribe to follow teamwork. Note: those actions are related to cases on the timeline. Cases with recent actions have a small shadow flashing until opening a related group overview popup. Note, news ticker channels can be configured in the user settings page, and the user can configure its own RSS incoming information. B: The news is displayed here, in line. Users can interact with the news: hover news to highlight related case group on timeline. Click on the news as a shortcut to the details page focused on the related case group.

Figure 29:
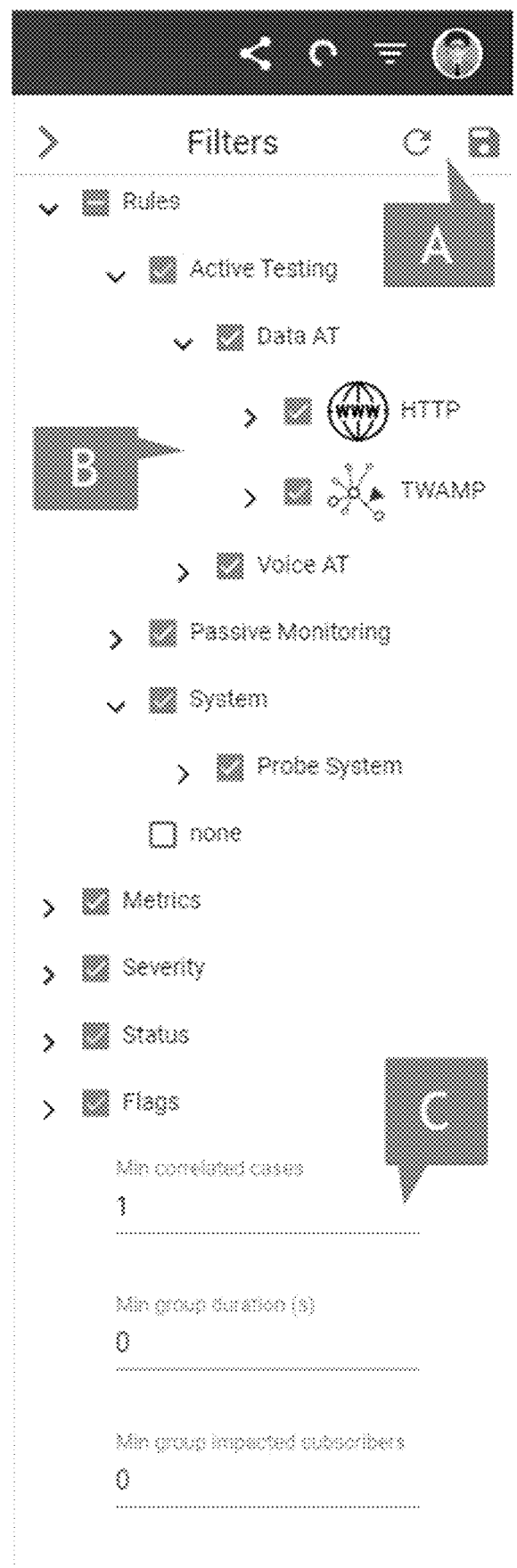

FIG. 29 is a screenshot of a filter panel. The filter panel allows users to apply specific filters on the timeline to reduce cases on its points of interest, to load/save/restore settings of the users choice, to highlight items into the timeline to focus case groups very quickly, to apply the filters to its notifications settings, to be notified of new incoming cases of specific types. A: The load/save/restore for tree and thresholds settings, B: The filter tree, C: The filter thresholds.

Figure 30:
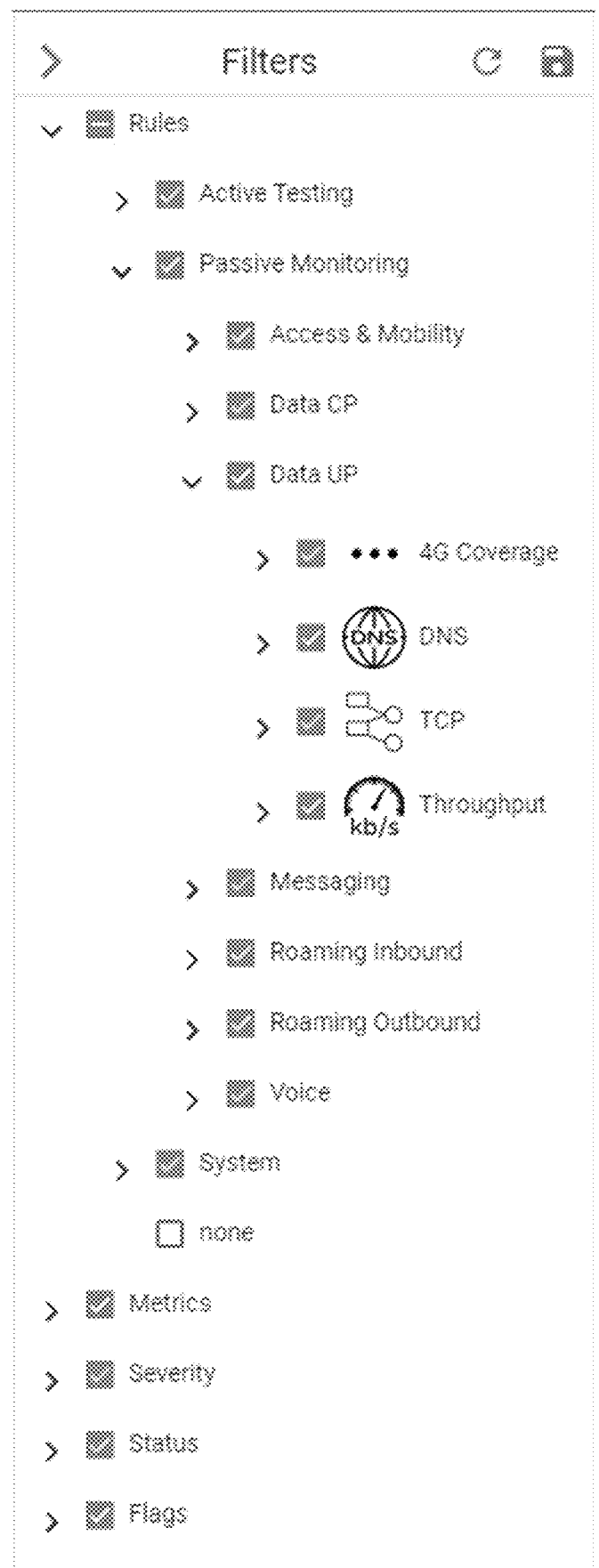

FIG. 30 is a screenshot of a filter tree. The filter tree shows several expendable families of filters, with what a user can interact to point and filter the case groups contained in the timeline. For a certain type of family called rules, some leaves or sub-nodes of the tree can contain icons that are used in the cases placeholders of the timeline, so that they act as a legend.

Figure 31:
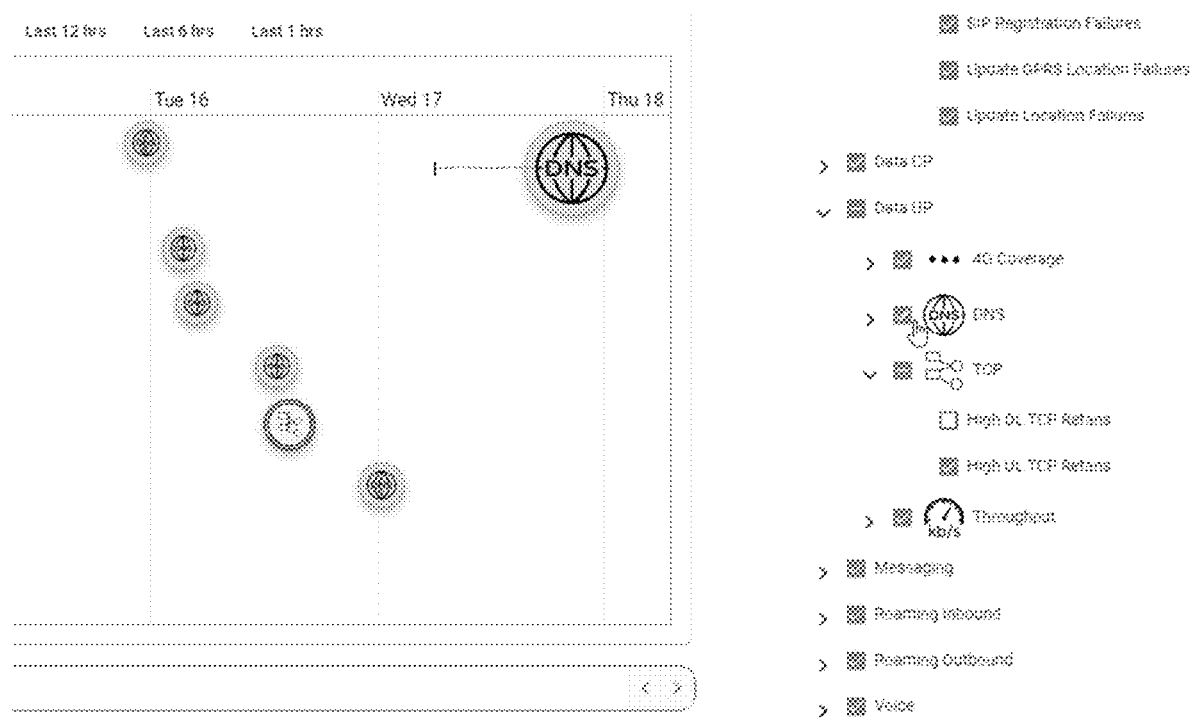

A user can interact with the filter tree in 2 ways, check/uncheck tree nodes. The whole family's filter expression will be evaluated and applied to the current timeline as follows: Each family of a filter is independent of the other so that a case will be displayed in the timeline if all the filters of each family match with the case group. Filters act as an 'AND.' In the case of correlated cases, which contain several cases inside, the filter will keep the whole case group if at least one of the anomalies into the group matches the filter. The timeline display will adapt to the filter panel as described in the timeline reaction to filter. Hover tree node or leaf: This action will highlight all cases in a timeline that belong to the family value hovered. It is used to see quickly if some specific values are available in the timeline, without applying the filter. FIG. 31 is a screenshot of hovering over DNS into the rules filter family.

Filter family's description: There are five different families of filters available:

rules: to select cases that are due to specific rules that reached the anomaly gap. Rules are divided into three sub-categories: active testing, passive monitoring, and system.

Metrics: those are the names of the monitored counters. Rules are applied to counters to detect anomalies and create cases. The counters are divided into service sub-category severity.

Severity (of anomaly detection thresholds, not to compare with case severity): when an anomaly is raised, the counter signal can bypass the limit value with different severities: minor, major, and critical. This filter family allows users to retain cases with the severities of their choice.

Status: this status is computed by the system to give more information about the cases states. Status makes the distinction between 'ongoing' and 'finished' cases.

Flag: this is a user-defined family to ease teamwork. By default, all cases have the 'none' flag, but this can be changed by users to several flag values like 'to investigate' or 'invalid case.' Other users will be notified of the changes so that the team will be able to classify cases after investigation and take appropriate actions.

Filter thresholds—Those filters are a shortcut of visual settings from the user settings panel. They act just as filters of a filter tree and are combined to them, but they are based on numeric values. There are the three filters available: Min correlated cases: a case group must have at least value of cases correlated with being displayed, Min group duration: a case group must last at least value seconds to be displayed, Min impacted subscribers: a case group must impact at least value subscribers to be displayed.

Figure 32:
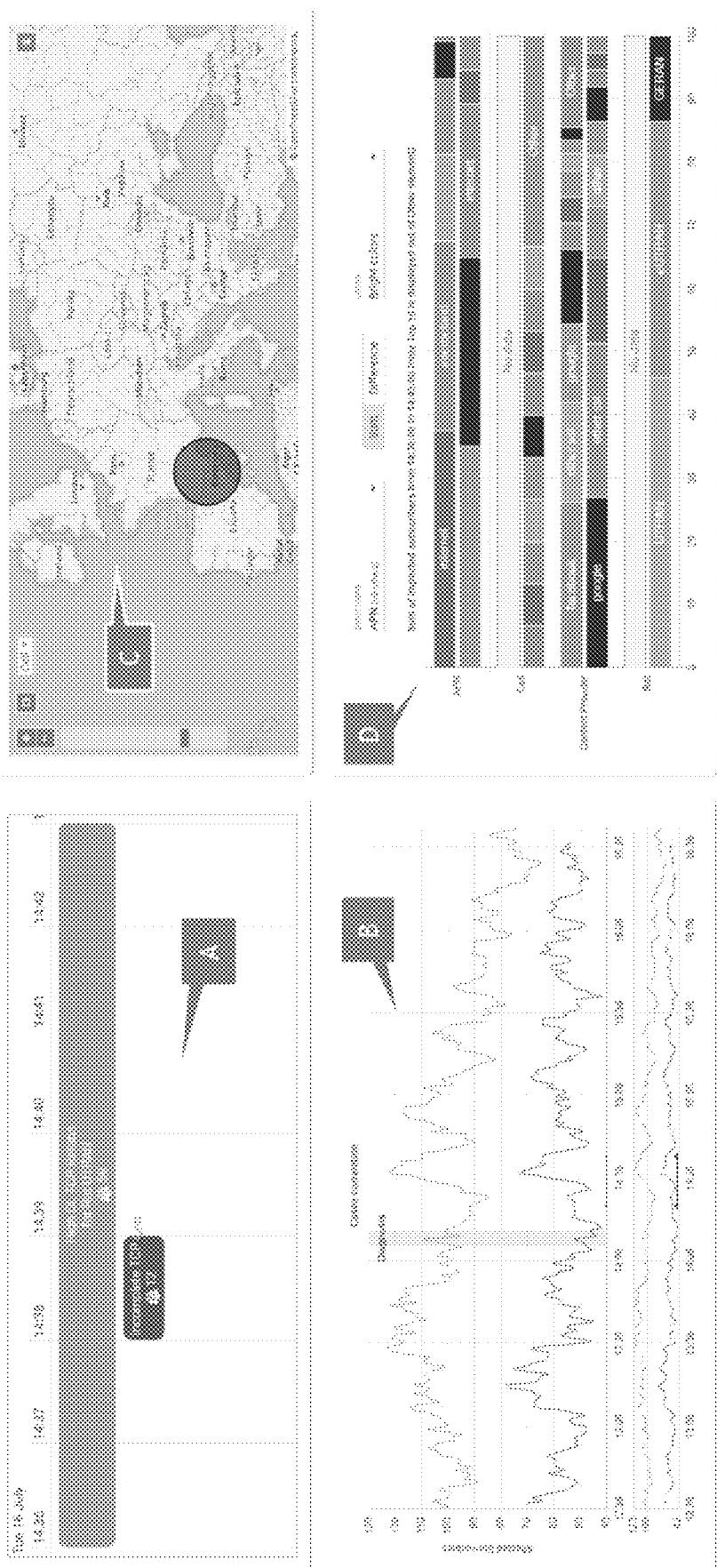

FIG. 32 is a screenshot of a details page. The access to details page is useful when one wants to have the highest detail of information about a selected case group. It provides additional information, such as:

A: anomaly timeline that resume contained anomalies in the group.

B: line chart displaying signals and limit bounds of counters/KPIs linked to anomalies and allow to draw a diagnosis window for diagnosis.

C: a map showing geographic information (if any) during the diagnosis window period drawn on the line chart.

D: diagnosis displaying dimensions values involved during the diagnosis window drawn on the line chart to point several elements of comprehension of the issue.

All those elements are interactive and linked together in this order: anomaly timeline→line chart→diagnosis window→diagnosis and map.

Figure 33:
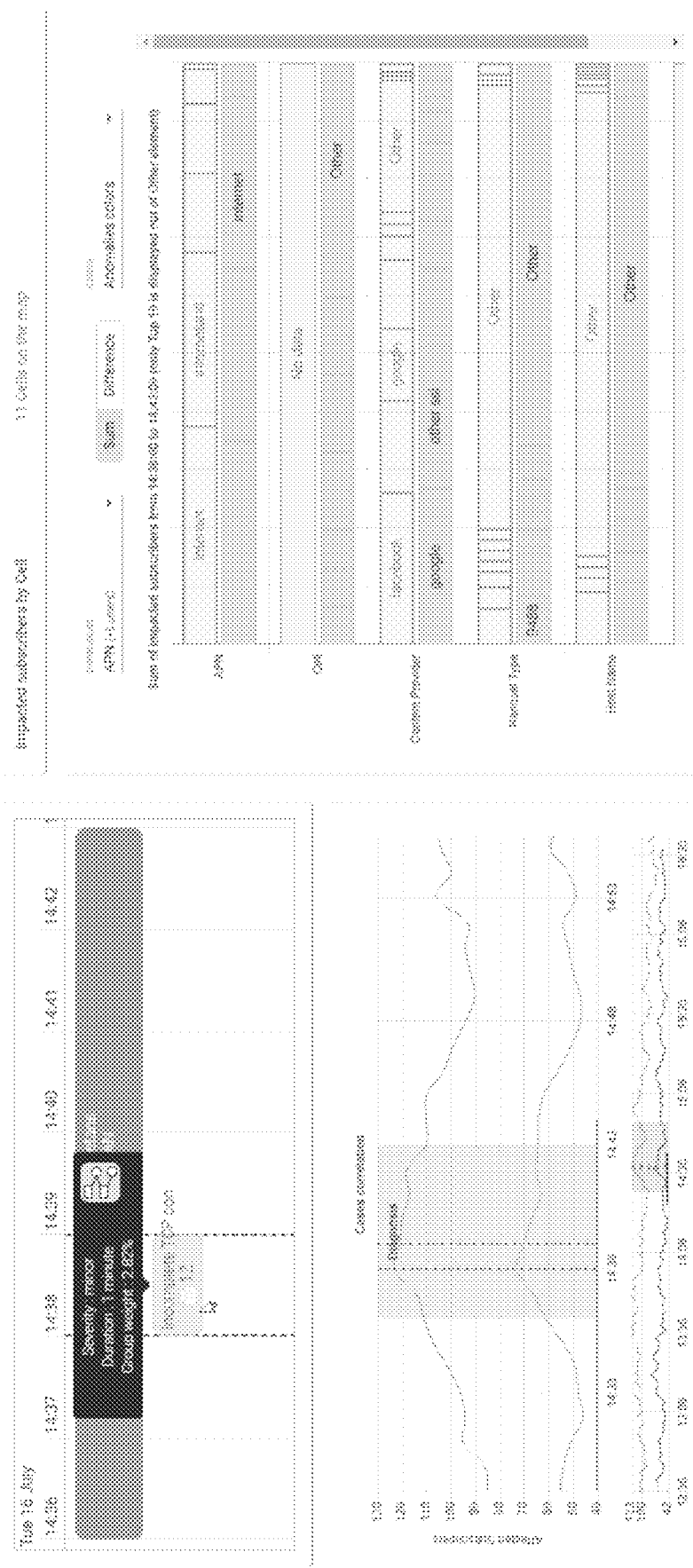

FIG. 33 is a screenshot of an anomaly timeline. The anomaly timeline on the top left corner is the same as the one displayed in group overview popup, with a few additional interactive features.

About colors: When the case groups contain at least two correlated cases, each case time bar on the anomaly timeline has a specific color that is used to recognize according to the line in the line chart if this one is in correlated signals mode. Same for diagnosis bars when its color option is set to 'anomalies colors' value.

This timeline interacts with line chart through two kinds of actions: hover case time bar: displays tooltip with additional information about the hovered case. This creates two vertical duration dotted lines on the left and right of the time bar that is repeated on the line chart below. It helps to see the open time duration of the case within the captured window of the signals of the line chart that last before, during and after the case duration. Highlight in yellow the related line in the line chart if this one is in correlated signals mode. Highlight in yellow the related bars in the diagnosis section if the line chart is in correlated signals mode, and if 'colors' option of diagnosis is set to 'anomalies colors' value. In the following screenshot, the group contains two cases, and none is selected. Line chart is in correlated signals mode by default. Diagnosis color option value is set to 'Anomalies colors.' When a second anomaly time bar is hovered, all related elements on the page become highlighted in yellow. The tooltip appears and the vertical dotted lines for case duration are visible in the anomaly timeline and the line chart.

Select none, one or any number of case time bar: selecting specific anomaly time bars in the anomaly timeline will lead to focus on related anomalies into line chart and diagnosis, and to omit all other unselected information. Important note, unselecting all anomalies is the same as selecting them all. The default setting, when arriving on the page, is 'all unselected.' Depending on the number of selected time bars in the anomaly timeline, the line chart will switch from single signal mode (one case selected) to correlated signals mode (more than one case selected). Each time an item is selected/unselected, the other charts are updated. To select the first case, left-click on it. It will become yellow. To select additional cases, use CTRL+left click. Selected cases will become yellow. To unselect a case, use CTRL+left click on it. To select all cases and return to initial display, click in the anomaly timeline, out of time bars.

Figure 34:
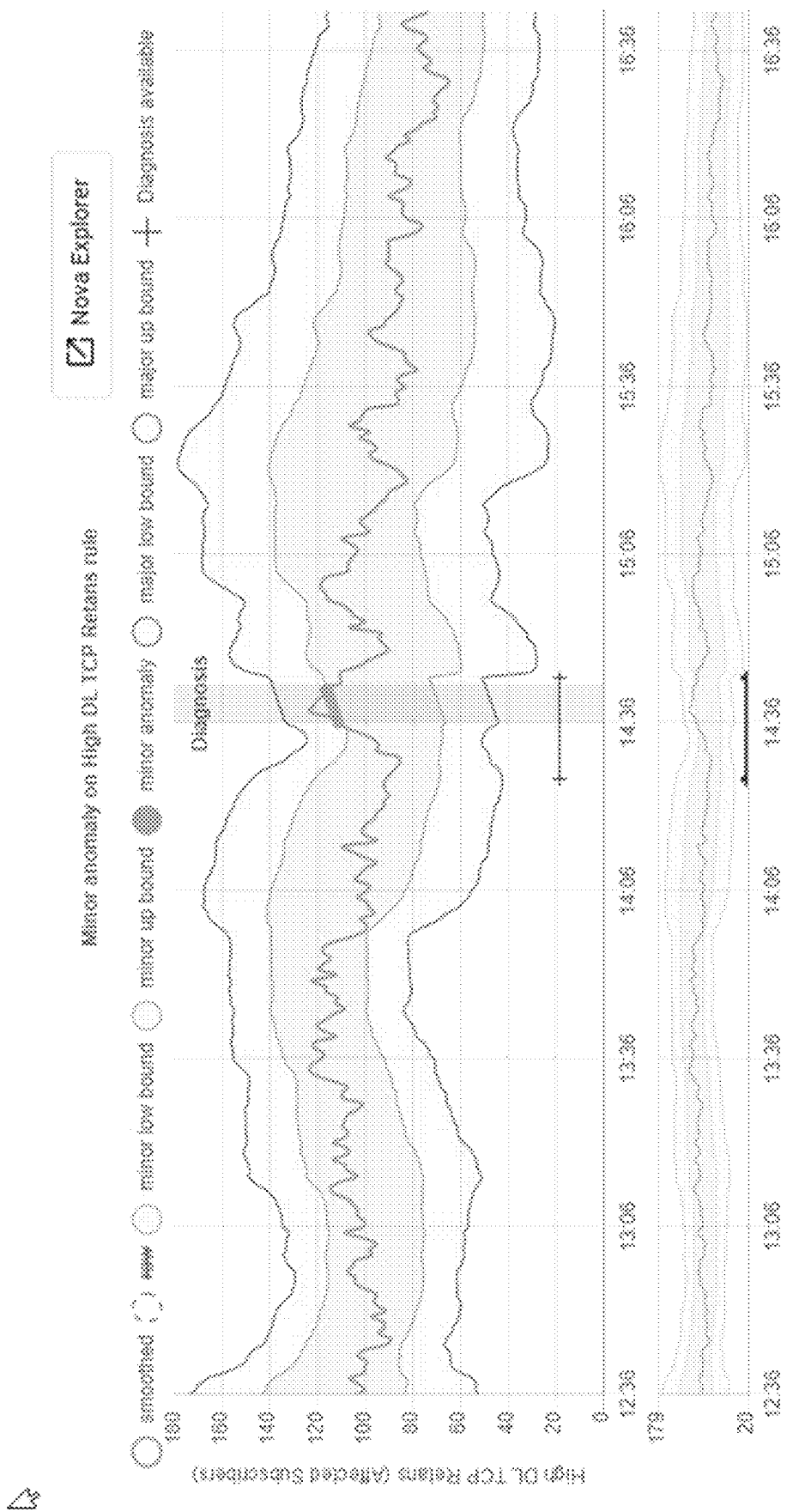

FIG. 34 is a screenshot of a line chart in a single signal mode. The data contained in the line chart is counter or KPI signal smoothed values before, during, and after the raise for each anomaly (case) contained in the case group. It can be displayed on two different modes: "single signal mode" that is used to focus a specific anomaly (case) within the group and a "correlated signals mode" that is used to focus on the correlation between several anomalies (cases) within the group.

The single signal mode—The anomaly low and up threshold bounds for minor (and/or major) raise are displayed in this mode. When the signal goes out of those bounds, the case is opened, and when it goes back in bounds, the case is closed. In FIG. 34, a blue signal is the smoothed value: a distinct number of impacted subscribers for High DL TCP Retrans counter. The yellow zone is the minor anomaly threshold. The red zone is the major anomaly threshold. In this case, blue signal bypass yellow zone around 14:36 during a few minutes, generating anomaly points (yellow points). Those points are the origin of the anomaly (case) creation on the timeline.

Figure 35:
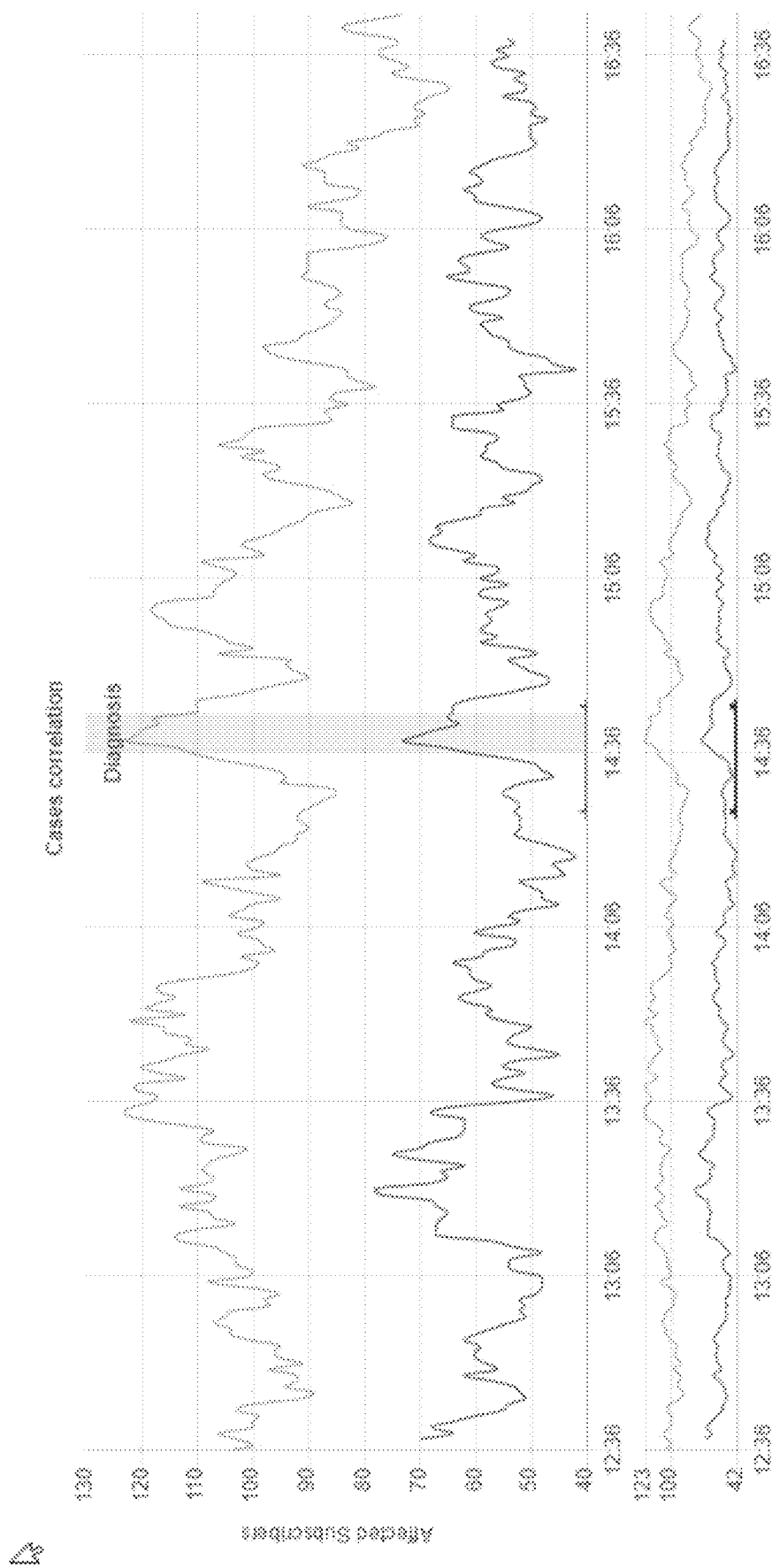

FIG. 35 is a screenshot of a line chart in a correlated signals mode. The correlated signals mode is only available for case groups with at least two correlated cases. Only signals smoothed values are displayed to emphasize the correlation found by the algorithms. This mode is only available if at least two correlated anomalies (cases) are present in the case group. This mode is enabled; when selecting none or more than one case on the anomaly timeline, the line chart will automatically be in this mode. This mode is disabled, if exactly 1 case is selected on the anomaly timeline or if the case group only contains a single anomaly (single case).

Figure 36:
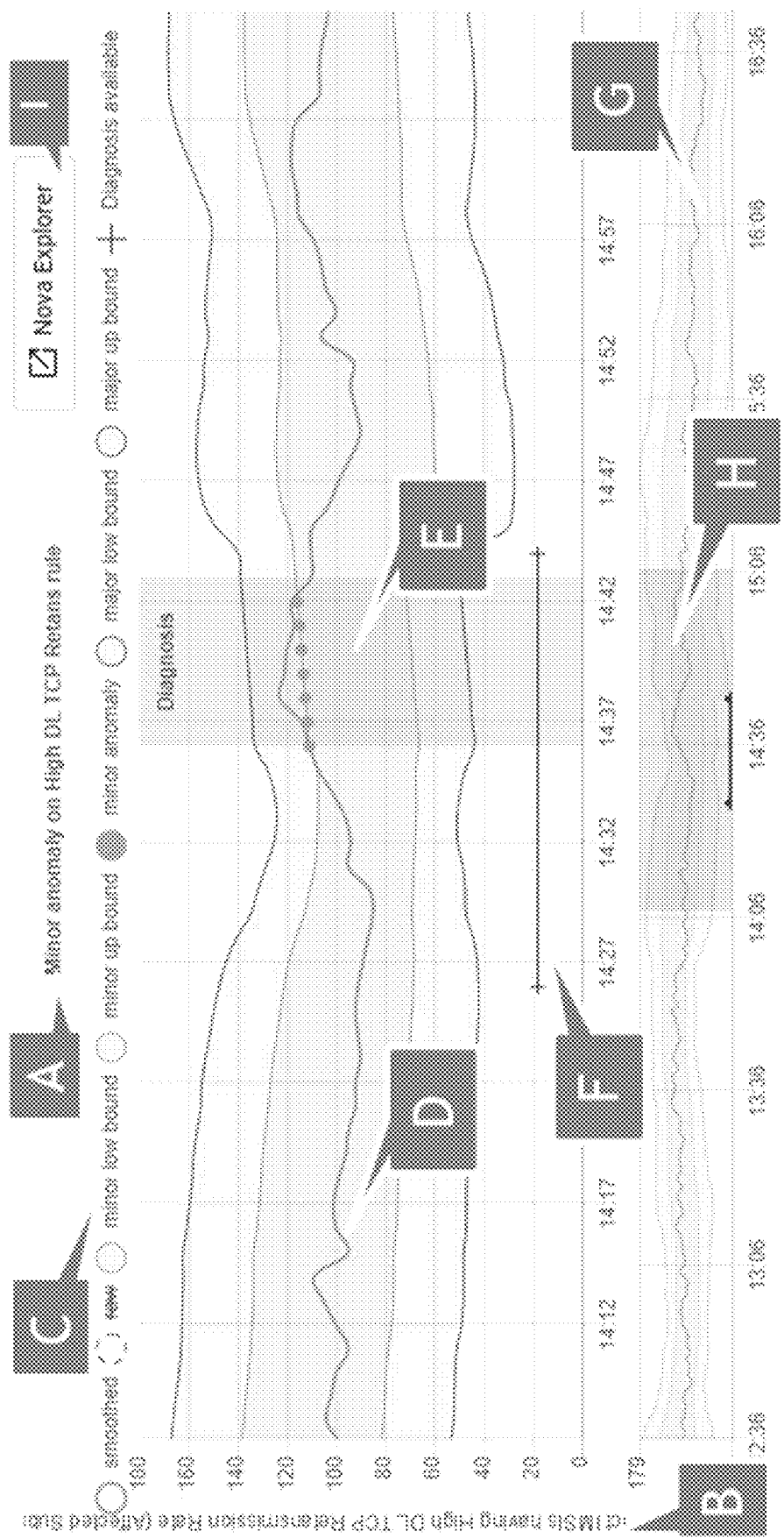

FIG. 36 is a screenshot of a line chart. The line chart advanced description is done for single signal mode but is the same for correlated signals mode except few details described below.

A: Title of the graph. Adapts to anomaly timeline selections.

B: Unit of the displayed lines. Adapts to anomaly timeline selections.

C: interactive lines/zones legend Only available in single signal mode. Users can show/hide lines thanks to clicks on this legend.

D: graph lines content depends on the mode. See single signal mode or correlated signals mode for more details.

E: The grey zone is the diagnosis window, which can be extended, reduced, or moved to adapt the diagnosis on the period selected immediately. It allows user to focus diagnosis on any sub-part of the case duration, to adapt to all user investigation needs. By default, the diagnosis window is set to its largest time values available. In some cases, no diagnosis is available, so that diagnosis window does not exist.

F: The red line on X-axis (same for brush chart) is the default diagnosis window maximal time bounds available. It is useful to keep in mind this zone when the diagnosis window is changed by the user.

G: brush chart: This little chart on the bottom of the line chart is a copy of the line chart on top, but its time scale cannot be reduced, whereas the top chart. It is used to zoom and focus specific zones into the top chart, thanks to its brush window.

H: brush window in grey can be drawn into brush chart to command time scale of the chart on top. By default, the brush window does not exist. It means that scales on brush charts and top charts are aligned. But once the brush window is drawn, the top chart adapts time scale to brush window bounds. Once drawn, the brush zone can be extended, reduced, or moved.

I: link to another application (if data available). Only available in single signal mode: click to open another application. The filters will adapt to the selection, to visualize CDRs of users involved in the case creation during the anomaly detection. Filters of the other will be automatically be configured to the cases.

How to interact with diagnosis and brush windows—To draw a window, press left click on expected start time on the related chart and released click on the expected end time. Once drawn, the window can be extended or reduced, keep left-click pressed on expected bound, move the mouse, and release once the new bound is reached. Moved: keep left-click pressed into the window, move the mouse, and release once the window new expected place is reached. Deleted: click on related chart out of the existing window. The mouse pointer style will always adapt to available actions.

Figure 37:
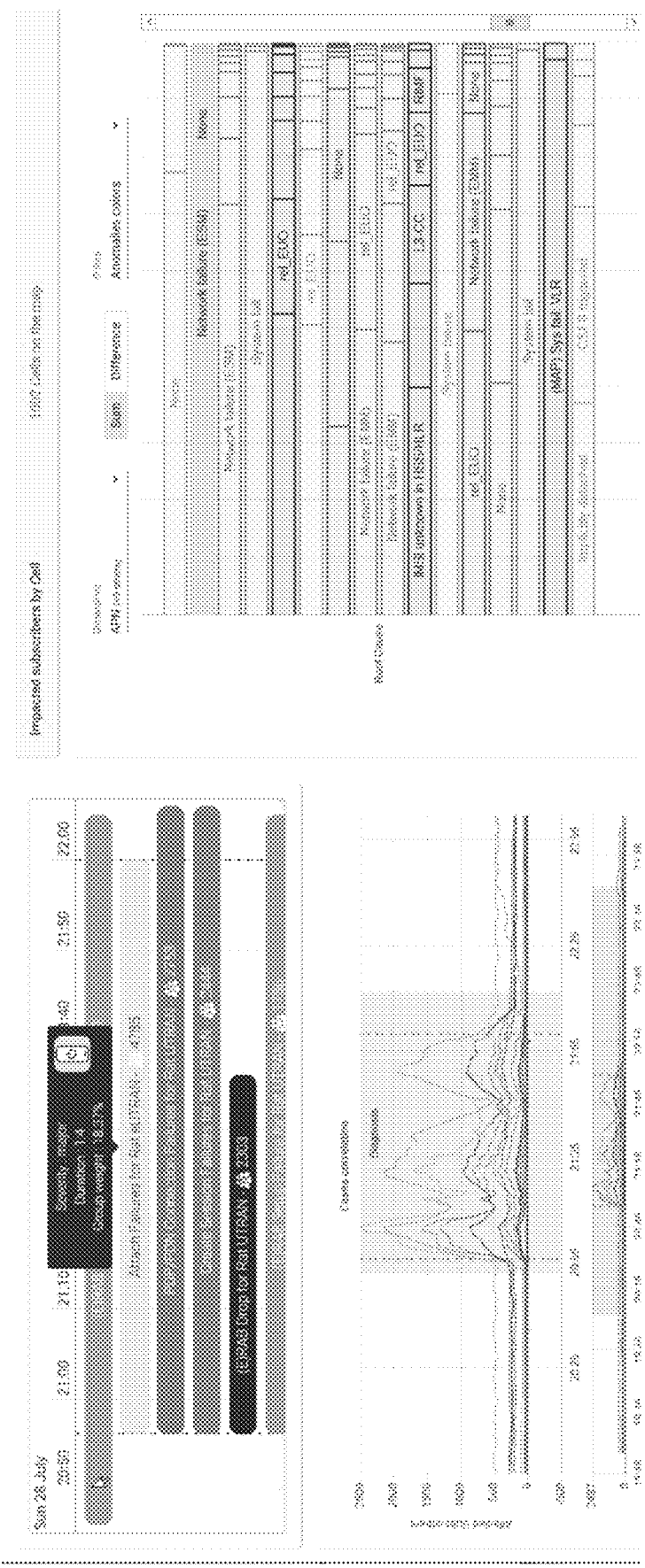

FIG. 37 is a screenshot of diagnosis. The diagnosis gives advanced indicators to decompose the impact of the case within several dimensions and their affected values such as locations (like cells), hardware (like handset types, active testing verifiers, etc.), network technologies (like RAT), services info (like APN, Content provider, Host Name, etc.), etc. The available dimensions depend on the nature of the anomalies raised. Those diagnoses give some investigation clues to fast focus and resolve the problem. For example, a diagnosis based on passive probing could give at first sight the information that subscribers affected by Incomplete TCP connection anomaly are mostly roamers of a given operator who use HTTP on RAT UTRAN of a given cell.

The ability to display correlated diagnosis when line chart is in correlated signals mode allows the user to compare the impacted values of a given dimension or cross information of different dimensions among cases to help or reinforce the suppositions to find a solution to the problem. FIG. 37 is an example of a huge correlated group case, the diagnosis on dimension 'Root cause' shows all the related cases Root causes values for each anomaly of the group during the diagnosis window drawn on a line chart.

Figure 38:
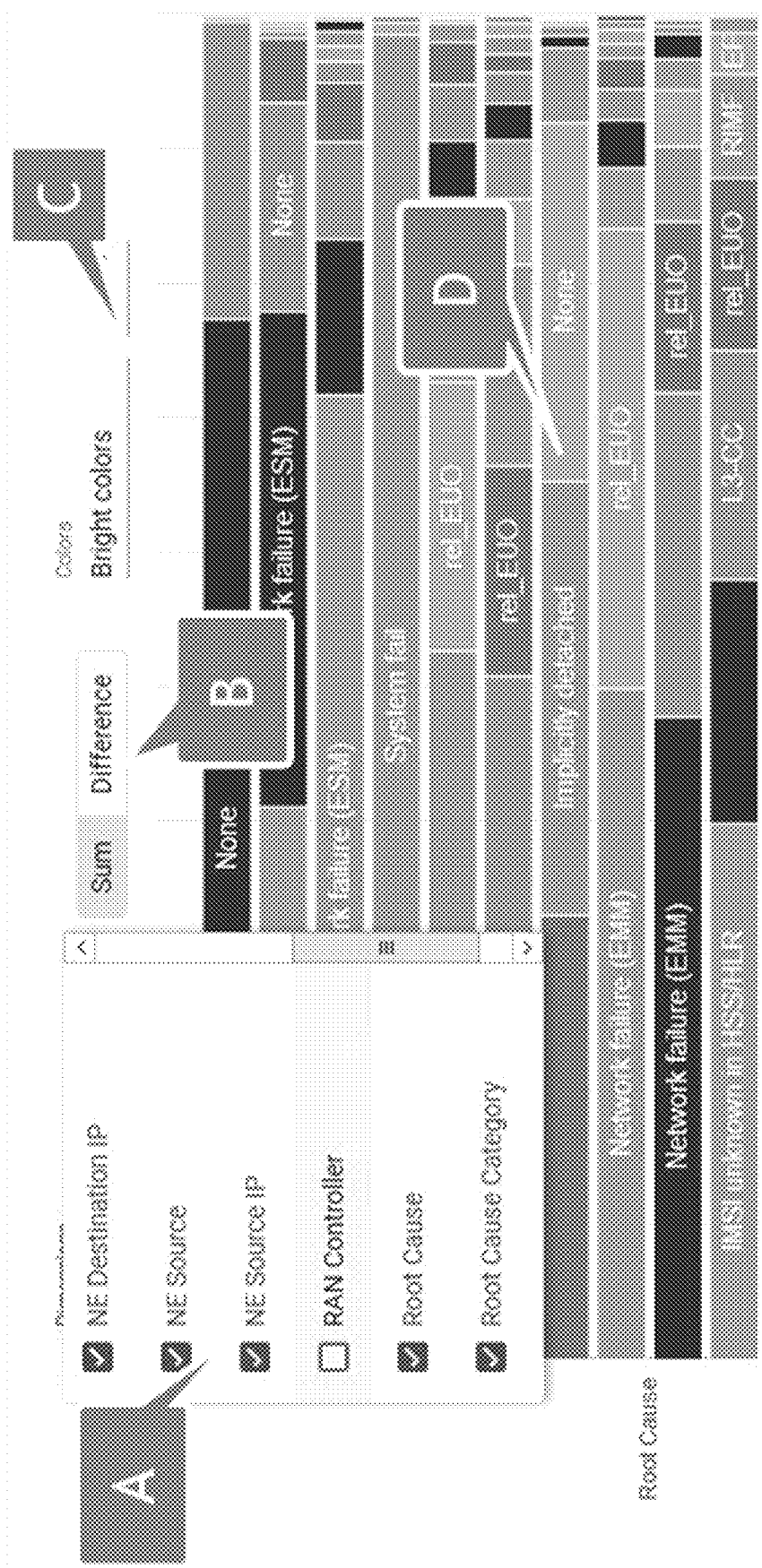

FIG. 38 is a screenshot of a diagnosis description.

A: Dimensions choices: The user can choose the dimensions of interest to display into the diagnosis charts. The available choices depend on the cases contained in the case group. The associated dimensions values will be displayed for all selected cases of the anomaly timeline.

B: type of diagnosis display: 'Sum' By default, dimensions values are displayed for each selected case of the anomaly timeline during the diagnosis window drawn in the line chart. 'Difference' is another available mode of display: It shows which values changed the most between the start time of the diagnosis window and end time of the diagnosis window so that the user can focus on what varies the most during the case duration. It may help to understand what happened.

C: Choice of color display: 'Bright colors' displays the diagnosis with many random colors to ease the distinction between values but does not help to associate bars of the diagnosis with line chart and anomaly timeline when one faces correlated cases. 'Anomalies colors' displays the diagnosis with re-use of colors from anomaly timeline and line chart. This mode does not ease the distinction between values of a given case but helps to associate bars of the diagnosis with line chart and anomaly timeline when one faces correlated cases.

Figure 39:
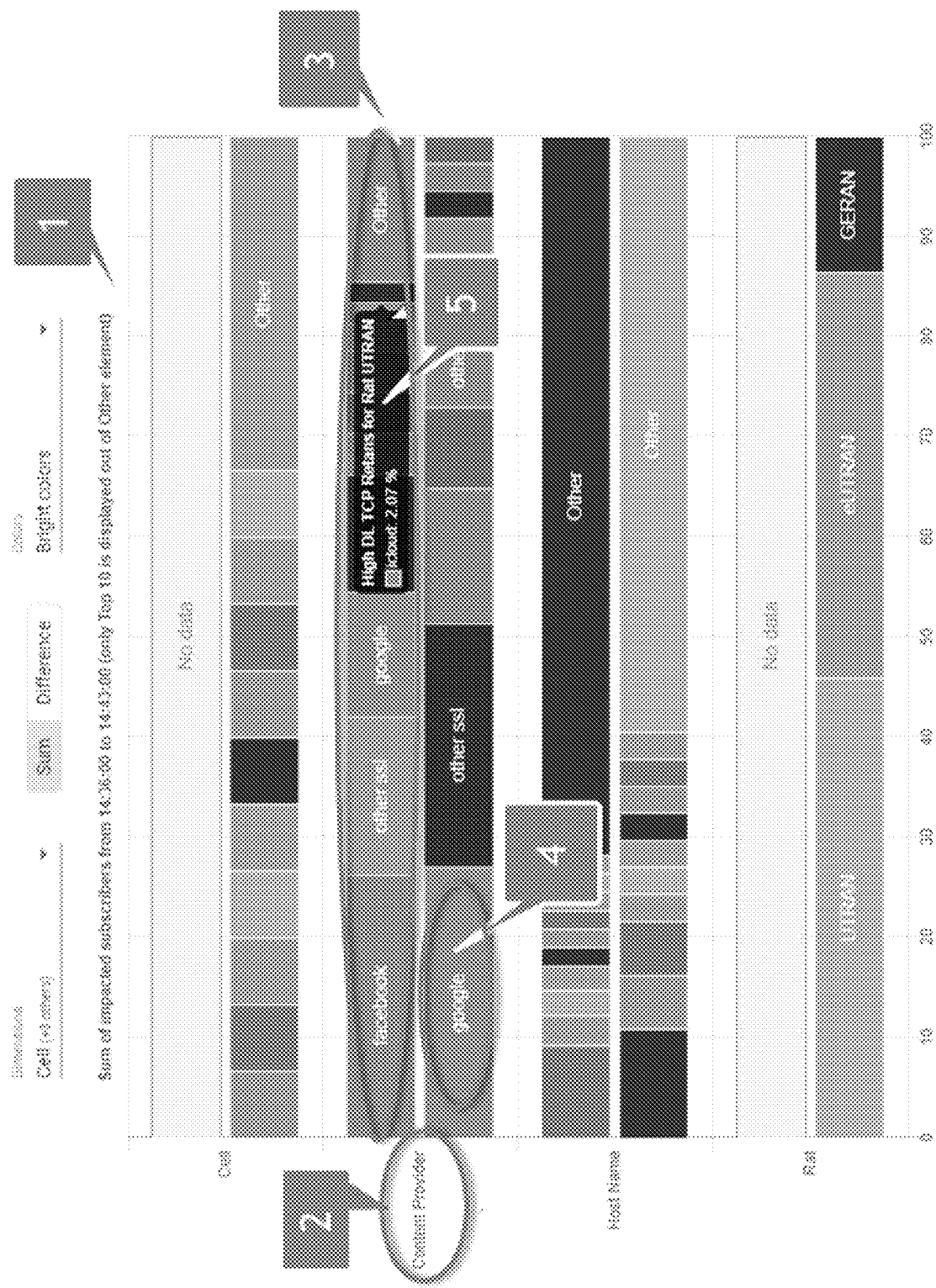

D: FIG. 39 is further detail of the diagnosis bar chart.

1: title: adapts to the type of display, units, and the diagnosis window

2: dimension type. One can choose to enable or disable dimension types thanks to dimension choices (see A).

3: dimension bar: related to 1 case (anomaly) of the anomaly timeline. The diagnosis contains a number of bars equal to: (number of displayed dimensions x number of selected cases into the anomaly timeline). The bars are grouped by dimension type. Within a dimension type, the bars are ordered like the time bars of the anomaly timeline. (for example, one bar of each dimension type corresponds to 1st case of the anomaly timeline).

4: dimension value. In this example, we visualize the proportion of subscribers using content providers during the diagnosis window period of the 2d case of the anomaly timeline. Note that if the display has enough space to display the label value, it will be directly available on the bar chart. In another case, the label is not displayed; one needs to focus a value and make the tooltip appear to learn about the selected value.

5: hover a value to get more information about it. The tooltip appears and shows information: repeat the related case (anomaly) label, gives the dimension value label, and gives the percentage of representation of this dimension value among all available values.

Figure 40:
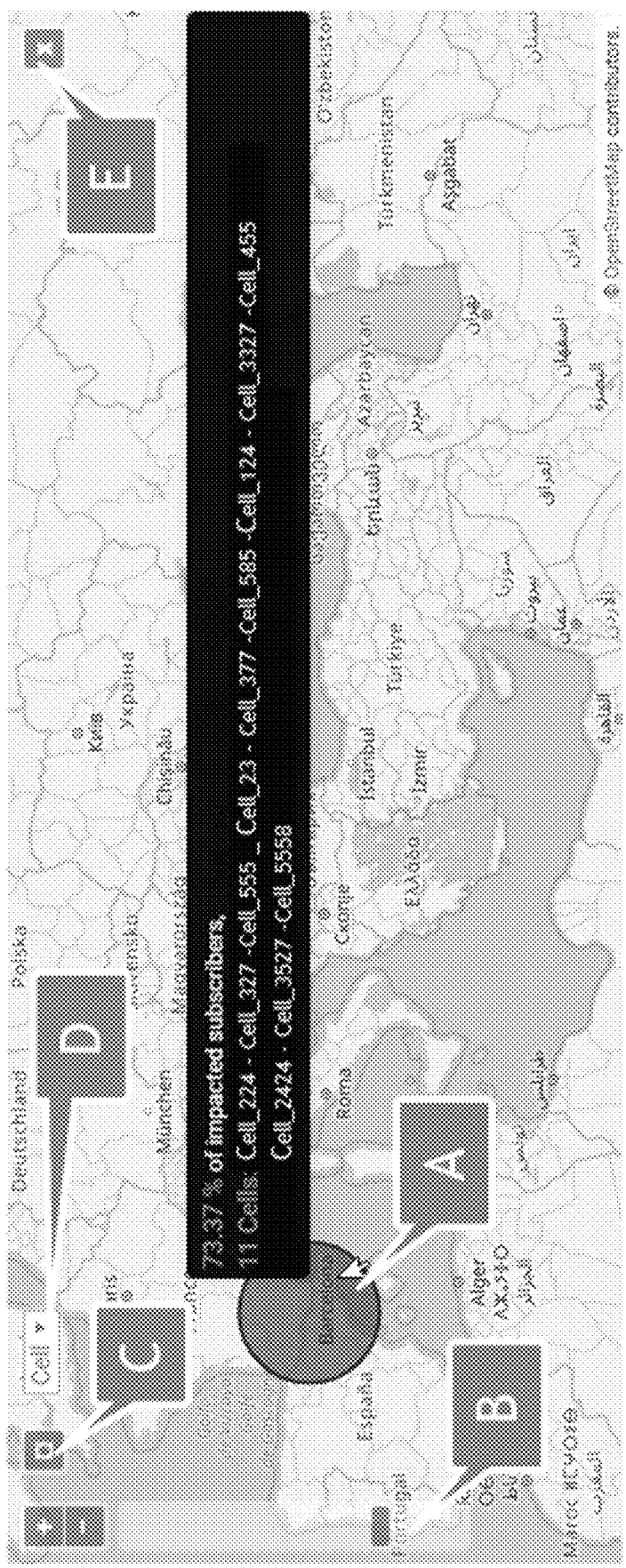

FIG. 40 is a screenshot of a map. When geographic information is available through topology configuration on some types of dimension such as Cells, or other network elements, the map will aggregate the diagnosis-related data values into the map to indicate the locations of the issues during the diagnosis window period.

A: Dimensions choices: The user can choose the dimensions of interest to display into the diagnosis charts. The available choices depend on the cases contained in the case group. The associated dimensions values will be displayed for all selected cases of the anomaly timeline.

B: type of diagnosis display: 'Sum' By default, dimensions values are displayed for each selected case of the anomaly timeline during the diagnosis window drawn in the line chart. 'Difference' is another available mode of display. It shows which values changed the most between the start time of the diagnosis window and the end time of the diagnosis window so that the user can focus on what varies the most during the case duration. It may help to understand what happened.

C: Choice of color display: 'Bright colors' displays the diagnosis with many random colors to ease the distinction between values, but does not help to associate bars of the diagnosis with line chart and anomaly timeline when one faces correlated cases. 'Anomalies colors' displays the diagnosis with re-use of colors from anomaly timeline and line chart. This mode does not ease the distinction between values of a given case but helps to associate bars of the diagnosis with line chart and anomaly timeline when one faces correlated cases.

Figure 41:
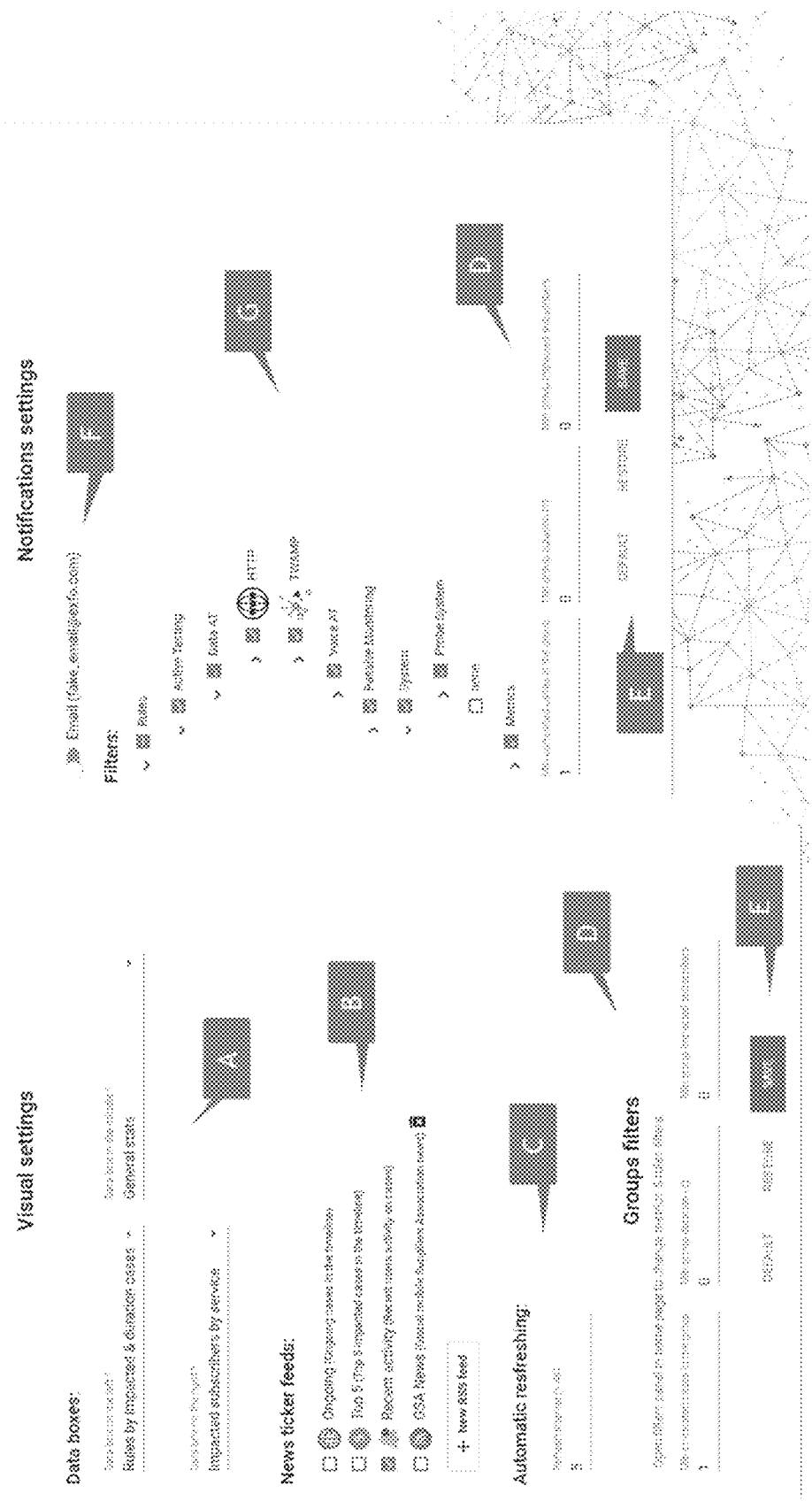

FIG. 41 is a screenshot of user settings. The user settings page allows user to configure its points of interest, and to save them so that they are applied after login. The page is shared into two main categories: On the left, the visual settings, have an impact on the display. On the right, the notification settings have no visible impact on the GUI, but only on the flow of notifications that the user would like to receive.

Visual settings are divided into four parts:

A: Data boxes configuration: configure the overview charts of choice thanks to those lists.

B: News ticker feeds: one can choose news ticker channels of information here, or directly on the news ticker panel of the main page. Predefined channels are described in the news ticker section. To configure a custom channel from RSS, click on the 'new RSS feed button.'

C: Automatic refreshing parameter, in a real-time mode, the refresh main page or details page each 'value' seconds. If no need for a high refresh frequency, this parameter should be set to a higher value than the default, to decrease server work.

D: Group filters: Those three parameters are the same filter thresholds as the ones described in the filter panel.

E: buttons to save/restore previous settings or set to default values.

Notifications settings are used to send information in real-time to the user. As the user may not want to be notified in the same way than the visualization of the [timeline] (to avoid overflow or concentrate on specific issues), a part of the filter configuration is repeated here, explicitly for notifications purpose:

F: the way to be notified. Push buttons to subscribe to notifications. If the user profile does not have the required information (such as e-mail address), then the user will be invited to dd the missing information before.

G: A specific filter tree just like the one described in the filter panel, but applied for notifications. A shortcut to align this tree to visual settings exists: see load/save/restore of filter panel section for more information.

D: Group filters: Those three parameters are the same filter thresholds than the ones described in the filter panel, but applied for notifications.

E: buttons to save/restore previous settings or set to default values

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to perform the steps of:

responsive to obtaining data related to one or more events occurring during operation of a system, displaying time-dependent information about a time-based component of the one or more events on a timeline, wherein the time-dependent information includes a start time, one of a current time or an end time, and a duration between the start time and the end time of the one or more events;

displaying, on an end of a visualized line indicating a duration of the time-based component for each of the one or more events on the timeline, a placeholder including fixed information about a timeless component of a corresponding event on the timeline, wherein the placeholder includes a shape on the end of the visualized line corresponding to a duration of the time-based component, and wherein a position of the placeholder is placed to one of the end time for a closed event or the current time for an open event on the end of the visualized line; and responsive to user input to modify a timescale of the timeline, adjusting display of the timeline by adjusting the time-dependent information of the one or more events and maintaining each placeholder, including the fixed information, on the end of the visualized line.

2. The non-transitory computer-readable medium of claim 1, wherein the fixed information for each of the one or more events includes any of a category, a severity, an impact, a data source type, a group status, a pending status, and a notification status.

3. The non-transitory computer-readable medium of claim 1, wherein the time-dependent information is displayed for each of the one or more events as a duration line that spans a duration and that always displays at least an end time of each event.

4. The non-transitory computer-readable medium of claim 1, wherein the placeholder is a circle or a bubble with a center located at the end of the line.

5. The non-transitory computer-readable medium of claim 1, wherein the fixed information is visually conveyed via any of:
an icon or image located on, within, or over the placeholder for each event,
a relative size of the placeholder for each event,
color of the placeholder for each event,
a physical shape of the placeholder for each event,
a single or double shape borderline of the placeholder for each event,
an animated flashing placeholder content for each event, and
an animated shading placeholder for each event.

6. The non-transitory computer-readable medium of claim 1, wherein the instructions that, when executed, further cause the processor to perform the steps of:
displaying additional information about a specific event responsive to a command to support further investigation of the specific event, wherein the additional information includes at least one of a detail of each subcase of the specific event, a graph of a raw signal for the specific event and its thresholds used for anomaly detection, a graphical multi-dimension diagnosis representation, and a geographical location representation of the specific event.

7. The non-transitory computer-readable medium of claim 1, wherein a horizontal axis of the timeline represents time and a vertical axis has no value, and wherein multiple events that do not overlap in time are stacked at different locations.

8. The non-transitory computer-readable medium of claim 1, wherein the system is a telecommunications network, wherein the fixed information includes at least a category of each event and any of an impact, a severity based on a duration and impact, a data source indicator, a correlation status, a notification status, and a pending status for each event.

9. An apparatus comprising:
a processor and memory comprising instructions that, when executed, cause the processor to:
responsive to obtaining data related to one or more events occurring during operation of a system, display time-dependent information about a time-based component of the one or more events on a timeline, wherein the time-dependent information includes a start time, one of a current time or an end time, and a duration between the start time and the end time of the one or more events;
display, on an end of a visualized line indicating a duration of the time-based component for each of the one or more events on the timeline, a placeholder including fixed information about a timeless component of a corresponding event on the timeline,
wherein the placeholder includes a shape on the end of the visualized line corresponding to a duration of the time-based component, and
wherein a position of the placeholder corresponding is placed to one of the end time for a closed event or the current time for an open event on the end of the visualized line; and
responsive to user input to modify a timescale of the timeline, adjust display of the timeline by adjusting the time-dependent information of the one or more events and maintaining each placeholder, including the fixed information, on the end of the visualized line.

10. The apparatus of claim 9, wherein the fixed information for each of the one or more events includes any of a category, a severity, an impact, a data source indicator, a group status, a pending status, and a notification status.

11. The apparatus of claim 9, wherein the time-dependent information is displayed for each of the one or more events as a duration line that spans a duration and that always displays at least an end time of each event.

12. The apparatus of claim 9, wherein the instructions that, when executed, further cause the processor to perform the steps of:
displaying additional information about a specific event responsive to a command to support further investigation of the specific event, wherein the additional information includes at least one of a detail of each subcase of the specific event, a graph of a raw signal for the specific event and its thresholds used for anomaly detection, a graphical multi-dimension diagnosis representation, and a geographical location representation of the specific event.

13. The apparatus of claim 9, wherein a horizontal axis of the timeline represents time and a vertical axis has no value, and wherein multiple events that do not overlap in time are stacked at different locations.

14. The apparatus of claim 9, wherein the system is a telecommunications network, wherein the fixed information includes at least a category of each event and any of an impact, a severity based on a duration and impact, a data source indicator, a correlation status, a notification status, and a pending status for each event.

15. A visualization method comprising:
responsive to obtaining data related to one or more events occurring during operation of a system, displaying time-dependent information about a time-based component of the one or more events on a timeline, wherein the time-dependent information includes a start time, one of a current time or an end time, and a duration between the start time and the end time of the one or more events;

displaying, on an end of a visualized line indicating a duration of the time-based component for each of the one or more events on the timeline, a placeholder including fixed information about a timeless component of a corresponding event on the timeline, and wherein the placeholder includes a shape on the end of the visualized line corresponding to a duration of the time-based component, and wherein a position of the placeholder is placed to one of the end time for a closed event or the current time for an open event on the end of the visualized line; and responsive to user input to modify a timescale of the timeline, adjusting display of the timeline by adjusting the time-dependent information of the one or more events and maintaining each placeholder, including the fixed information, on the end of the visualized line.

* * * * *